United States Patent [19]

Vail, III

[11] Patent Number: 5,043,668

[45] Date of Patent: * Aug. 27, 1991

[54] METHODS AND APPARATUS FOR MEASUREMENT OF ELECTRONIC PROPERTIES OF GEOLOGICAL FORMATIONS THROUGH BOREHOLE CASING

[75] Inventor: William B. Vail, III, Bothell, Wash.

[73] Assignee: ParaMagnetic Logging Inc., Woodinville, Wash.

[*] Notice: The portion of the term of this patent subsequent to Apr. 11, 2006 has been disclaimed.

[21] Appl. No.: 435,273

[22] Filed: Oct. 30, 1989

Related U.S. Application Data

[63] Continuation-in-part of Ser. No. 89,697, Aug. 26, 1987, Pat. No. 4,882,542, which is a continuation-in-part of Ser. No. 927,115, Nov. 4, 1986, Pat. No. 4,820,989.

[51] Int. Cl.$^5$ ............................................... G01V 3/20
[52] U.S. Cl. .................................................... 324/368
[58] Field of Search ............................... 324/347–375; 364/422

[56] References Cited

U.S. PATENT DOCUMENTS

| | | |
|---|---|---|
| 2,729,784 | 1/1956 | Fearon . |
| 2,891,215 | 6/1959 | Fearon . |
| 4,796,186 | 1/1989 | Kaufman .................. 324/368 X |
| 4,820,989 | 4/1989 | Vail, III ........................ 324/368 |
| 4,837,518 | 6/1989 | Gard et al. .................... 324/368 |
| 4,882,592 | 11/1989 | Vail, III ........................ 324/368 |
| 4,901,023 | 2/1990 | Vail, III ........................ 324/368 |

FOREIGN PATENT DOCUMENTS 56026 11/1939 U.S.S.R. .

Primary Examiner—Kenneth A. Wieder
Assistant Examiner—Warren S. Edmonds

[57] ABSTRACT

Methods and apparatus are provided for measuring electronic properties of geological formations and cement layers adjacent to cased boreholes including resistivities, polarization phenomena and dielectric constants. Current is passed from an electrode in electrical contact with the interior of the borehole casing to an electrode on the surface of the earth. At least three voltage measuring electrodes in electrical contact with the interior of the casing measure the voltage at various points thereon. The voltage differences between discrete pairs of the voltage measuring electrodes provide a measurement of the differential current conducted into formation in the vicinity of those electrodes. These measurements facilitate calculation of the resistivities of the adjacent geological formations as well as an indication of whether cement is present. Measurements of the differential voltage response to transient currents provide a measurement of the polarization phenomena in formation as well as the capacitance of the casing in contact with the formation which is useful for determining whether oil and gas present. Lithological characteristics of the formation such as the pressence or absence of clay can also be determined. A calibration procedure is provided for minimizing errors induced by variations in the casing. The device also may be placed within the pipe attached to a drill bit while drilling open holes.

76 Claims, 26 Drawing Sheets

METHODS AND APPARATUS FOR MEASUREMENT OF ELECTRONIC PROPERTIES OF GEOLOGICAL FORMATIONS THROUGH BOREHOLE CASING

This invention was made with Government support under DOE Grant No. DE-FG06-84ER13294, entitled "Validating the Paramagnetic Logging Effect", awarded by the Division of Advanced Energy Projects, Office of Basic Energy Sciences, of the U.S. Department of Energy. The government has certain rights in this invention.

This application is a continuation-in-part application of Ser. No. 07/089,697 filed Aug. 26, 1987, now U.S. Pat. No. 4,882,542, which is entitled "Methods and Apparatus for Measurement of Electronic Properties of Geological Formations Through Borehole Casing". U.S. Pat. No. 4,882,542 is a continuation-in-part application of Ser. No. 06/927,115 filed Nov. 4, 1986, now U.S. Pat. No. 4,820,989, which issued on Apr. 11, 1989, and which is entitled "Methods and Apparatus for Measurement of the Resistivity of Geological Formations from Within Cased Boreholes".

The invention provides methods and apparatus for measurement of electronic properties such as the resistivities, polarization phenomena, and dielectric constants of geological formations and cement layers adjacent to cased boreholes.

Measuring the resistivity of formations adjacent to cased boreholes is important for several reasons. First, such information is useful in locating "missed oil" which is oil in formation which was missed during the original logging operations prior to insertion of the casing. In addition, such information is useful in monitoring water flooding operations during production activities in an oil field.

Numerous U.S. patents have been issued which address the problem of measuring resistivity through casing. Please refer for example to the following U.S. Pat. No. 2,222,149; 2,224,635; 2,273,363; 2,297,754; 2,397,254; 2,397,255; 2,400,593; 2,414,194; 2,459,196; 2,587,518; 2,729,784; and 2,891,215. It is well known in the industry that so far there has been no method tried which yields the formation resistivity accurately through casing. The above patents all suffer from various problems which have prevented their successful use in the logging industry. Major problems are devising techniques which yield results that are invariant to contact resistances of the electrodes in contact with the casing and which are immune to thickness variations in the casing.

One major problem in measuring formation resistivities in the presence of very conductive borehole casing is that current introduced onto the casing tends to flow primarily on the casing near the current introducing electrodes and ultimately, over long distances, finally flows into formation. Measurement of formation resistivities adjacent to cased boreholes requires methods and apparatus to deal with this problem. Most very early work simply ignored this problem as in the case of U.S. Pat. No. 2,224,635. And in some cases, inventors sought to measure the small effects of current conducted into formation on a large "background signal" due to currents flowing along the casing as exemplified by W. H. Stewart in U.S. Pat. Nos. 2,459,196 and 2,371,658 and by J. M. Pearson in U.S. Pat. No. 2,587,518. However, measurements of a small signal on top of a large background signal normally lead to poor measurement accuracy. And another attempt was made to solve this problem in U.S. Pat. Nos. 2,729,784 and 2,891,215 authored by R. E. Fearon which relies upon establishing absolutely equipotential regions along sections of the borehole casing to enable measurements of formation resistivity. The method and apparatus disclosed in the invention requires no such absolutely necessary equipotential surfaces.

The invention has many additional uses. The invention may be used to determine the location of oil/water and oil/gas boundaries. The invention may be used to monitor the integrity of cement behind borehole casing. The invention may also be used to measure polarization phenomena due to the electrochemical nature of fluids, rock, and cement adjacent to the cased borehole which may be used to infer lithological information about the adjacent geological formation. Furthermore, such polarization measurements may be interpreted to yield measurements of the dielectric constants of fluids in formation which can be used to determine the amount of residual oil and gas in formation. The invention can also be used to determine the dip and strike of the geological formation adjacent to the casing. In conjunction with forcing fluids through formation, the invention may also be used to measure the permeability of geological formations adjacent to cased boreholes. Forcing fluids through formation may also generate fractures of the formation and the invention may be used to monitor the production of such fractures. In addition, the invention may also be used to measure the properties of geological formations through the drill stem attached to a drilling bit while drilling into a geological formation. And finally, the invention may also be used to measure the level of contamination through pipes which penetrate fresh water reservoirs.

Accordingly, an object of the invention is to provide new and practical methods of measuring the resistivity of geological formations adjacent to cased boreholes.

It is yet another object of the invention to provide new and practical apparatus for measuring the resistivity of geological formations adjacent to cased boreholes.

It is yet another object of the invention to provide methods of measuring the resistivity of geological formations adjacent to cased boreholes which are insensitive to the oxidized condition of the borehole casing.

And it is yet another object of the invention to provide apparatus for measuring the resistivity of geological formations adjacent to cased boreholes which are insensitive to the oxidized condition of the borehole casing.

In addition, it is another object of the invention to provide methods and apparatus which allows monitoring of water and chemical flooding of reservoirs during enhanced oil recovery projects.

And it is another object of the invention to provide methods and apparatus which provides a means for monitoring the integrity of a cement layer on the exterior surface of the casing from inside a cased well.

Further, it is still another object of the invention to provide methods and apparatus which allow measurement of electrochemical phenomena collectively identified as polarization phenomena through borehole casing which allows measurement of certain lithological characteristics of the adjacent geological formation such as the difference between clays and sandstones.

And it is yet another object of the invention to provide methods and apparatus which allow the measurement of one type of polarization phenomenon which causes the formation of charges on the exterior of the casing which then allows determination of the dielectric constants of fluids adjacent to the cased borehole which consequently provides a means to differentiate between water present and any oil and gas present, and furthermore, provides a means of measuring the volume occupied by any oil and gas present in formation.

Furthermore, it is yet another object of the invention to provide methods and apparatus which allow the measurement of the permeability of the geological formation adjacent to a cased borehole.

And it is yet another object of the invention to provide methods and apparatus to measure the resistivity of geological formations through a drill stem attached to a drilling bit while drilling into a geological formation.

And further, it is another object of the invention to provide methods and apparatus which allow measurement of the level of impurities present in fresh water formations through pipes which typically penetrate such fresh water formations.

Figure 1:
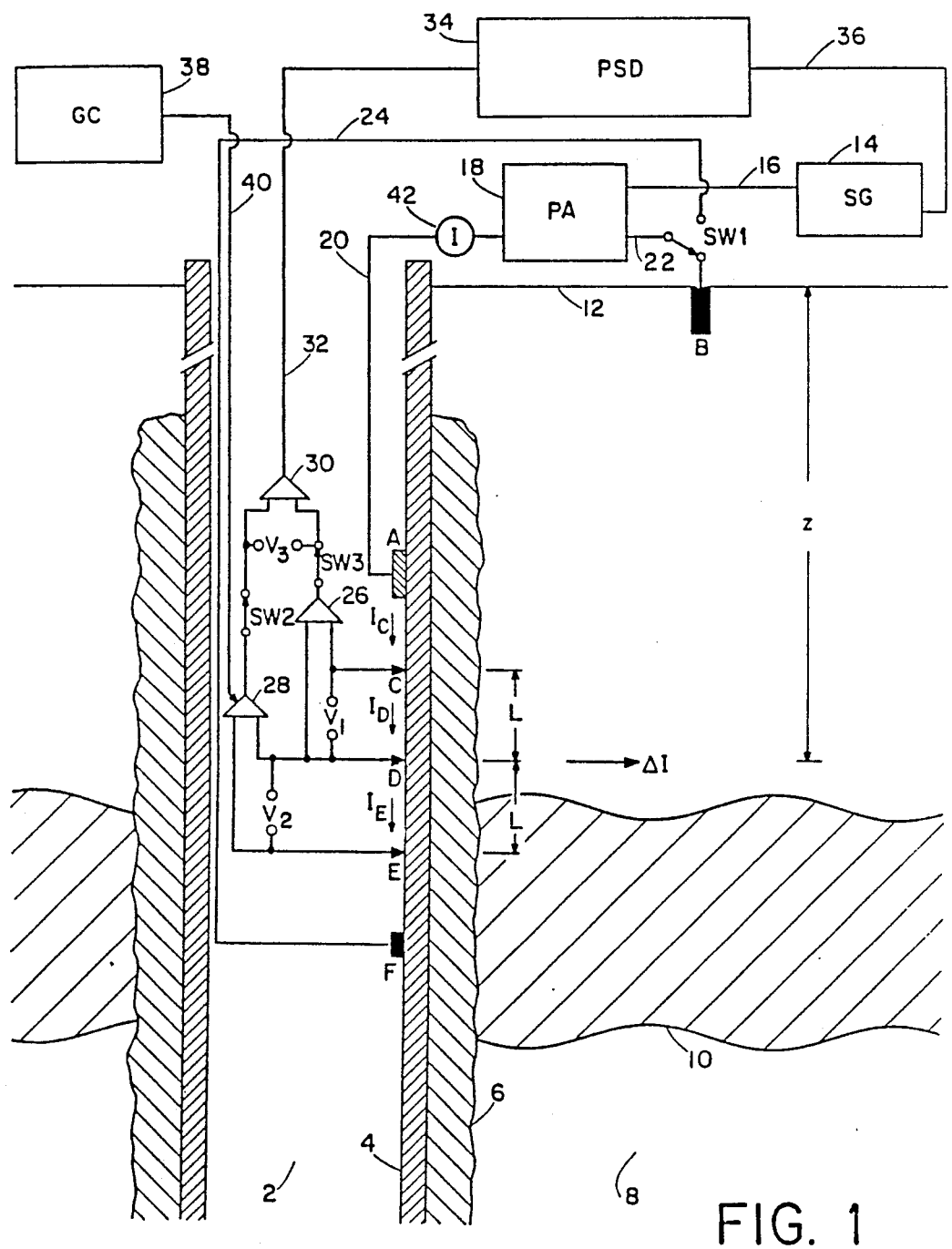
FIG. 1 is a sectional view of one preferred embodiment of the invention of the Thru Casing Resistivity Tool (TCRT).

FIG. 1 shows a typical cased borehole found in an oil field. The borehole 2 is surrounded with borehole casing 4 which in turn is held in place by cement 6 in the rock formation 8. An oil bearing strata 10 exists adjacent to the cased borehole. The borehole casing may or may not extend electrically to the surface of the earth 12. A voltage signal generator 14 (SG) provides an A.C. voltage via cable 16 to power amplifier 18 (PA). The signal generator represents a generic voltage source which includes relatively simple devices such as an oscillator to relatively complex electronics such as an arbitrary waveform generator. The power amplifier 18 is used to conduct A.C. current down insulated electrical wire 20 to electrode A which is in electrical contact with the casing. The current can return to the power amplifier through cable 22 using two different paths. If switch SW1 is connected to electrode B which is electrically grounded to the surface of the earth, then current is conducted primarily from the power amplifier through cable 20 to electrode A and then through the casing and cement layer and subsequently through the rock formation back to electrode B and ultimately through cable 22 back to the power amplifier. In this case, most of the current is passed through the earth. Alternatively, if SW1 is connected to insulated cable 24 which in turn is connected to electrode F, which is in electrical contact with the casing, then current is passed primarily from electrode A to electrode F along the casing for a subsequent return to the power amplifier through cable 22. In this case, little current passes through the earth.

Electrodes C, D, and E are in electrical contact with the interior of casing. In general, the current flowing along the casing varies with position. For example, current $I_C$ is flowing downward along the casing at electrode C, current $I_D$ is flowing downward at electrode D, and current $I_E$ is flowing downward at electrode E. In general, therefore, there is a voltage drop $V_1$ between electrodes C and D which is amplified differentially with amplifier 26. And the voltage difference between electrodes D and E, $V_2$, is also amplified with amplifier 28. With switches SW2 and SW3 in their closed positions as shown, the outputs of amplifiers 26 and 28 respectively are differentially subtracted with amplifier 30. The voltage from amplifier 30 is sent to the surface via cable 32 to a phase sensitive detector 34. The phase sensitive detector obtains its reference signal from the signal generator via cable 36. In addition, digital gain controller 38 (GC) digitally controls the gain of amplifier 28 using cable 40 to send commands downhole. The gain controller 38 also has the capability to switch the input leads to amplifier 28 on command, thereby effectively reversing the output polarity of the signal emerging from amplifier 28 for certain types of measurements.

The total current conducted to electrode A is measured by element 42. In the preferred embodiment shown in FIG. 1, the A.C. current used is a symmetric sine wave and therefore in the preferred embodiment, I is the 0-peak value of the A.C. current conducted to electrode A. (The 0-peak value of a sine wave is $\frac{1}{2}$ the peak-to-peak value of the sine wave.)

In general, with SW1 connected to electrode B, current is conducted through formation. For example, current $\Delta I$ is conducted into formation along the length 2L between electrodes C and E. However, if SW1 is connected to cable 24 and subsequently to electrode F, then no current is conducted through formation to electrode B. In this case, $I_C = I_D = I_E$ since essentially little current $\Delta I$ is conducted into formation.

It should be noted that if SW1 is connected to electrode B then the current will tend to flow through the formation and not along the borehole casing. Calculations show that for 7 inch O.D. casing with a $\frac{1}{2}$ inch wall thickness that if the formation resistivity is 1 ohm-meter and the formation is uniform, then approximately half of the current will have flowed off the casing and into the formation along a length of 320 meters of the casing. For a uniform formation with a resistivity of 10 ohm-meters, this length is 1040 meters instead.

The first step in measuring the resistivity of the formation is to "balance" the tool. SW1 is switched to connect to cable 24 and subsequently to electrode F. Then A.C. current is passed from electrode A to electrode F thru the borehole casing. Even though little current is conducted into formation, the voltages $V_1$ and $V_2$ are in general different because of thickness variations of the casing, inaccurate placements of the electrodes, and numerous other factors. However, the gain of amplifier 28 is adjusted using the gain controller so that the differential voltage $V_3$ is nulled to zero. (Amplifier 28 may also have phase balancing electronics if necessary to achieve null at any given frequency of operation.) Therefore, if the electrodes are subsequently left in the same place after balancing for null, spurious effects such as thickness variations in the casing do not affect the subsequent measurements.

With SW1 then connected to electrode B, the signal generator drives the power amplifier which conducts current to electrode A which is in electrical contact with the interior of the borehole casing. A.C. currents from 1 amp 0-peak to 30 amps 0-peak at a frequency of typically 1 Hz is introduced on the casing here. The low frequency operation is limited by electrochemical effects also known as polarization phenomena and the invention can probably be operated down to 0.1 Hz and the resistivity still properly measured. The high frequency operation is limited by skin depth effects of the casing, and an upper frequency limit of the invention is probably 20 Hz for resistivity measurements. Current is subsequently conducted along the casing, both up and down the casing from electrode A, and some current passes through the brine saturated cement surrounding the casing and ultimately through the various resistive zones surrounding the casing. The current is then subsequently returned to the earth's surface through electrode B.

One purpose of the invention is to sense changes in the resistivity of formations adjacent to the borehole and to measure such changes through borehole casing. In many cases, water bearing zones have resistivities of approximately 1 ohm-meter and oil bearing zones have higher resistivities on the order of 10 ohm-meters. The device can measure such a difference through borehole casing, and through brine saturated cement surrounding the casing as is shown by the following analysis.

The downward flowing current below electrode A in FIG. 1 gives raise to a voltage drop along the length of the casing. The voltage along the casing is measured at electrodes C, D, and E respectively where the electrodes are separated by equal lengths L. The resistance per unit length of 7 inch O.D. casing with a wall thickness of ½ inch, r, is given by the following:

$$r = 1.4 \times 10^{-5} \text{ ohms/meter} \quad \text{Eq. 1}$$

The voltage difference generated by a current $I_C$ at electrode C and $I_D$ at electrode D is approximately the average of the two currents times the resistance per unit length, r, times the length L so that:

$$V_1 = (I_C + I_D)rL/2 \quad \text{Eq. 2}$$

And consequently, $V_2$ is given by the following:

$$V_2 = (I_D + I_E)rL/2 \quad \text{Eq. 3}$$

The difference between $V_1$ and $V_2$ produced by amplifier 30 with switches SW2 and SW3 closed is given by the following (all amplifiers have unity gain for the purpose of simplicity):

$$V_3 = V_1 - V_2 = (I_C - I_E)rL/2 \quad \text{Eq. 4}$$

The net 0-peak current $\Delta I$, flowing into the formation along the length of 2L is given by the following:

$$\Delta I = I_C - I_E = (2V_3)/(rL) \quad \text{Eq. 5}$$

The resistance $R_c$ of a cylindrical electrode of length 2L and of diameter d in contact with a formation of resistivity $\rho$ is given by the following (*Earth Resistances*, G. F. Tagg, Pitman Publishing Corporation, N.Y., 1964, p. 96):

$$R_c = \rho Ln(4L/d)/(4\pi L) \quad \text{Eq. 6}$$

Therefore, if $R_c$ can be measured, then $\rho$ can be computed from Eq. 6 as follows:

$$\rho = 4\pi L R_c / Ln(4L/d) \quad \text{Eq. 7}$$

The voltage applied to the casing at electrode A causes the casing to achieve a voltage difference $V_o$ between the casing near electrode A and an electrode at infinity as will be discussed shortly. How to measure $V_o$ will also be addressed shortly. The current $\Delta I$ flowing into formation from the pipe over the length 2L is also known from Eq. 5, so $R_c$ is experimentally given as follows:

$$R_c = V_o/\Delta I \quad \text{Eq. 8}$$

Consequently, the resistivity of the formation adjacent to the borehole over length 2L is given as follows:

$$\rho = 4\pi L V_o/(\Delta I Ln[4L/d]) \quad \text{Eq. 9}$$

The quantity $\Delta I$ is given by Eq. 5, and therefore Eq. 9 becomes the following:

$$\rho = 2\pi r V_o L^2 / (V_3 Ln[4L/d]) \quad \text{Eq. 10}$$

The experimentally measured parameters are $V_o$, the voltage applied to the casing at electrode A, the differential voltage $V_3$ measured with the phase sensitive detector, and I, the 0-peak current conducted into formation.

Figure 2:
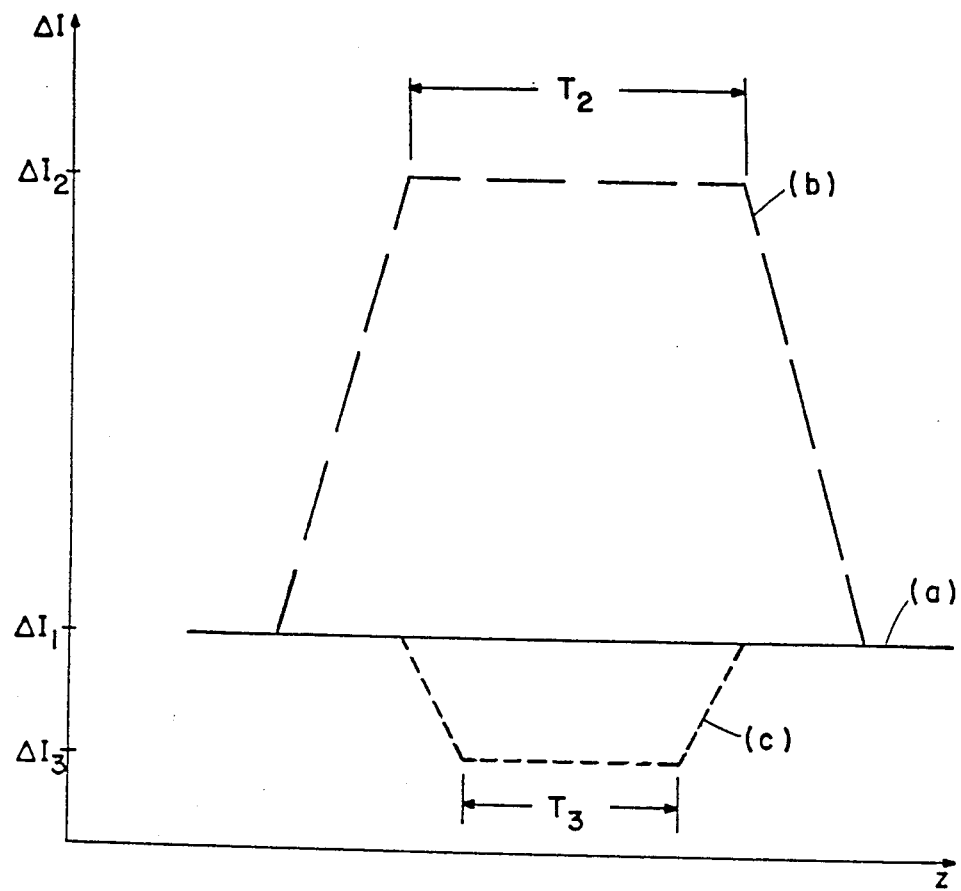
FIG. 2 is a graph which shows the differential current conducted into formation $\Delta I$ for different vertical positions Z of the borehole casing.

FIG. 2 shows the differential current conducted into formation $\Delta I$ for different vertical positions z within a steel cased borehole. z is defined as the position of electrode D in FIG. 1. It should be noted that with a voltage applied to electrode A and with SW1 connected to electrode B that this situation consequently results in a radially symmetric electric field being applied to the formation which is approximately perpendicular to the casing. The electrical field produces outward flowing currents such as $\Delta I$ in FIG. 1 which are inversely proportional to the resistivity of the formation. Therefore, one may expect discontinuous changes in the current $\Delta I$ at the interface between various resistive zones particularly at oil/water and oil/gas boundaries. For example, curve (a) in FIG. 2 shows the results from a uniform formation with resistivity $\rho_1$. Curve (b) shows departures from curve (a) when a formation of resistivity $\rho_2$ and thickness $T_2$ is intersected where $\rho_2$ is less than $\rho_1$. And curve (c) shows the opposite situation where a formation is intersected with resistivity $\rho_3$ which is greater than $\rho_1$ which has a thickness of $T_3$. It is obvious that under these circumstances, $\Delta I_3$ is less than $\Delta I_1$, which is less than $\Delta I_2$.

Figure 3:
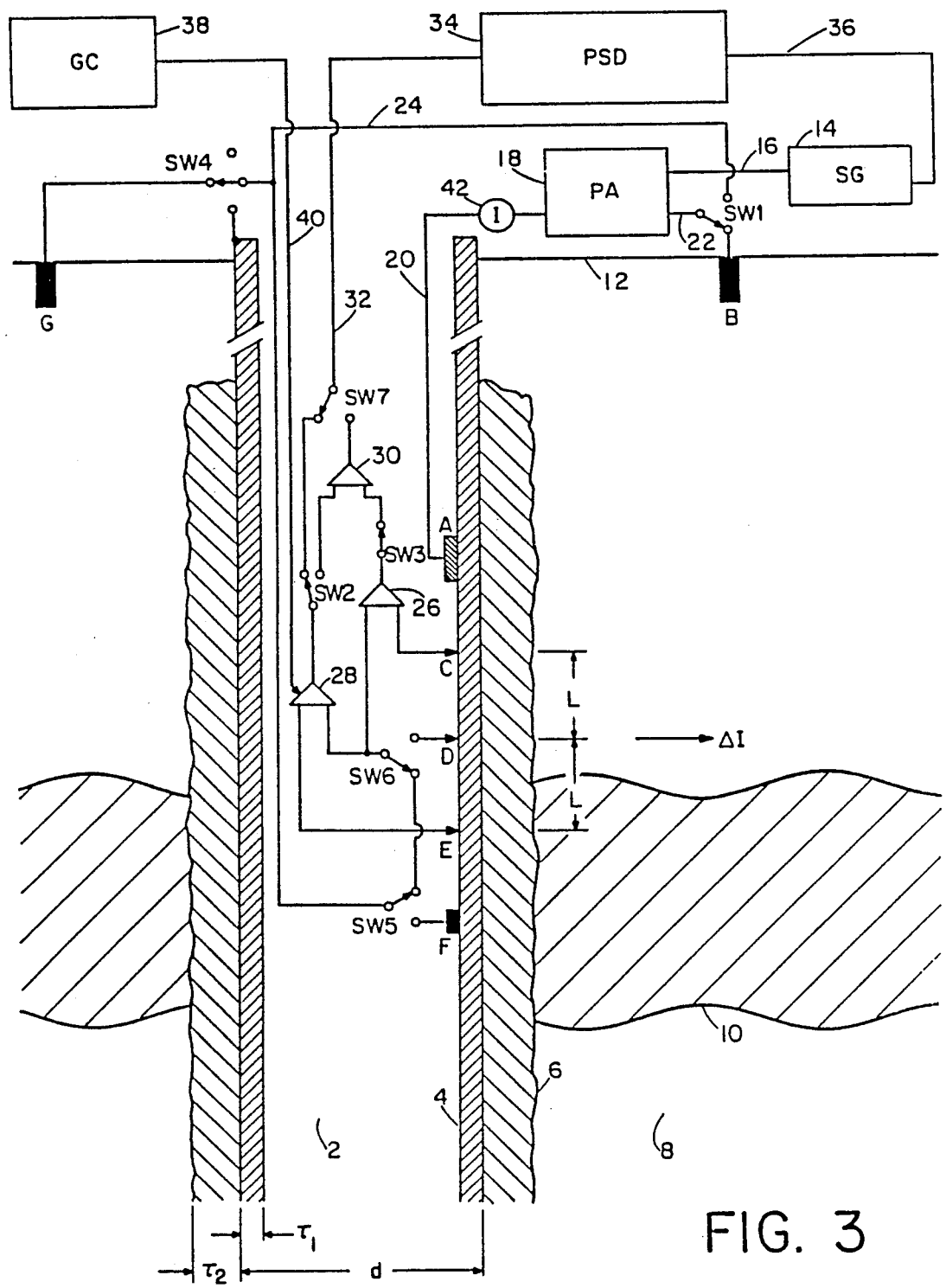
FIG. 3 is a sectional view of the preferred embodiment of the invention which shows how the local casing potential $V_o$ is to be measured.

FIG. 3 shows a detailed method to measure the parameter $V_o$. Electrodes A B, C, D, E, and F have been defined in FIG. 1. All of the numbered elements 2 through 40 have already been defined in FIG. 1. In FIG. 3, the thickness of the casing is $\tau_1$, the thickness of the cement is $\tau_2$, and d is the diameter of the casing. Switches SW1, SW2, and SW3 have also been defined in FIG. 1. In addition, electrode G is introduced in FIG. 3 which is the voltage measuring reference electrode which is in electrical contact with the surface of the earth. This electrode is used as a reference electrode and conducts little current to avoid measurement errors associated with current flow.

In addition, SW4 is introduced in FIG. 3 which allows the connection of cable 24 to one of the three positions: to an open circuit; to electrode G; or to the top of the borehole casing. And in addition in FIG. 3, switches SW5, SW6, and SW7 have been added which can be operated in the positions shown. (The apparatus in FIG. 3 can be operated in an identical manner as that shown in FIG. 1 provided that switches SW2, SW5, SW6, and SW7 are switched into the opposite states as shown in FIG. 3 and provided that SW4 is placed in the open circuit position.)

With switches SW2, SW5, SW6, and SW7 operated as shown in FIG. 3, then the quantity $V_o$ may be measured. For a given current I conducted to electrode A, then the casing at that point is elevated in potential with respect to the zero potential at a hypothetical point which is an "infinite" distance from the casing. Over the interval of the casing between electrodes C, D, and E in FIG. 3, there exists an average potential over that interval with respect to an infinitely distant reference point. However, the potential measured between only electrode E and electrode G approximates $V_o$ provided the separation of electrodes A, C, D, and E are less than some critical distance such as 10 meters and provided that electrode G is at a distance exceeding another critical distance from the casing such as 10 meters from the borehole casing. The output of amplifier 28 is determined by the voltage difference between electrode E and the other input to the amplifier which is provided by cable 24. With SW1 connected to electrode B, and SW4 connected to electrode G, cable 24 is essentially at the same potential as electrode G and $V_o$ is measured appropriately with the phase sensitive detector 34. In many cases, SW4 may instead be connected to the top of the casing which will work provided electrode A is beyond a critical depth which will be discussed in detail shortly.

Another issue concerning the operation of the tool is the radial depth of investigation of the tool. The depth of investigation depends upon the distance of separation between the measurement electrodes (the distance L in FIG. 1), the resistivity and geometry of the casing, the resistivity of the adjacent geological formation, and perhaps on the resistivity of remote formations as well. However, since the geometry of the invention resembles focused current arrays used in open holes which have routine radial penetrations of typically 2 feet or more, this tool will have a similar depth of penetration provided that the separations of the electrodes are approximately 1 meter. The distance of separation of the measurement electrodes can be changed to vary the effective radial penetration of the tool for purposes which will be described later.

Certain particle aspects of the design of the tool have so far been neglected because they are common in the industry, and their solutions are also common place in the industry. For example, if the signal is sent to the surface in analogue form over wireline 32 as shown in FIG. 1, then the voltage level from amplifier 30 should be adjusted so that it is large compared to the voltage induced into wireline 32 by downward flowing currents on wireline 20. If this proves to be a problem, then digital communication techniques commonly used in the industry can be employed instead. An in addition, the resistances of the wirelines have been neglected in the analysis, but said resistances produce only relatively small and predictable influences on the operation of the invention. It is assumed that ordinary art in the industry will be employed in the design of the downhole tool.

For the purposes of precise written descriptions of the invention, electrode A is the upper current conducting electrode which is in electrical contact with the interior of the borehole casing; electrode B is the current conducting electrode which is in electrical contact with the surface of the earth; electrodes C, D, and E are voltage measuring electrodes which are in electrical contact with the interior of the borehole casing; electrode F is the lower current conducting electrode which is in electrical contact with the interior of the borehole casing; and electrode G is the voltage measuring reference electrode which is in electrical contact with the surface of the earth.

Furthermore, $V_o$ is called the local casing potential. An example of an electronics difference means is the combination of amplifiers 26, 28 and 30. The differential current conducted into the formation to be measured is $\Delta I$, and the differential voltage to be measured in $V_3$. The measurement state of the apparatus is defined as that state of the apparatus wherein current is conducted from electrode A to electrode B. In the measurement state of the apparatus, electrode F is disconnected from the circuit. And the calibration state of the apparatus is defined as that state of the apparatus wherein current is conducted from electrode A to electrode F. In the calibration state of the apparatus, electrode B is disconnected from the circuit. It should probably be noted that the calibration state of the apparatus essentially provides a measurement of the resistance of the length of borehole casing adjacent to the formation to be measured which is not substantially affected by the surrounding geological formation.

To further aid in understanding the invention, several preferred embodiments of the apparatus are comprised of several "Fundamental Elements" defined as Fundamental Elements (A), (B), and (C) respectively. Several of the preferred embodiments of the invention are comprised of different combinations of such elements. These elements are defined as follows:

Fundamental Element (A) is a means to cause current to flow from an electrode in electrical contact with the interior of the borehole casing at any depth (electrode A) to an electrode in electrical contact with the surface of the earth (electrode B);

Fundamental Element (B) is at least two pairs of voltage measurement electrodes disposed along the borehole casing which are in electrical contact with the casing (pair CD and pair DE), each pair of said electrodes being the source of a voltage output ($V_1$ and $V_2$) resulting from the total current flow between each of the two voltage measurement electrodes and the resistance of the casing between the two electrodes of each pair, and electronics means which takes the voltage difference between the two individual voltage outputs of the individual voltage measurement electrode pairs producing a true differential voltage (output of amplifier 30) which is a direct measurement of the differential current conducted from the casing into the geological formation over the length of the casing between said sets of electrode pairs; and Fundamental Element (C) is an additional electronics means which produces zero output in the true differential voltage if identical currents are flowing between the electrodes of each voltage measuring electrode pair which happens when current is conducted between two additional current source electrodes which are located on alternate sides of said voltage measurement electrode pairs (such as when current is conducted between electrode A and electrode F when SW1 is connected to cable 24 in FIG. 1) even when the voltage measurement electrodes are separated by different distances and are used in the presence of rusted and corroded casing wherein the resistivity of the casing is expected to be nonuniform. (It will be appreciated that an actual null in the differential output is not necessary, and any other constant number could have been chosen instead, and the data suitably corrected. However, a "zero" for the differential output is simple to interpret.)

Figure 4:
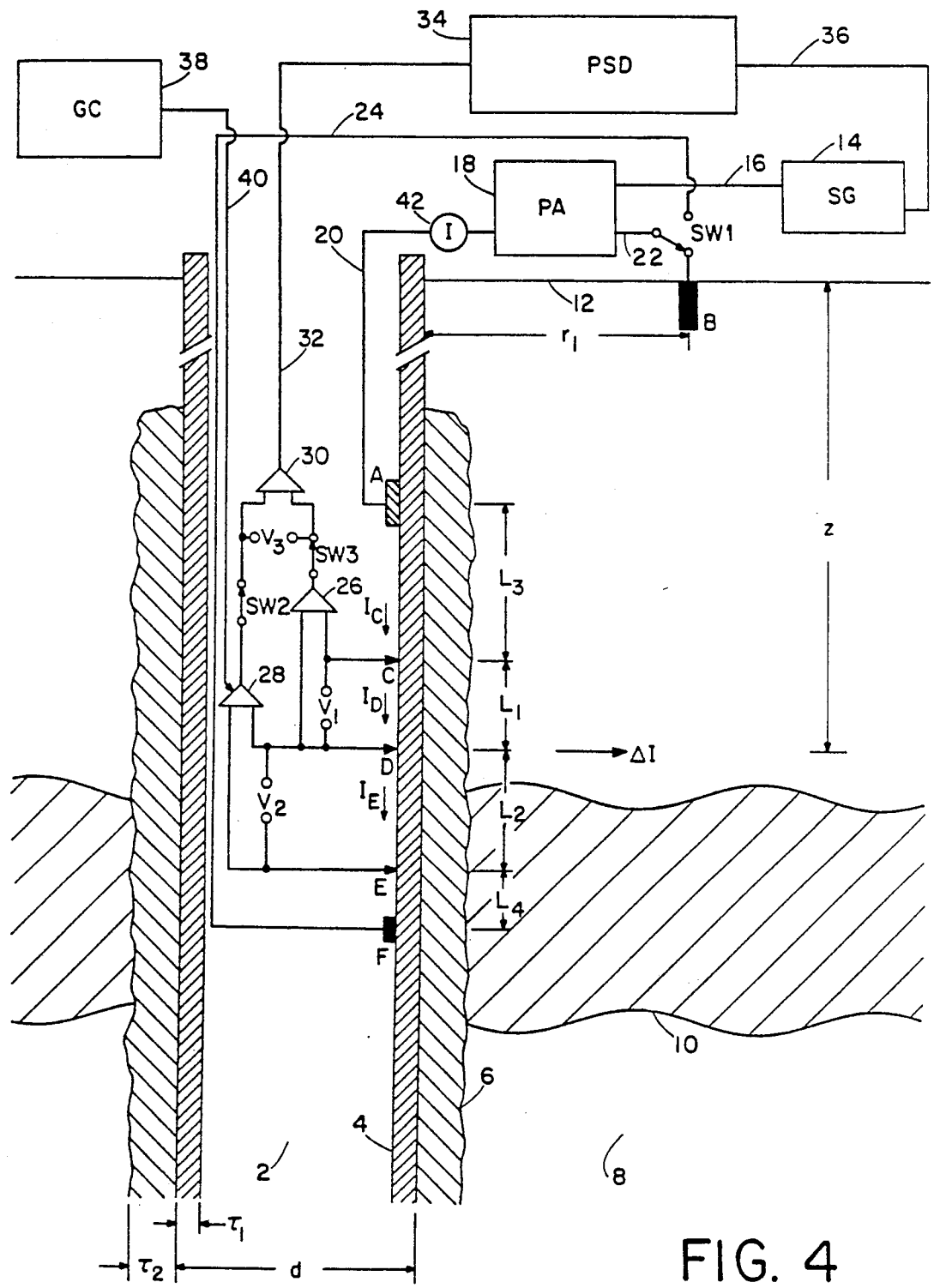
FIG. 4 is a sectional view of an embodiment of the invention which has voltage measurement electrodes which are separated by different distances.
Figure 5:
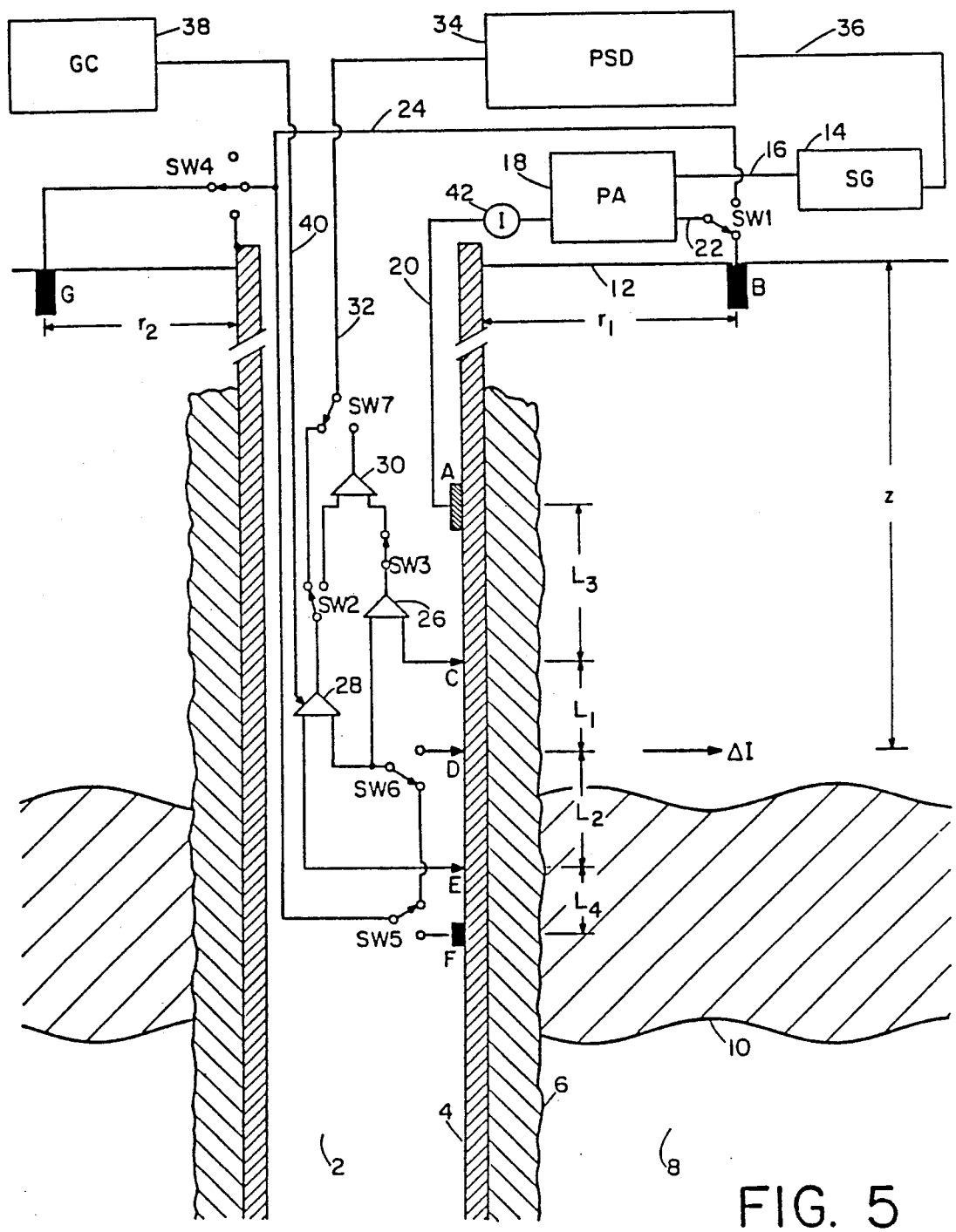
FIG. 5 is a sectional view of an embodiment of the invention which has electrodes which are separated by different distances which shows explicitly how to measure $V_o$.

The reason why these three different requirements are important in these several preferred embodiments depends on an understanding of how current flows on borehole casing as shown in FIGS. 1 and 3. Confusion over this fundamental issue has resulted in a number of U.S. patents which will not provide accurate measurements of formation resistivity through borehole casing. To present this information, it is convenient to define additional distances between electrodes. FIG. 4 is nearly identical to FIG. 1 except the electrodes C and D are separated by length $L_1$, electrodes D and E are separated by $L_2$, electrodes A and C are separated by $L_3$ and electrodes E and F are separated by the distance $L_4$. In addition, $r_1$ is the radial distance of separation of electrode B form the casing. And z is the depth from the surface of the earth to electrode D. FIG. 5 is nearly identical to FIG. 3 except here too the distances $L_1$, $L_2$, $L_3$, $L_4$, $r_1$, and $z$ are explicitly shown. In addition, $r_2$ is also defined which is the radial distance from the casing to electrode G. As will be shown explicitly in later analysis, the invention will work well if $L_1$ and $L_2$ are not equal. And for many types of measurements the distances $L_3$ and $L_4$ are not very important provided that they are not much larger in magnitude than $L_1$ and $L_2$.

Figure 6:
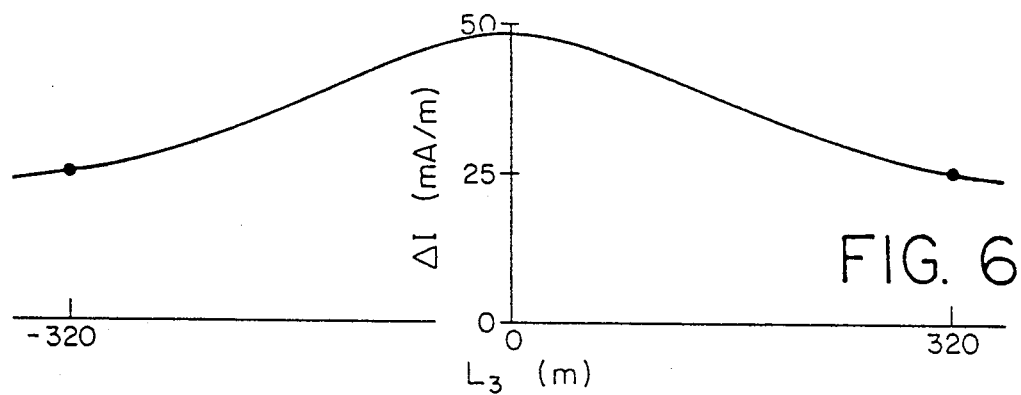
FIG. 6 is a plot of $\Delta I$ vs. $L_3$ which is the distance of separation between electrode A and electrode C for a geological formation.
Figure 7:
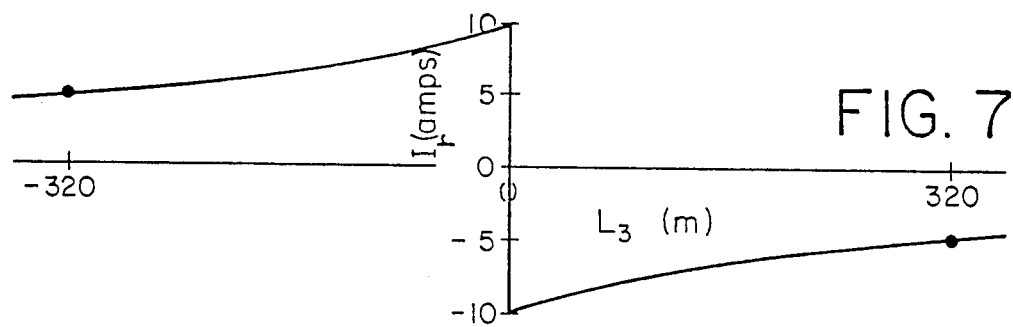
FIG. 7 shows a plot of the total current $I_r$ remaining on the casing vs. $L_3$ for a geological formation.
Figure 8:
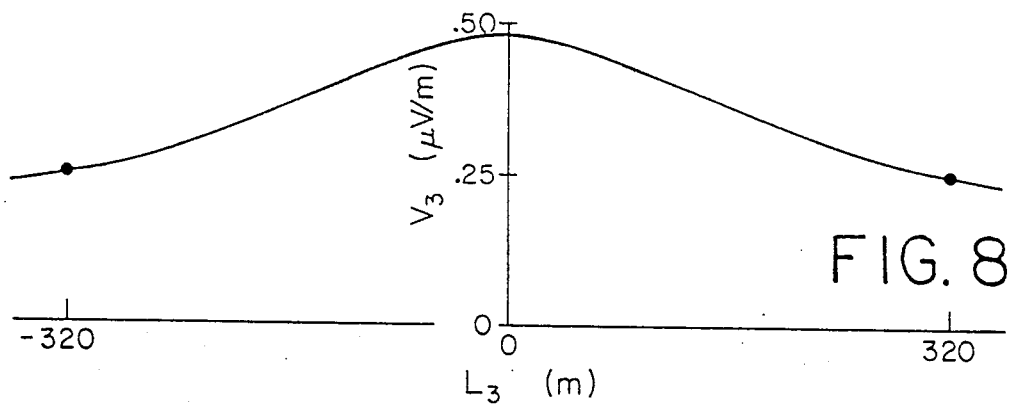
FIG. 8 shows a plot of the differential voltage $V_3$ vs. $L_3$ for a geological formation.
Figure 9:
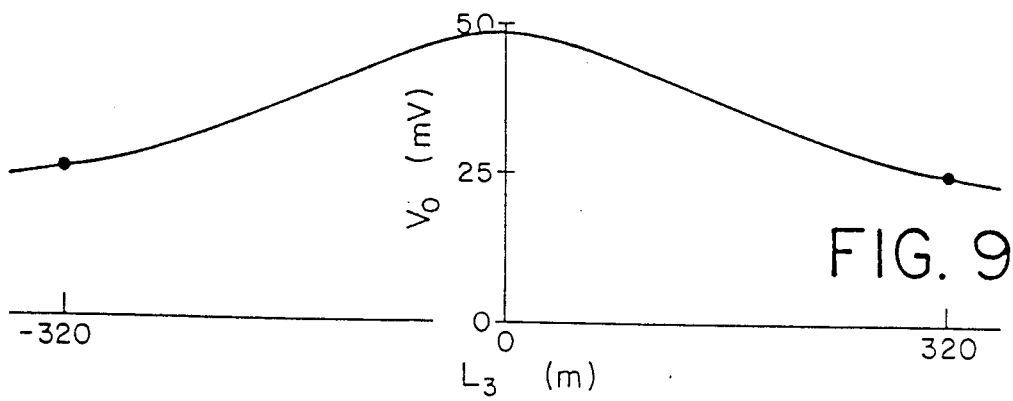
FIG. 9 shows a plot of $V_o$ vs. $L_3$ for a geological formation.

The following results are presented for a 7 inch O.D. casing which has a ½ inch thick wall which is adjacent to a 1 ohm-meter formation which is infinite in extent and which is uniform. The current I conducted to electrode A is 20 amps 0-peak. For the purposes of simplicity in FIGS. 4 and 5, let us suppose that $L_1=L_2=\frac{1}{2}$ meter so that $\Delta I$ is the current loss per meter into the geological formation. Accordingly, FIG. 6 shows $\Delta I$ vs. $L_3$. Typically, 50 milliamps per meter (mA/m) are lost into the formation in the vicinity of electrode A for a 1 ohm-meter formation. In this analysis, $L_3 << z$. For $L_3$ positive, then electrodes C, D, E, and F are below electrode A. For $L_3$ negative, electrodes C, D, E, and F are above electrode A which are disposed in the obvious mirror image relationship to the positions shown in FIGS. 4 and 5. FIG. 7 shows the current in amps still remaining on the casing ($I_r$) after a distance of $L_3$ from electrode A. (In FIG. 7, positive current is defined as current flowing up the casing.) FIG. 8 shows the typical differential voltage $V_3$ in microvolts per meter (uV/m) for various distances $L_3$ away from electrode A. And FIG. 9 shows the local casing potential, $V_o$, in millivolts (mV) for different distances $L_3$ away from electrode A.

The experimental problem here is measuring the very small current loss of perhaps 50 mA 0-peak/meter into the geological formation out of perhaps 10 amps 0-peak flowing along the casing. The casing has a resistance of about $10^{-5}$ ohms/meter, so that the 10 amps 0-peak flowing between electrodes C and D would generate a voltage of 100 uV 0-peak but the 50 mA 0-peak "lost" or conducted into formation between electrodes C and D would produce a voltage different of only 0.5 uV 0-peak (1 uV = 1 microvolt). A change of 0.5 uV 0-peak out of 100 uV 0-peak cannot be accurately measured using only electrodes C and D, particularly since the casing has a variable thickness due to oxidation effects. However, if the voltage difference between electrode pairs CD and DE is taken, then the large "common mode" voltage of 100 uV 0-peak is subtracted out. This is why two sets of electrodes are used to produce a true differential measurement of the current conducted into formation. This is the reason for "Fundamental Element (B)" above in one embodiment of the invention. Most of the prior art does not provide a means to get rid of this large "common mode" signal.

The cause of the current being conducted into formation is the existence of an electric field perpendicular to the casing which points radially outward into the formation. After solving the electrodynamics of this problem, and performing experiments in a salt water tank, it is clear that if electrode B makes good electrical contact with the earth, its exact position isn't important provided that it is "far away". What happens is that no matter where electrode B is, provided that it is "far away", an electric field exists approximately perpendicular to the casing at depth causing a certain current $\Delta I$ to flow into the geological formation along the length $2L$ of the casing. How the placement of electrode B affects the electric field on the exterior of the casing and the requirement that it be "far away" are addressed further in FIG. 24. However, as long as electrode B is placed in a position such that current flows into the geological formation adjacent to the casing which is energized by electrode A, the invention will function properly. Therefore, the requirement to conduct current into formation is satisfied by "Fundamental Element (A)" of the invention.

"Fundamental Element (C)" of one embodiment of the invention provides immunity to variations in the thickness of the borehole casing. Although this Fundamental Element (C) may not be absolutely necessary under all circumstances to make the invention functional, it will produce more accurate results than without it. To show why Fundamental Element (C) is important, consider a real problem where the casing is partially oxidized and the electrodes are not separated by equal distances. Suppose electrodes C and D as shown in FIGS. 4 and 5 are separated by the distance $L_1$ and suppose the average resistance per unit length in that portion of the casing is $r_1$. And similarly, the distance $L_2$ separates electrodes D and E in FIGS. 4 and 5 and that portion of the casing has an average resistance per unit length of $r_2$. Suppose further that the gains of amplifiers 26, 28, and 30 are respectively $a_1$, $a_2$, and $a_3$ and are calibrated to 2%. And suppose the voltage outputs of amplifiers 26, 28, and 30 are respectively $V_{10}$ I, $V_{20}$, and $V_{30}$. Initially, SW1 is connected to cable 24 as shown in FIG. 4 and current is conducted from electrode A to electrode F. Then, the current $I_0$ is adjusted until $V_{30}$ is equal to a pre-chosen constant K. Then, if SW2 is open:

$$V_{30} = a_1 a_3 r_1 L_1 I_0 = K \qquad \text{Eq. 11}$$

so that:

$$r_1 L_1 = K/(I_0 a_1 a_3) \qquad \text{Eq. 12}$$

Now suppose SW2 is closed, and the gain of amplifier 28 is adjusted until $V_{30}=0$. Then:

$$V_{30} = 0 = (a_1 r_1 L_1 I_0 - a_2 r_2 L_2 I_0) a_3 \qquad \text{Eq. 13}$$

or, then:

$$r_2 L_2 = K/(I_0 a_2 a_3) \qquad \text{Eq. 14}$$

Now suppose SW1 is connected to electrode B, and approximately equal currents are conducted into formation as follows: $\Delta I/2$ between C and D and $\Delta I/2$ D and E. Using Equations 2 and 3, then, $V_{30}$ becomes the following:

$$V_{30} = a_1 a_2 V_1 - a_2 a_3 V_2 \qquad \text{Eq. 15}$$

$$= K \Delta I/2 I_0 \qquad \text{Eq. 16}$$

And finally, therefore we have $\Delta I$ given as follows:

$$\Delta I = 2 V_{30} I_0 / K \qquad \text{Eq. 17}$$

Measurements of $V_o$ defined in Eq. 8 then allows computation of the resistivity of the adjacent formation using Eqs. 17 and 9. Therefore, even through slightly different lengths of casing where used, which have different resistances per unit length, since $I_o$ is known and K is chosen, $\Delta I$ may be accurately measured. This is the reason for "Fundamental Element (C)" of the invention. It should be noted that the resistance per unit length of the casing can probably vary over 30%, and therefore this feature is essential for measuring 50 mA 0-peak conducted into formation out of the many amps being conducted along the casing especially if the casing is rusted and corroded. Differences in $L_1$ and $L_2$ can be expected in the range of 1%–5%.

In summary therefore, one embodiment of the invention is succinctly described as a working combination of Fundamental Elements (A) and (B). In addition, another embodiment of the invention may also be succinctly described as a working combination of Fundamental Elements (A), (B), and (C).

As was mentioned previously, the invention measures the resistivity of geological formations directly over a certain frequency interval. At low frequencies, innumerable varieties of electrochemical phenomena collectively referred to as "polarization phenomena" dominate measurements, and can cause extra interpretation problems discerning the resistivity of the formation. And at high frequencies, skin depth limitations of the casing cause difficulties with measurements. These issues will be addressed separately below.

The resistivity measurements in geological formations are predominately influenced by the amount of connate water inside the pores of the rock structure present. This connate water is mostly composed of water and NaCl but numerous other impurities may be present. (See for example, *The Properties of Petroleum Fluids*, by William D. McCain, Jr., PennWell Publishing Company, Tulsa, Okla., 1973, Chapter 6.) Other relatively minor concentrations of Ca, Mg, $SO_4$, and $HCO_3$ are also commonly found along with traces of many other elements and compounds. Therefore, electrical conduction through rock formations is primarily dominated by the electrical conduction by salt water solutions. Any oil present, of course, acts like a relatively insulating fluid. See for example, "Essentials of Modern Open-Hole Log Interpretation, John T. Dewain, PennWell Publishing Company, Tulsa, Okla., 1983, Chapter 2. Salt water solutions primarily conduct electricity via chemical reactions which proceed at the anode and cathode respectively of the electrodes at any instant in time. (When electrode A is positive with respect to electrode B, it is an anode, and when negative, it is a cathode. When an A.C. voltage is applied to electrode A, it alternates between being the anode and cathode with the period of the applied voltage waveform.)

Typical anode and cathode reactions responsible for current flow in salt water are described in *General Chemistry*, by Linus Pauling, W. H. Freeman and Company, San Francisco, Second Ed., 1953, pp. 206–209. The instantaneous anode reaction involves the evolution of oxygen gas as follows:

$$2\ H_2O \rightarrow O_2 \uparrow + 4H^+ + 4e^- \qquad \text{Eq. 18}$$

And the instantaneous cathode reaction involves the evolution of hydrogen gas as follows:

$$2e^- + 2H_2O \rightarrow H_2 \uparrow + 2OH^- \qquad \text{Eq. 19}$$

A concern which arises in resistivity measurements is whether the nature of the impurities present affect the dominant type of chemical reactions observed. In fact, Pauling (ibid.) states on p. 208 that ". . . the electrode reactions are the same for most dilute aqueous electrolytic solutions, and even for pure water as well." However, the resistance to current flow comes from the bulk resistivity of the liquid to ionic conduction under ideal circumstances.

There are various types of electrochemical reactions and processes at electrodes which are collectively described as "polarization phenomena" by various authors. When measuring the current vs. voltage relationships between electrodes in an electrochemical cell (analogous to electrodes A and B in the invention), there are numerous factors to consider in interpreting the data. For example, there are ohmic losses, disassociation voltages, "concentration overpotential", and, "activation overpotential" effects to consider (*Electrochemistry at Solid Electrodes*, Ralph N. Adams, Marcel Dekker, Inc., New York, 1969, p. 13). In general terms, concentration overpotential results from non equilibrium distributions of chemical reactants near the electrodes. And the activation overpotential is related to the chemical reactions themselves which may involve the electrode materials. Ralph Adams define polarization phenomena to include concentration overpotentials and activation overpotentials associated with the electrodes.

It is typical to discuss current vs. voltage relationships between two electrodes in standard chemistry texts. In *Electrode Processes and Electrochemical Engineering*, authored by Fumio Hine, Plenum Press, New York, 1985, p. 97, the voltage difference between two electrodes in an electrochemical cell is defined figuratively as follows:

$$V_t = E_d + n_a - n_c + IR \text{ (solution)} + IR \text{ (metal)} \qquad \text{Eq. 20}$$

$V_t$ is the voltage output of the cell; $E_d$ is the voltage in the cell in the absence of any current flow; $n_a$ is the "overvoltage" effect for the anode and $n_c$ is the "overvoltage" effect for the cathode; the term IR (solution) is the ohmic voltage drop due to a predominantly ionic conduction in the solution; and IR (metal) is the voltage drop due to electronic conduction in the electrodes. It should be stated perhaps that $V_t$ is the output voltage when the cell is forced to conduct current I through it by application of another applied voltage to the cell. For future reference, $n_a$ and $n_c$ shall be called polarization phenomena as well.

In describing current flow between electrodes A and B in FIG. 1, if electrode B is made out of the same material as the casing, and is in contact with a salt solution deliberately mixed up to approximate the salinity of the water downhole, then ideally $E_d$ in Eq. 20 would be zero volts. In any case, it does not change with the applied current and therefore doesn't affect measurements of the resistivity. The term IR (solution) is what the invention is designed to measure and it does so by measuring the ohmic losses in the casing (analogous to IR (metal)). However, the measurement of the resistivity must be performed in such a manner that polarization phenomena do not dominate measurement of the resistivity.

One simple example of a polarization phenomenon is the set of electrochemical processes which results in the formation of gasses on electrodes. In the case at hand, oxygen is formed at the anode and hydrogen is formed at the cathode. If sufficient current densities are conducted from the casing to electrode B, then it is possible that gasses could build up on both the casing and electrode B. Since the polarity is reversed when measuring resistivity (A.C. voltage is used) then the casing casts alternatively as an anode and then a cathode, so that in principle, mixtures of hydrogen and oxygen would appear on the casing in time. Similarly, gasses would form on electrode B. Ultimately, the casing in the vicinity of electrodes A and electrode B itself could become covered with gasses. Then, for a given total current of I conducted through formation, $\Delta I$ in the vicinity of electrode A and $V_3$ could become nearly zero since gasses would not permit conduction into the formation near electrode A. Furthermore, for a given total current I, much higher voltages $V_0$ would have to be applied to conduct the same $\Delta I$ into formation since electrode B could become entirely covered with gasses. This is an extreme example of a polarization effect related to a concentration gradient, and here, the concentration gradient is caused by gas build-up.

This type of polarization effect is strongly dependent on the current density at the electrode. This is typically the case, and for more information and a plot of this type of overvoltage or polarization effect vs. current density, please refer to *Physical Chemistry*, Walter J. Moore, Prentice-Hall, Inc., Englewood Cliffs, N.J., 1962, p. 406. In the invention, such an effect would produce non-linear relationships between $V_3$ vs. I, $\Delta I$ vs. I, $V_3$ vs. $V_o$ and $\Delta I$ vs. $V_o$.

In addition, such as polarization effect would not stay stable in time. Therefore, if a constant current I were conducted between electrodes A and B, $V_3$ would probably decrease in time. And since this polarization effect is strongly dependent upon the current density, plots of $V_3$ vs. time for two values of I would again demonstrate that this type of polarization effect was influencing the data.

In addition, if the current conducted through formation is high enough, then it is possible to produce concentration gradients in the NaCl and water near the electrodes. Concentration polarization phenomena are discussed by Walter J. Moore (ibid., pp. 408–413). Such phenomena are also discussed explicitly for NaCl in water in Adams (op.cit. pp. 3–11). Such phenomena would affect resistivity data in similar non-linear fashions as described above. And in addition, many other polarization type phenomena are discussed by example in *Industrial Electrochemistry*, Derek Pletcher, Chapman and Hall, New York, 1982, FIG. 1.1. Please also refer to *The Chemistry of Electrode Processes*, by Ilana Fried, Academic Press, New York, 1973, p. 22, for another list of "overvoltage" or polarization phenomena.

In addition, the orientation of the polar water molecules in the applied electric field from the casing and electrode B certainly would also be described as another class of polarization phenomena. Such effects can be effectively described in terms of the capacitance of electrodes in the presence of dielectric materials. For a clear explanation of such phenomena, the reader is referred to *Physics for Students of Science and Engineering*, Part II, authored by David Halliday, et al., John Wiley & Sons, Inc., New York, Second Edition, 1962, Sections 30-3, 30-4, 30-5, 30-6, and 30-7. In such cases, dynamic polarization effects are larger at lower frequencies since low frequencies provide longer "alignment times" which could be used to distinguish this effect from others.

In general, many polarization phenomena result in non-linear relationships between $V_3$ or $\Delta I$ vs. either $V_o$ or I. And all other things being equal, polarization phenomena are larger at lower frequencies because such low frequencies allow polar molecules to orient in applied fields, allow for preferential gas build-up on the electrodes, and also allow the time necessary to produce concentration gradients in solution. At higher frequencies on the other hand, the skin effect of the casing interferes with the interpretation of resistivity data.

As the frequency of the current I is increased, then eventually a frequency will be reached when most of the current simply flows from electrode A up the inside of the casing to the surface for a return to electrode B. This is caused by the skin effect of the pipe. The skin effect causes an exponential attenuation of the electric field applied across the thickness of the steel casing, where the electrical field is attenuated as follows:

$$\zeta = \zeta_o e^{-(\tau 1/\delta)} \qquad \text{Eq. 21}$$

The electric field $\zeta_o$ is that applied to the inside of the casing by electrode A, $\zeta$ is the field immediately outside the pipe, $\tau_1$ is the thickness of the pipe, and $\delta$ is the skin depth given by the following:

$$\delta = (\pi f u \sigma)^{-\frac{1}{2}} \qquad \text{Eq. 22}$$

Here, f is the frequency in Hz, u is the magnetic permeability, and $\sigma$ is the conductivity of the material. (Please refer to *Fields and Waves in Communication Electronics*, Simon Ramo, et al., Second Edition, John Wiley & Sons, 1984, p. 149). Typical steel in borehole casing has a relative permeability of 100, and the resistivity ($1/\sigma$) of typical steel is 10 micro-ohm-cm. Therefore the above formula becomes:

$$\delta = (0.62//^{\frac{1}{2}}) \text{ inches} \qquad \text{Eq. 23}$$

The critical frequency is the frequency where the skin depth equals the thickness of the pipe in question. The critical frequency for a 0.50 inch wall thickness is 1.54 Hz. The critical frequency for a 0.375 inch wall thickness is 2.73 Hz. Typically casing has wall thicknesses between 0.25; and 0.50 inches. If the frequency of operation is significantly less than the critical frequency, then the results for resistivity measurements need not be corrected for skin depth phenomena. For frequencies above the critical frequency, then the resistivity results need to be corrected for such phenomena. For very high frequencies of operation, then none of the current is conducted through the pipe into the formation but instead goes up the inside of the pipe from electrode A for a return across the earth's surface to electrode B. Therefore, under such circumstances, no matter how much total current was conducted between electrode A and electrode B, $V_3$ would be very small. (As a related subject, but which is only incidental here, it should also be apparent that skin effects in the geological formation and perhaps in the borehole fluids may also be observed, but calculations show that these effects are minor compared to the influence of the casing on high frequency operation.)

Figure 10:
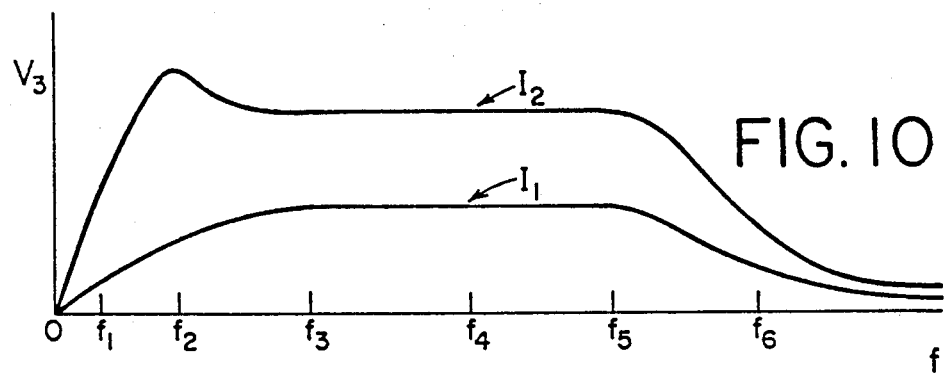
FIG. 10 shows a plot of $V_3$ vs. the frequency of operation f for different currents $I_1$ and $I_2$ conducted into formation.
Figure 11:
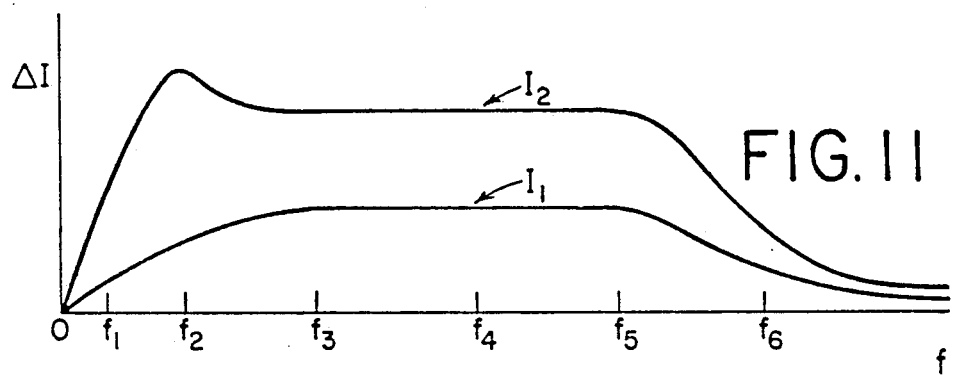
FIG. 11 shows a plot of $\Delta I$ vs. the frequency of operation f for different currents $I_1$ and $I_2$ conducted into formation.

The following figures are presented to diagrammatically depict hypothetical situations which may be encountered during the measurement process. The figures depict the interrelationship between basically four variables: $\Delta I$, the differential current conducted into the adjacent geological formation; $V_3$, the differential voltage to be measured due to the conduction of $\Delta I$ into formation; $V_o$, the local casing potential; and I, the total current conducted into the geological formation along the entire length of the casing in the measurement state of the apparatus. FIG. 10 shows a plot of $V_3$ vs. the frequency f for several values of the 0-peak current conducted downhole, for $I_1$ and $I_2$. For $I_1$, $f_1$ is still in a region dominated by polarization effects, $f_3$ is the lowest frequency where polarization effects are relatively negligible compared to resistivity effects, $f_4$ is in the center of the frequency band appropriate for resistivity measurements, $f_5$ is the uppermost frequency where resistivity effects dominate skin-depth effects of the casing, and $f_6$ is in a region where skin-depth effects dominate the measurements. For current $I_1$, resistivity measurements should be preformed in the region where $V_3$ is ideally a relative constant, namely between frequencies $f_3$ and $f_5$. For $I_2$, which is a larger current conducted through the formation, the relative shape of the curve can change significantly in the polarization region. Here, at $f_2$, dynamically moving polar water molecules actually increase $V_3$ to larger values than would otherwise be observed. However, accurate resistivity data can still be taken between frequencies $f_3$ and $f_5$ for current $I_2$. FIG. 11 is nearly the same as FIG. 10 except here the quantity $\Delta I$ is plotted vs. the frequency f. However, the major conclusions are all the same.

Figure 12:
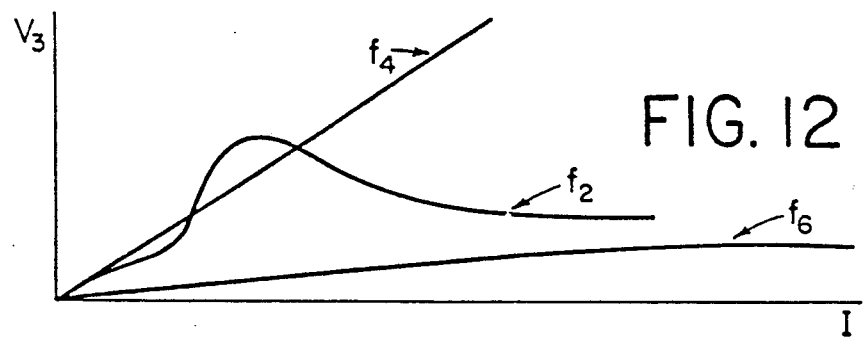
FIG. 12 shows a plot of $V_3$ vs. the total current I conducted into formation for various different frequencies of operation respectively $f_2$, $f_4$, and $f_6$.
Figure 13:
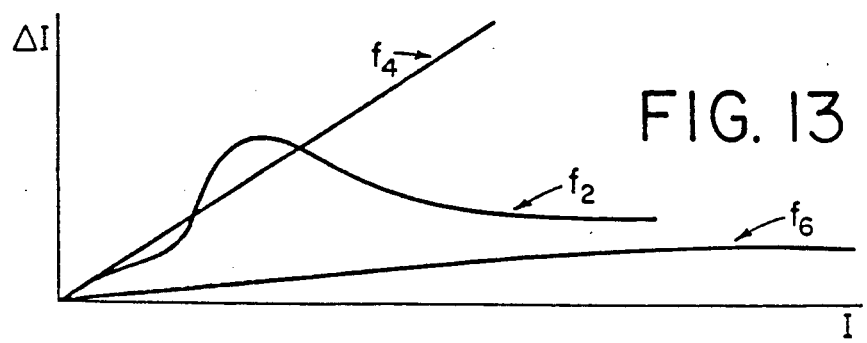
FIG. 13 shows a plot of $\Delta I$ vs. I for various different frequencies of operation respectively $f_2$, $f_4$, and $f_6$.
Figure 14:
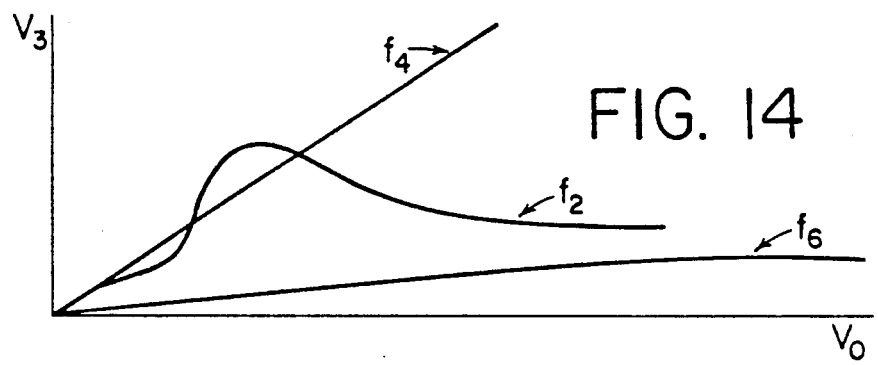
FIG. 14 shows a plot of $V_3$ vs. $V_o$ for several different frequencies of operation $f_2$, $f_4$, and $f_6$ respectively.
Figure 15:
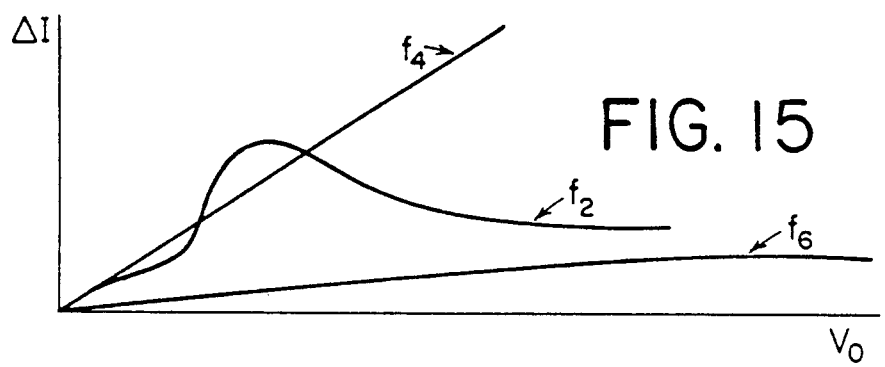
FIG. 15 shows a plot of $\Delta I$ vs. $V_o$ for different frequencies of operation $f_2$, $f_4$, and $f_6$ respectively.

FIG. 12 shows a hypothetical plot of $V_3$ vs. I for the different frequencies $f_2$, $f_4$, and $f_6$. The data at frequency $f_4$ shows the proper linear behavior for resistivity data. The data at frequency $f_2$ shows complicated behavior due to various polarization effects, and the data at frequency $f_6$ is influenced by skin depth effects. FIG. 13 shows a similar plot except here the quantity $\Delta I$ is plotted vs. the current I for different parameters of the frequency $f_2$, $f_4$, and $f_6$. FIG. 14 is a similar plot, except here $V_3$ is plotted vs. $V_0$ for the various different frequencies. And FIG. 15 is another similar plot, except here the quantity $\Delta I$ is plotted vs. $V_o$ for the different frequencies.

In addition, the phase sensitive detector 34 in FIG. 1 has, in principle, a magnitude output and a phase output corresponding to the amplitude and relative phase of the signal. In fact, the phase of the signal is referenced against the output from the signal generator through cable 36 in FIG. 1. Therefore, the phase of the signal can be measured in relationship to the phase of the driving voltage $V_o$, or the driving current I using standard techniques with phase sensitive detectors. (To measure the phase of the current I, a series resistor inserted inside element 42 can yield a suitable voltage source to allow phase measurements of I with respect to the signal on cable 36. Then, using the arrangement in FIG. 3, the phase of $V_o$ with respect to the signal available on cable 36 can be determined. Then the relative phase of both I and $V_o$ may be determined. The phase of $V_3$ can then be determined in relation to I and $V_o$.) There are many manufacturers of suitable phase sensitive detectors, and one is EG&G Princeton Applied Research Corporation, Princeton, N.J.

Figure 16:
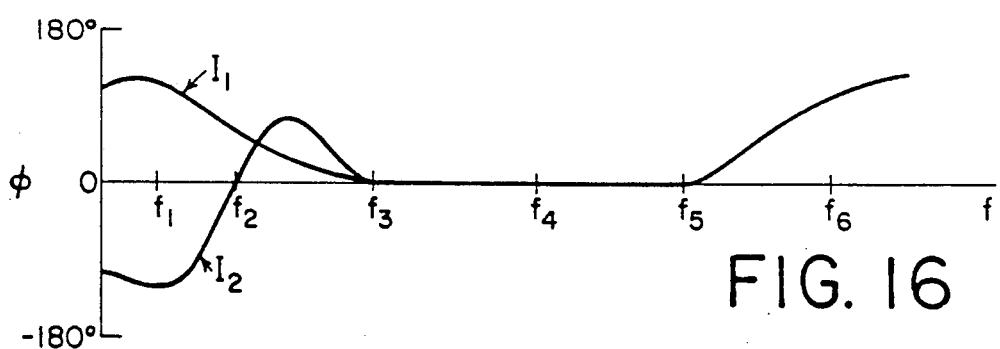
FIG. 16 shows a plot of the phase shift $\phi$ vs. the frequency of operation f for different currents $I_1$ and $I_2$ conducted into formation.

FIG. 16 shows the hypothetical phase shift $\phi$ between $V_3$ and $V_o$ vs. frequency for two different currents, $I_1$ and $I_2$. Between $f_3$ and $f_5$, the phase shift is zero, and therefore this frequency interval is ideally suitable for resistivity measurements. For frequencies below $f_3$, different currents produce different phase shifts as may be the case for various different types of polarization phenomena. And at high frequencies, such as $f_6$, skin depth phenomena affect the data, but at least such effects are not critically dependent upon the current (although the permeability of the steel casing could also be a function of the current, thereby causing different phase shifts for different currents).

Figure 17:
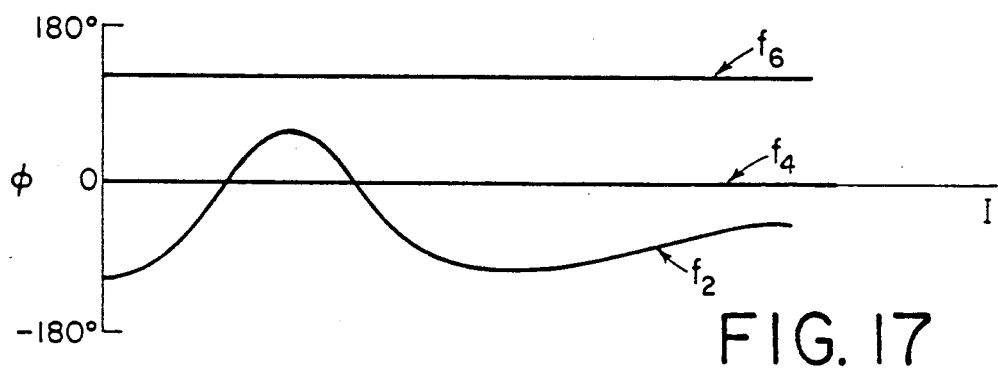
FIG. 17 shows a plot of the phase shift $\phi$ vs. the total current I conducted into formation for various different frequencies of operation $f_2$, $f_4$, and $f_6$ respectively.

FIG. 17 shows a plot of the phase shift between $V_3$ and $V_o$ vs. the current I for three different frequencies. At frequency $f_4$, standard resistivity data can be taken. At frequency $f_6$, the skin depth of the casing introduces a constant phase shift between $V_3$ and $V_o$. And finally, at $f_2$, different polarization phenomena at different current strengths are evident.

Figure 18:
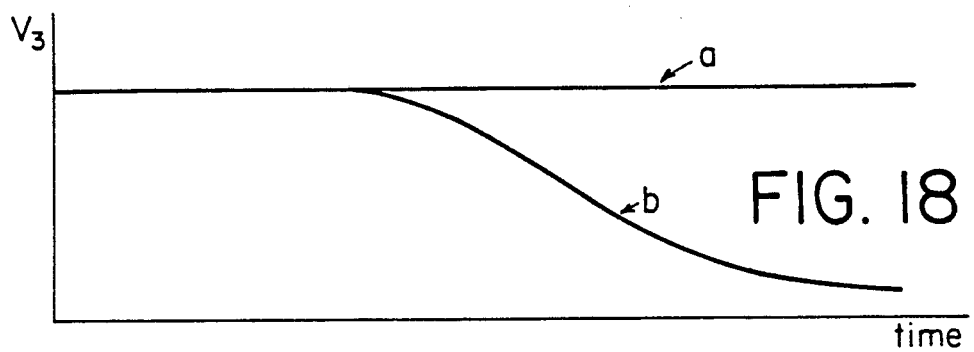
FIG. 18 shows a plot of $V_3$ vs. time for curves a and b respectively.
Figure 19:
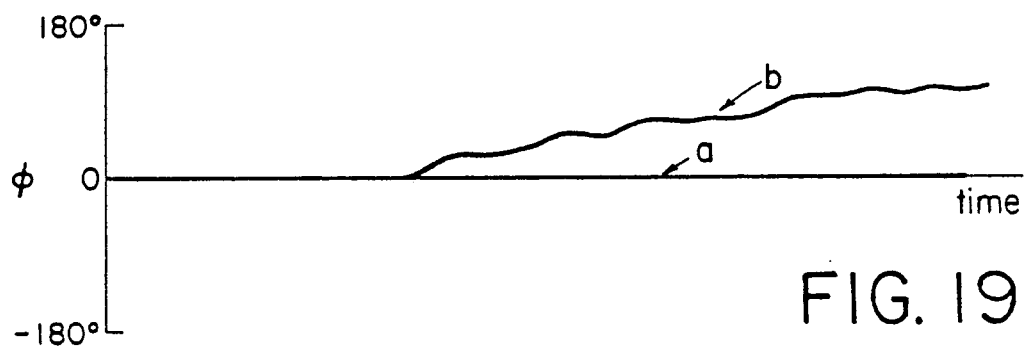
FIG. 19 shows a plot of the phase shift $\phi$ vs. time for curves a and b respectively.

In addition, once a measurement of $V_3$ is started, it should not change in time. If it does, then this could be due to gas build up or other polarization type phenomena. For example, FIG. 18 shows $V_3$ vs. time for a hypothetical situation where curve (a) shows standard resistivity type results, and curve (b) shows the influence of time dependent polarization phenomena. FIG. 19 shows the phase difference between $V_3$ and $V_0$ vs. time. In curve (a), a standard resistivity measurement is indicated, and in curve (b), polarization effects are becoming more important in time.

Figure 20:
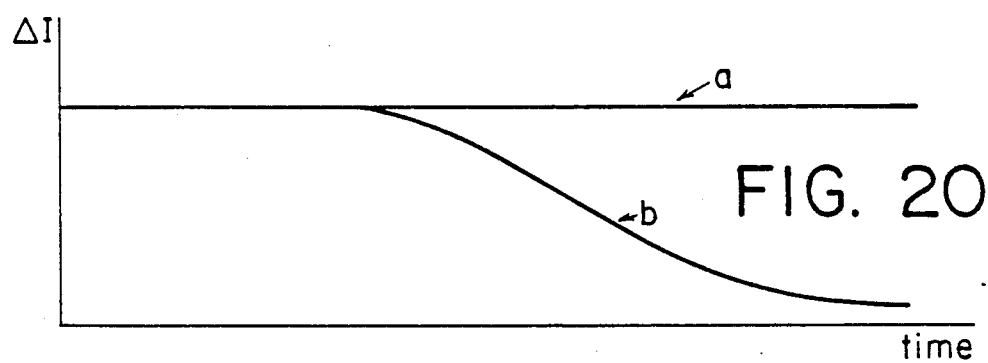
FIG. 20 shows a plot of the quantity $\Delta I$ vs. time for curves a and b respectively.
Figure 21:
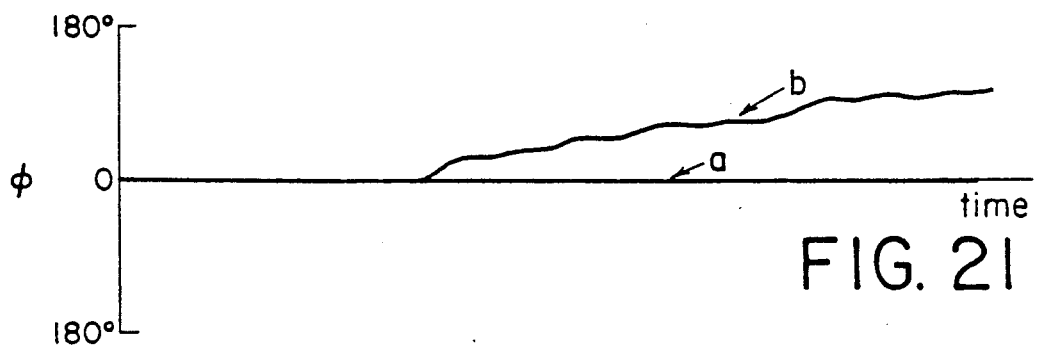
FIG. 21 shows a plot of the phase shift $\phi$ vs. time for curves a and b respectively.

Of course, the quantity $\Delta I$ vs. time should not change for resistivity type measurements either. Curve (a) in FIG. 20 shows $\Delta I$ vs. time for a case of standard resistivity measurements, and curve (b) shows data where polarization effects are becoming important. And lastly, curve (a) in FIG. 21 shows the phase shift $\phi$ between $\Delta I$ and $V_o$ for standard resistivity measurements, and curve (b) shows data for the case where polarization effects are influencing the data.

For the future discussions, a measurement is in the "resistivity region" is the measurements primarily result in measurements of the resistivity of the geological formation. And measurements are in the "polarization region" wherein the measurements are significantly affected by polarization effects. And measurements are in the "skin effect region" if influenced strongly by the skin depth of the casing.

Figure 22:
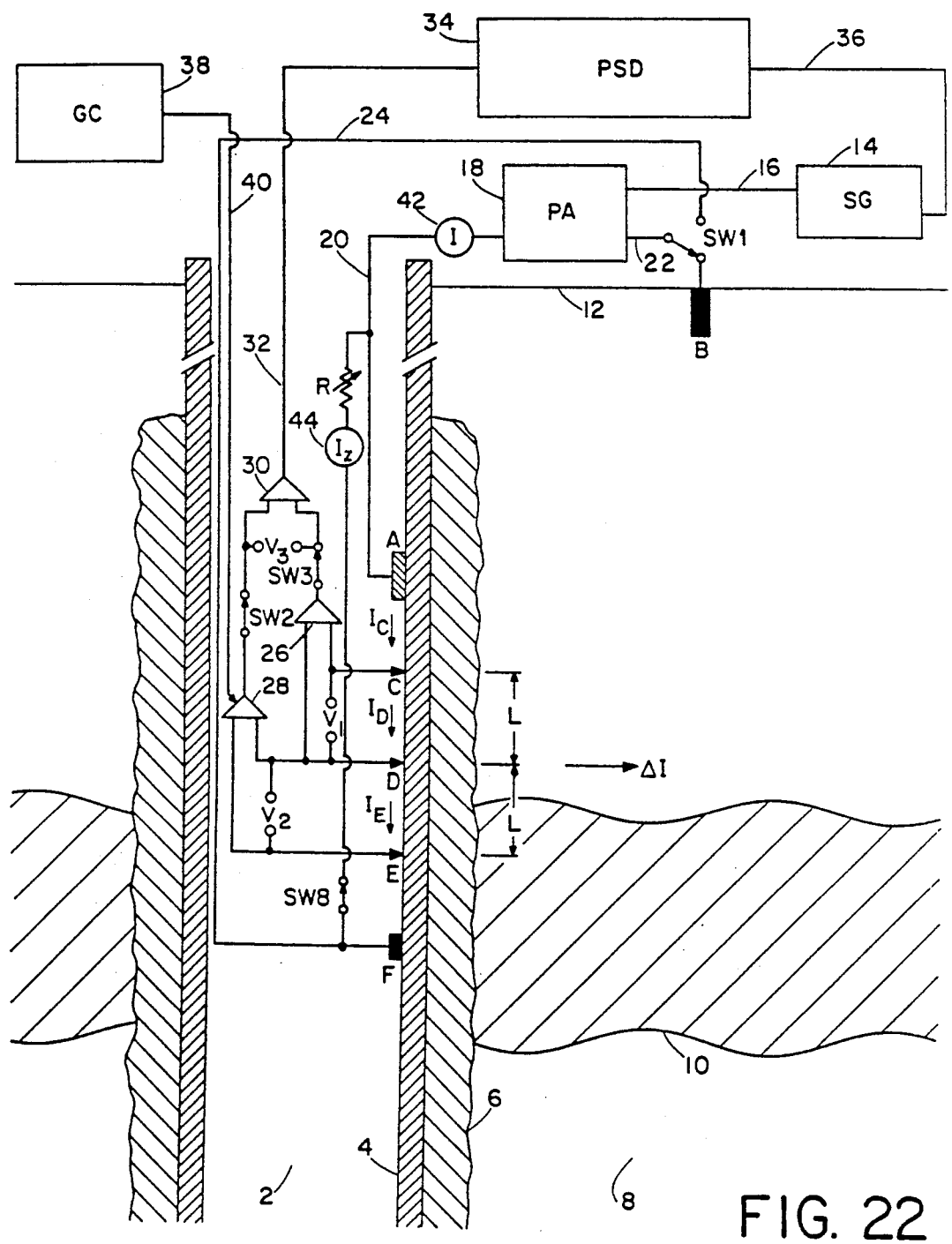
FIG. 22 shows a sectional view of another embodiment of the invention which requires an additional source of current for measurement.

As previously stated, one embodiment of the invention is succinctly described as a working combination of Fundamental Elements (A) and (B). In addition, another embodiment of the invention may also be succinctly described as a working combination of Fundamental Elements (A), (B), and (C). In addition, the invention also includes functional replacements for Fundamental Elements (A), (B), and (C) which perform the same tasks, but which have different mechanical and electronic configurations. For example, the essence of this invention is that it allows measurement of the "current lost" (current conducted) into formation along a precisely defined length of borehole casing analogous to the quantity $\Delta I$ described so far under the application of an A.C. electric field which has a component substantially perpendicular to the casing. This measurement allows a direct measure of the formation resistivity. The methods used to directly measure the current $\Delta I$ include sensing voltage drops along the casing after an initial null is achieved as shown in FIG. 1 but may include other methods which basically measure the same parameter $\Delta I$, but which involve introducing current on the casing to achieve said measurement. For example, another embodiment of the invention is shown in FIG. 22. Here all the elements have been defined in FIG. 1 with the exception that an additional variable resistor R is connected to cable 20 which is in turn connected to a current measurement device 44 which measures the current $I_z$ is conducted to electrode F. In this case, after null is achieved in the calibration state of the apparatus, extra A.C. current $I_z$ (0-peak) is introduced at electrode F and adjusted until there is a null voltage output for $V_3$. At this point, the current $I_z$ introduced on the casing is related to the current lost between electrodes C and E. However, this is just another means to measure the current lost into formation along a precise length of borehole case under application of an A.C. electric field which is substantially perpendicular to the casing. And in addition, any number of similar current introducing elements may be also attached to electrodes C, D, and E which will allow measurement of $\Delta I$.

Figure 23:
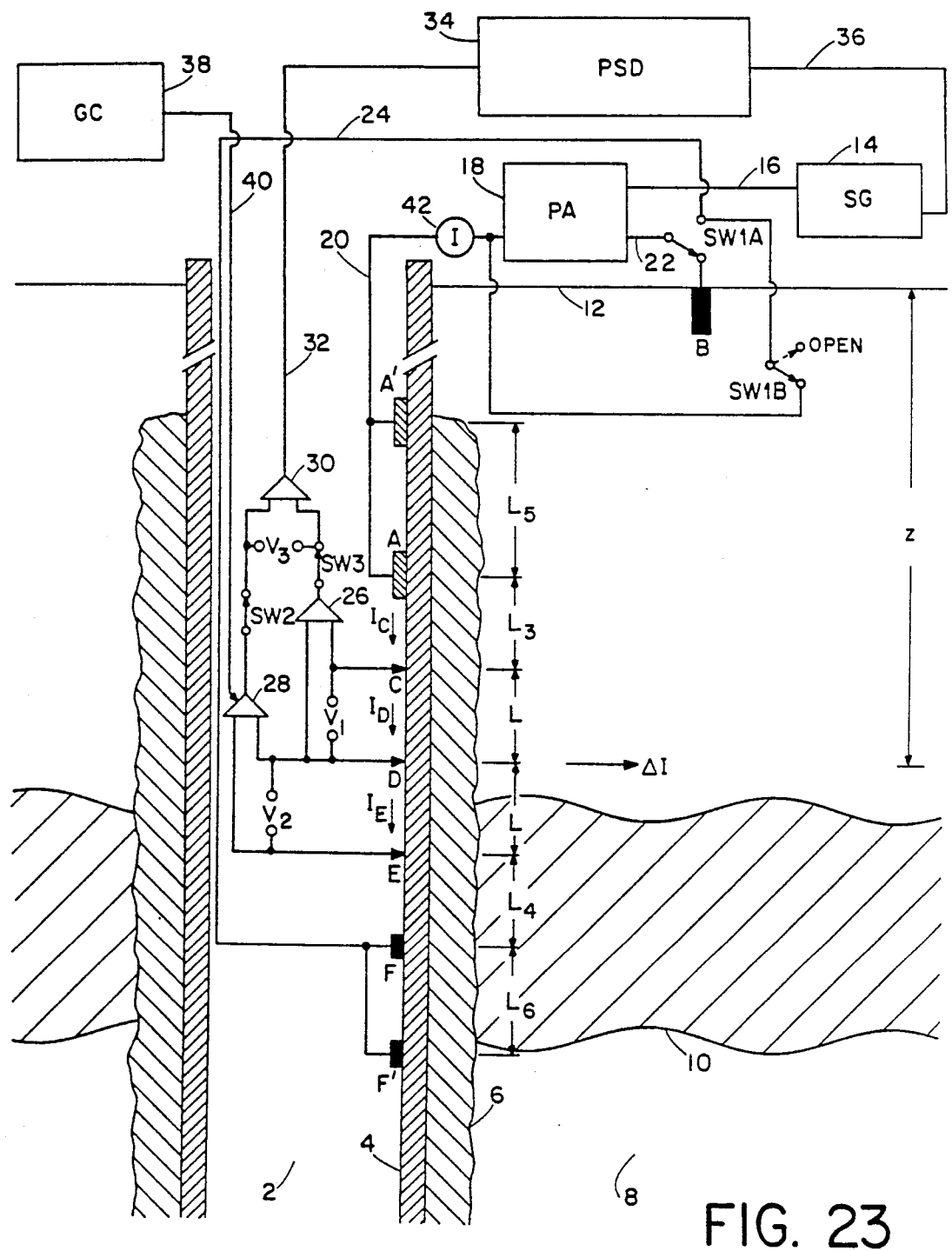
FIG. 23 shows a sectional view of another embodiment of the invention which minimizes the common mode rejection requirements on the amplifiers.

In addition, FIG. 23 shows another embodiment of the invention. This embodiment relaxes the "common mode rejection" requirements on amplifiers 26 and 28. Here additional electrodes are attached to electrodes A and F and are labeled A' and F' respectively in FIG. 23. The distances $L_5$ and $L_6$ are defined on the drawing. An extra "pole" has been added to SW1 shown in FIG. 1 and here it is a double-pole-double-thro type switch which performs it's original function in FIG. 1 with SW1A and in addition, performs another function with SW1B. In this case when SW1A connects cable 22 to electrode B in the measurement state of the apparatus, then SW1B also connects electrodes F and F' to electrodes A and A'. This means that the region between electrodes A and F is nearly an equipotential with little net current flowing along the casing between electrodes A and F but as in FIG. 1, current is still lost into formation between electrodes C, D, and E as shown. The advantage of this arrangement is that the common mode voltages appearing across the inputs of amplifiers 26 and 28 are reduced in magnitude from FIG. 1. In this case, it may not prove necessary to "balance" the electronics for null in the calibration state of the apparatus as described in FIG. 1 to achieve reasonable measurements of $\Delta I$. However, such initial nulling would still improve the overall accuracy of the measurement under realistic borehole conditions. In addition, many of the concepts used for the "focused current electrodes" used in open boreholes could be used here in determining the placement of electrodes like A and A' and F and F' for example. Of course, the natural cylindrical geometry of the casing "focuses" the current naturally-namely it helps to cause deep radial penetration by the current. (For information concerning focused current arrays used in open holes, please refer to the *Encyclopedia of Well Logging*, Robert Desbrandes, Gulf Publishing Company, Houston, Tex., 1985, p. 117.) Any number of electrodes such as electrodes A, A', etc. could be made to contact the casing for various different purposes. And, of course, electrodes A' and F' in FIG. 23 could be removed and the invention would still work nearly as well. An extra complication with this embodiment of the invention is the necessity to determine the current flowing independently in each segment of the casing between the measurement electrodes which may be accomplished in an obvious manner using the "invert" command sent to amplifier 28 by the gain controller which inverts the input leads to amplifier 28 for these measurements. It should also be noted that FIG. 23 shows electrodes A and A' which are used for two purposes: to conduct current into formation in the measurement state of the apparatus and to pass calibration current to electrodes F and F' in the calibration state of the apparatus. It should be evident that separate electrodes could be used for each separate function, although combining functions in one electrode minimizes complexity of the downhole tool. Also, electrode A or A' can be placed between electrodes C and D in another embodiment of the invention.

Figure 24:
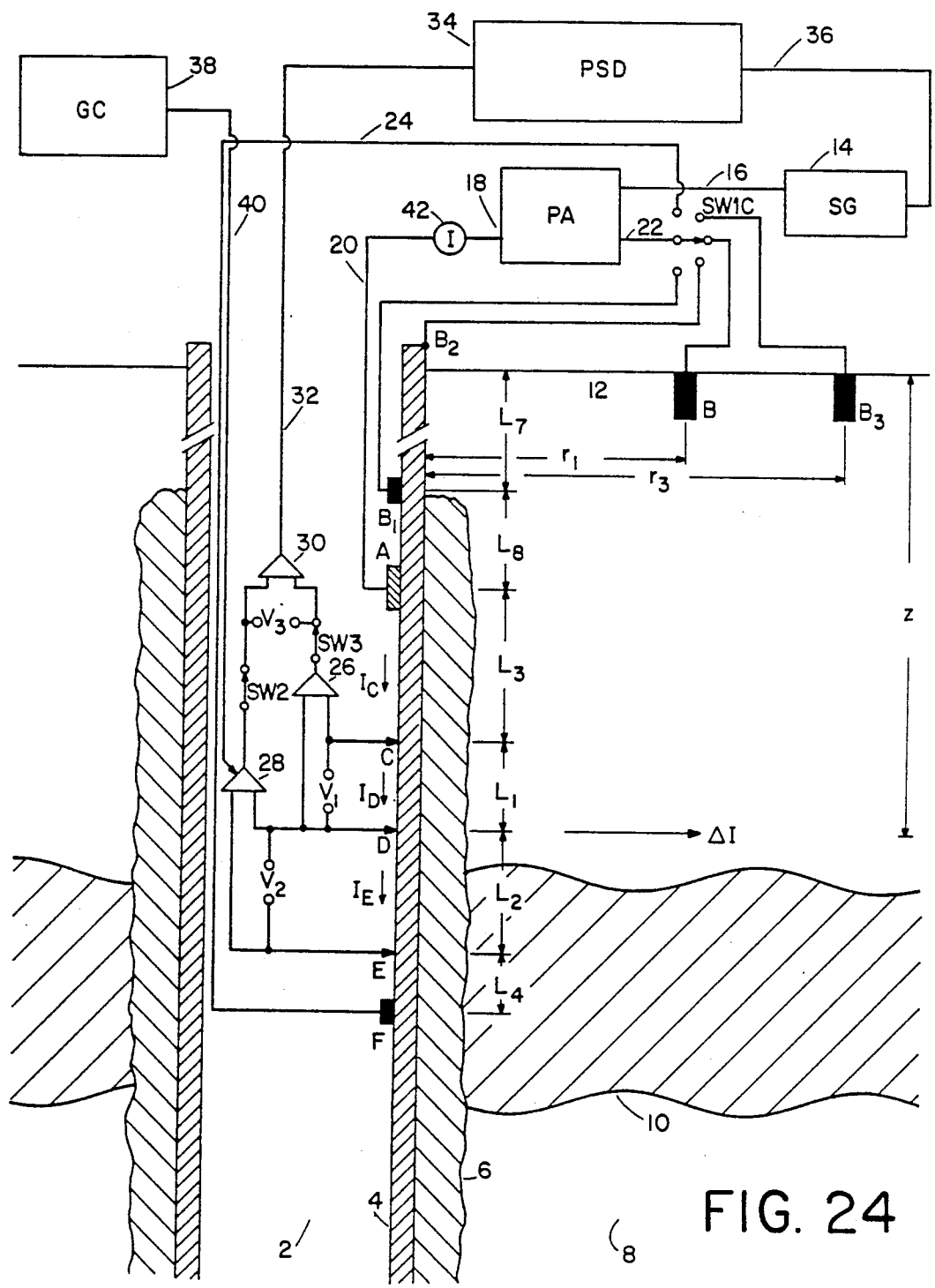
FIG. 24 shows a sectional view of another embodiment of the invention which shows several different possible ground return paths for the current.

FIG. 24 shows another embodiment of the invention. The purpose of FIG. 24 is to present various alternatives for the placement of electrode B and to further discuss requirements which electrode B must satisfy for proper operation of various embodiments of the invention. Here, most all of the elements have been defined in FIG. 1 except here SW1C replaces SW1 in FIG. 1. Switch SW1C may be used to connect to alternative grounding positions shown figuratively as B, $B_1$, $B_2$, and $B_3$ in FIG. 24. Electrode B has already been described. $B_1$ is an electrode in electrical contact with the interior of the casing which is located beyond a critical distance, $L_c$, away from electrode A. As long as the length of casing between A and $B_1$, $L_8$, is comparable to or larger than $L_c$, then the electric field is primarily perpendicular to the casing when electrode A is energized, and the invention works in the usual fashion. The critical distance $L_c$ is that length of casing adjacent to a formation where the series resistance to current flow equals the contact resistance of the pipe adjacent to the formation. (For a uniform formation, that distance can be calculated by requiring that at a particular length $L_c$, the series resistance to current flow along the length $L_c$ of the casing which is given by the algebraic expression $(L_c r)$, where r is defined in Eq. 1, is equal to the resistance $R_c$ in Eq. 6 for the particular length $L_c/2$. This equation is then solved for the length $L_c$. This is also the approximate distance where half of the current flows off the casing into the formation which has already been discussed). The requirement of the length of $L_8$ is a matter of convenience only, because for shorter lengths of $L_8$, as long as the placement of electrode $B_1$ is such that it allows the generation of any significant component of the electric field perpendicular to the casing in the vicinity of electrode A, then current is conducted into formation from the casing adjacent to electrode A, and the invention functions properly. In addition, $B_2$ is an electrode in electrical contact with the top of the borehole casing. Here too, as long as the resistance of the length of casing between A and $B_2$ is comparable to or larger than the total resistance to current flow between electrode A and electrode B, then the electric field is primarily perpendicular to the casing when electrode A is energized, and the invention works in the usual fashion. And finally, $B_3$ is another earth ground, and it's position is immaterial provided that the electric field produced on the exterior of the casing is primarily perpendicular to the casing which will allow proper measurement of the resistivity of the geological formation. Although the electric field is primarily perpendicular to the casing at great depths independent of the position of the ground return (B, $B_1$, $B_2$, or $B_3$), there none-the-less should be small detectable differences related to the different current paths. Therefore, different grounding returns could provide a means of measuring the resistivity of different selected portions of the formation such as the resistivity of different quadrants. Such measurements are only a minor modification of the invention.

Figure 25:
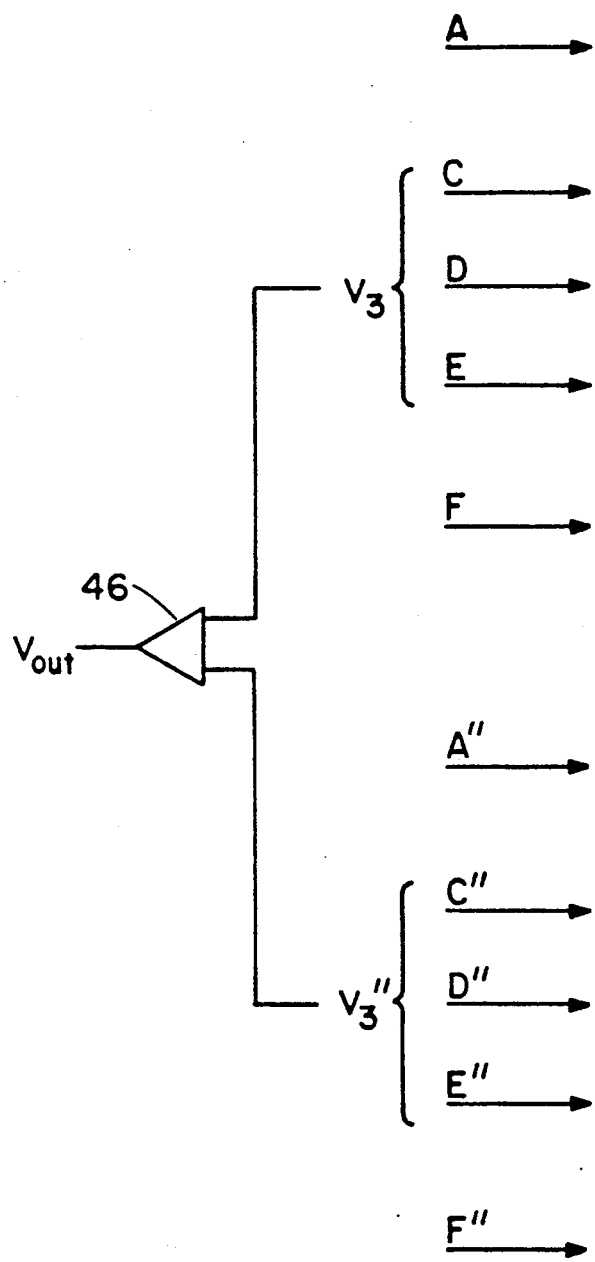
FIG. 25 shows the electrode configuration for another embodiment of the invention which results in a higher order gradient type measurement device.

In addition, a higher-order gradient measurement can be performed wherein one set of vertically disposed electrodes A, C, D, E, and F as defined in FIG. 1 is at one vertical position and then another corresponding set of electrodes A'', C'', D'', E'', and F'' are located at a different vertical position. Please refer to FIG. 25 which shows the functionality of the higher order gradient type device. The voltage output from the first set of electrodes is $V_3$ and from the second set of electrodes is $V_3''$. Differences between $V_3$ and $V_3''$ are then measured which provide a different type of gradiometer for vertical sections of the formation. Here, differential amplifier 46 takes the voltage difference between $V_3$ and $V_3''$ which produces $V_{out}$ which is the output voltage of the higher-order gradient measurement device. As is obvious, additional sets of electrodes A''', C''', C''', E''', and F''' could also be added in an analogous fashion and the output $V_3'''$ could be compared to the other two outputs to infer information about the geological formation.

Figure 26:
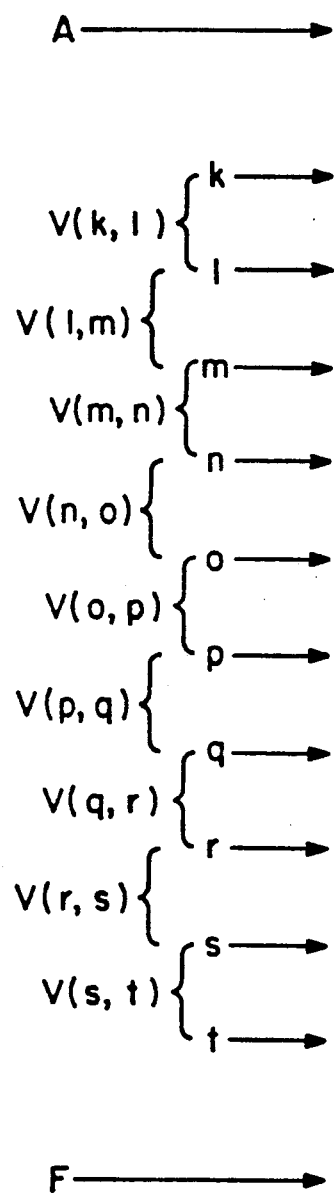
FIG. 26 shows the electrode configuration for yet another embodiment of the invention.

FIG. 26 also shows another embodiment of the invention in a figurative fashion. Here electrodes A and F are current conducting electrodes as defined in FIG. 1. However, here voltage measurement electrodes k, l, m, n, o, p, q, r, s, and t are disposed vertically between electrodes A and F. They each provide a voltage difference between adjacent pairs such as V(k,l), V(l,m), V(m,n), V(n,o), V(o,p), V(p,q), V(q,r), V(r,s), and V(s,t). The appropriate voltage differences along the length of the borehole casing may be processed by analogue circuitry or may be digitized and analyzed in various fashions to eliminate various errors. Such errors may include bogus signals due to stray currents in the fluid inside the cased borehole and capacitative voltage pick-up from the energized wirelines, and such stray signals may be minimized by using one or more of the following voltage processing schemes. For example, the voltage difference between electrodes k and o, V(k,o), may be directly measured. However, this voltage V(k,o) is also equal to the following:

$$V(k,o) = V(k,l) + V(l,m) + V(m,n) + V(n,o) \quad \text{Eq. 24}$$

Processing the signal in this manner may eliminate various types of errors such as voltage pick-up, etc. Alternatively the signal V(k,o) could be processed as follows:

$$V(k,o) = [V(k,l) + V(m,n)] + [V(l,m) + V(n,o)] \quad \text{Eq. 25}$$

Such processing would eliminate different sorts of pick-up and other types of systematic measurement errors. And in addition, adjacent measurement pairs need not be used to perform the measurements. For example, the resistivity of the formation could be determined easily between points k and r by computing the following:

$$V(k,l) - V(m,n) - [V(o,p) - V(q,r)] \quad \text{Eq. 26}$$

And, of course, another set of such electrodes could be added below the described set of electrodes which could be labeled as follows: A'', k', l', m', n', o', p', q', r', s', t', and F'' which could be operated to measure the resistivity of adjacent formations as well.

As another application of the invention, vertical arrays of electrodes can be used to look for horizontal cement voids behind casing. If cement is missing from behind the casing, that space is generally filled with fluids which are relatively conducting and consequently more current will conduct preferentially into the relatively conducting areas. Vertical arrays of electrodes as shown in FIG. 26 are ideally suited for locating horizontal voids in cement behind casing. However, the distance between adjacent electrodes for such measurements should obviously be less than the radius of the pipe. In fact, as long as the cement void is filled with fluids which have resistivities different than the geological formation, then such methods will work to find horizontal cement voids. Locating such voids is important to maintain casing integrity and is of importance to the oil industry and may ultimately provide a major use for the invention.

Figure 27:
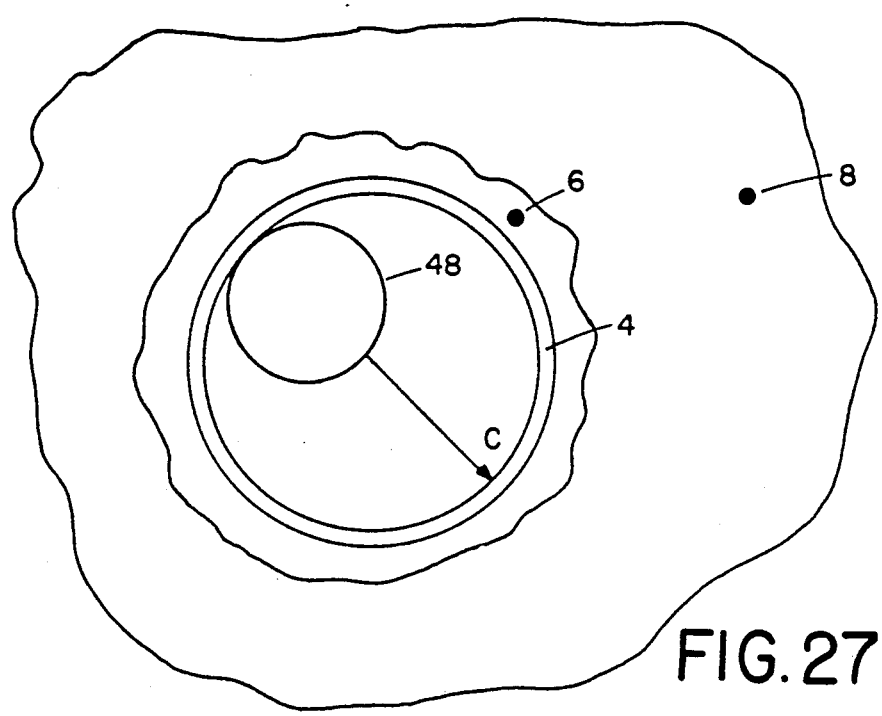
FIG. 27 shows the top view of an off-axis tool configuration.

The voltage measurement electrodes, typified by electrode C in FIG. 1 may have many different methods of fabrication. The tool may be an off-axis tool, where the tool body presses against one side of the casing. Please refer to FIG. 27 which shows a top view of the tool. Here the borehole casing is labeled 4, the cement is 6, the geological formation is 8, and the tool body or "sonde" is 48, and it has just one electrode extending from the tool corresponding to electrode C. This electrode may extend from the tool using motor drives, hydraulic drives, or other methods which are standard in the industry. Similarly, electrodes A, D, E, and F may also have just one contact point with the casing. Each electrode may be encapsulated in rubber which pushes back from the electrode when the electrode contacts the casing but whereby the rubber otherwise electrically insulates the electrode from the borehole fluids.

Figure 28:
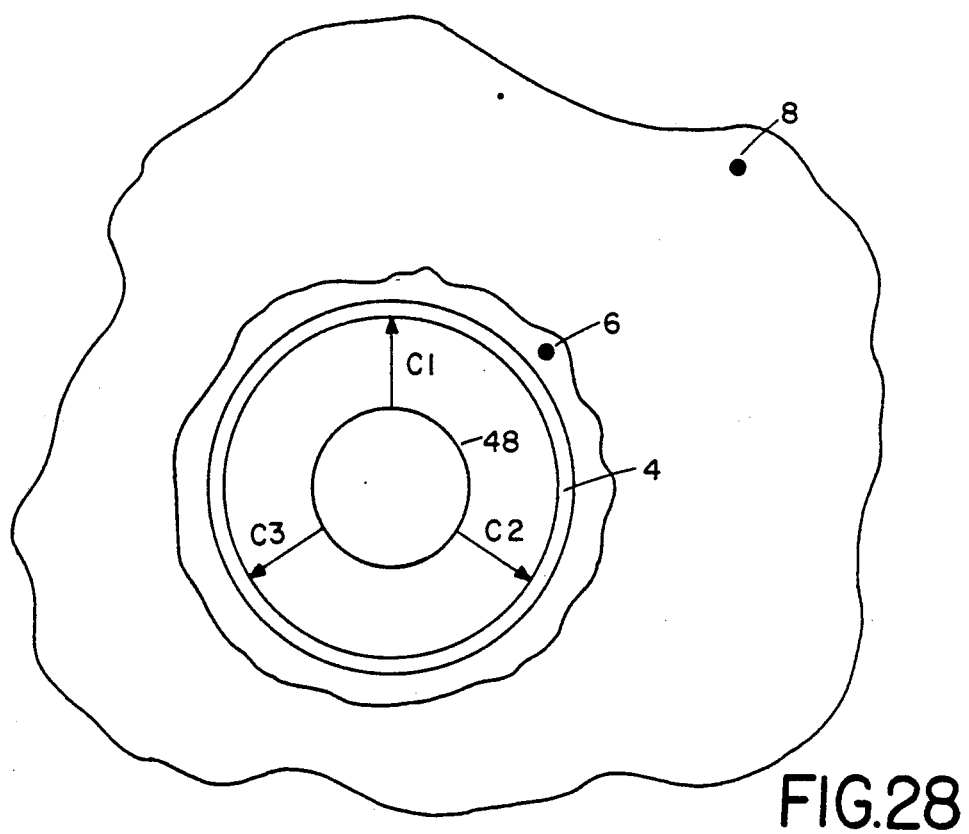
FIG. 28 shows the top view of a tool which is centered inside the borehole casing which has 3 electrodes disposed azimuthally around the tool.

FIG. 28 shows the top view of a symmetrically centered borehole tool. The tool shown has three individual electrodes corresponding to electrode C: C1, C2, and C3. And in addition, electrode A has individual electrodes A1, A2, and A3; electrode D has electrodes D1, D2, and D3; electrode E has individual electrodes E1, E2, and E3; and lastly, electrode F has individual electrodes F1, F2, and F3. The electrodes are fabricated such that electrodes A1, C1, D1, E1, and F1 are all in "line" vertically. Therefore, different quadrants of the formation may be investigated around the borehole using different oriented sets of electrodes. For example, electrode set A1, C1, D1, E1, and F1 can be independently measured during the techniques outlined in FIG. 1. Then, similarly, electrodes A2, C2, D2, E2, and F2 can be independently configured as shown in FIG. 1. And lastly, electrodes A3, C3, D3, E3, and F3 can also be used for another independent measurement. Such measurements performed at different angular orientations along a vertical section of pipe can be used to investigate different angular quadrants of the formation. Measurements in different angular quadrants may be of significant interest because, for example, a salt dome may be adjacent to a cased hole to one quadrant which contains oil, and that may be the target of exploration. And in addition, such measurements provide independent measurements of the dip ("tilt") and strike (direction of the "tilt") of the formation which are important geophysical quantities. Such a dip and strike tool would also necessarily have to be provided with a means to determine the relative orientation of the tool within the borehole.

Figure 29:
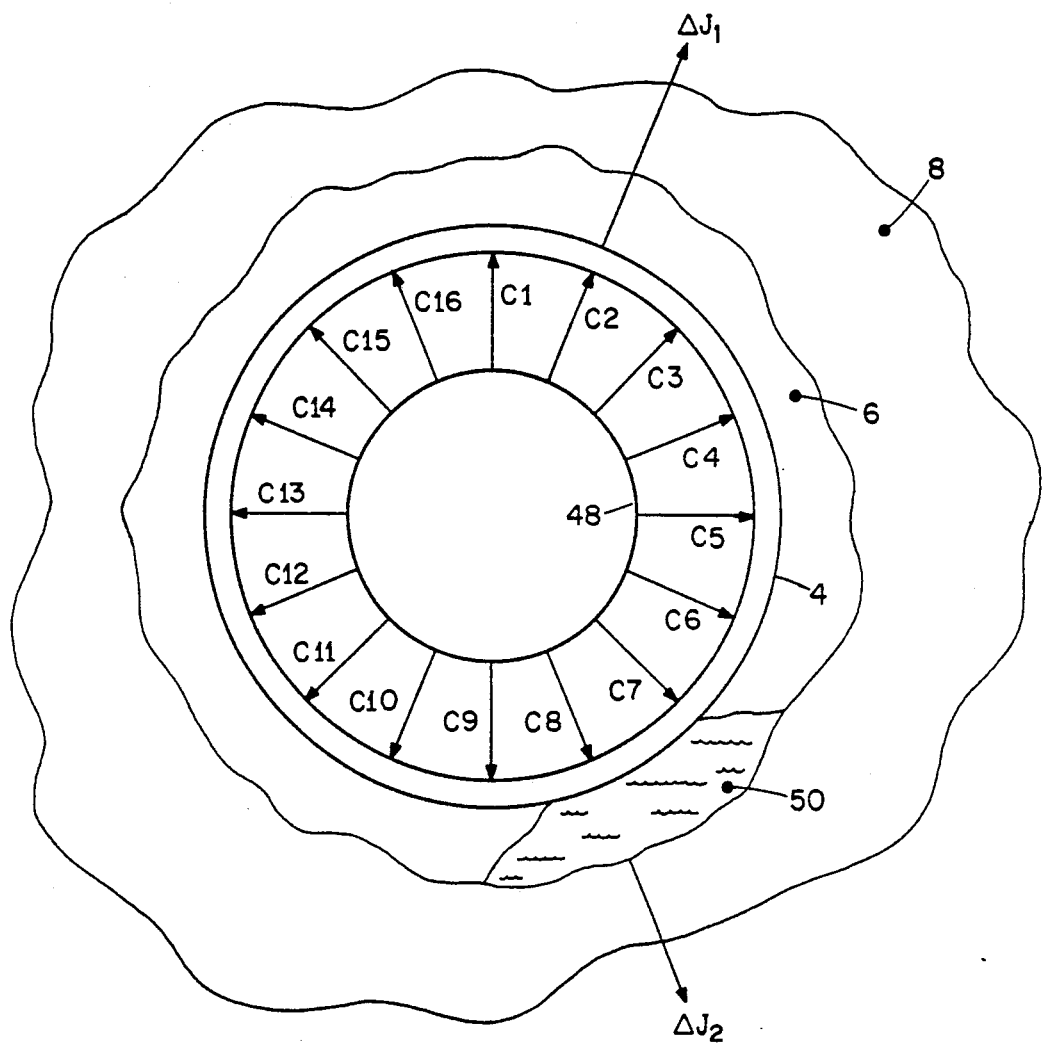
FIG. 29 shows the top view of a tool which is capable of measuring voids in cementation through borehole casing.

Another embodiment of the invention is shown in FIG. 29. Here electrode C has a total of 16 different contacts. However, each individual contact is brought into the interior of the tool housing with an insulated wire for measurement. Similarly electrode D has 16 such electrodes and so does electrode E. However, in this embodiment, voltage differences are not taken between vertically disposed electrodes but instead are taken between horizontally disposed electrodes. Therefore, the voltage differences are taken between adjacent pairs of electrodes, for example between the following pairs of electrodes: C2-C1, C3-C2, . . . C16-C15, and C1-C16. Similar differences are taken for electrode D and electrode E. If the cement is uniform around the casing and the geological formation is horizontally homogeneous, then there will be no differences in the above measurements. However, suppose there is a void in the cement as shown by the shaded region 50 in FIG. 29. In this case, the void will probably be filled with relatively conducting water, and more current will flow out of the casing along this preferential direction. Therefore, in this case, the differential current per unit area $\Delta J_1$ conducted through the cement is smaller than the current per unit area $\Delta J_2$ conducted through the water as shown in FIG. 29. Sometimes there are vertical groves in the cement, and vertical groves would yield similar measurements using electrodes D1 ... D16 and E1 ... E16. Determining the presence of voids in concrete behind casing is of considerable importance to the oil industry. Therefore, this embodiment of the invention could attain widespread use for this reason alone.

Also notice in the above description of the invention, that the electrodes can be fabricated such that electrodes C1, D1, and E1 are all in a row vertically. Similarly electrodes C10, D10, and E10 would also be in a line vertically. Therefore, since the insulated wires attached to each individual electrode are brought into the electronics housing, electronic means can be provided to first take a series of horizontal voltage differences, and then a series of vertical voltage differences. Consequently, three dimensional information about where the current is flowing and information concerning the presence or absence of cement voids behind casing would thus be attained. Basically, the invention contemplates using any number of voltage sensing electrodes in electrical contact with the interior of the borehole casing to measure the differential current conducted into formation between any number of pairs of said electrodes to infer the resistivity and changes in resistivity of the adjacent geological formation and to infer the presence or absence and/or the integrity of the cement around the borehole casing. Therefore, any array of electrodes which are disposed in any manner inside the casing may be suitably chosen for measurements of the differential current conducted into the adjacent formation. And as already stated, such measurements can yield the dip and strike of the geological formation if the borehole tool is also provided with a means to determine the orientation of the electrodes with respect to the borehole casing by using devices such as a gyroscope or suitable magnetic field measurement device.

In all the embodiments of the invention, the electrodes are pictured to make physical contact with the casing. For example, electrodes A, C, D, E, and F are shown in the figures to actually make physical contact with the borehole casing. However, if the borehole is filled with relatively conducting fluids having resistivities comparable with formation resistivities, then these electrodes need not actually touch the borehole casing. In fact, "banded electrodes" as described in U.S. Pat. No. 2,891,215 may work well under these circumstances. In addition, if it is found that electrodes must actually physically contact the casing but also have the capability to move vertically, then electrodes can be fabricated which resemble the movable electrodes described by W. H. Stewart in U.S. Pat. No. 2,371,658. Many different types of electrodes which move and make suitable electrical contact are possible.

Figure 30:
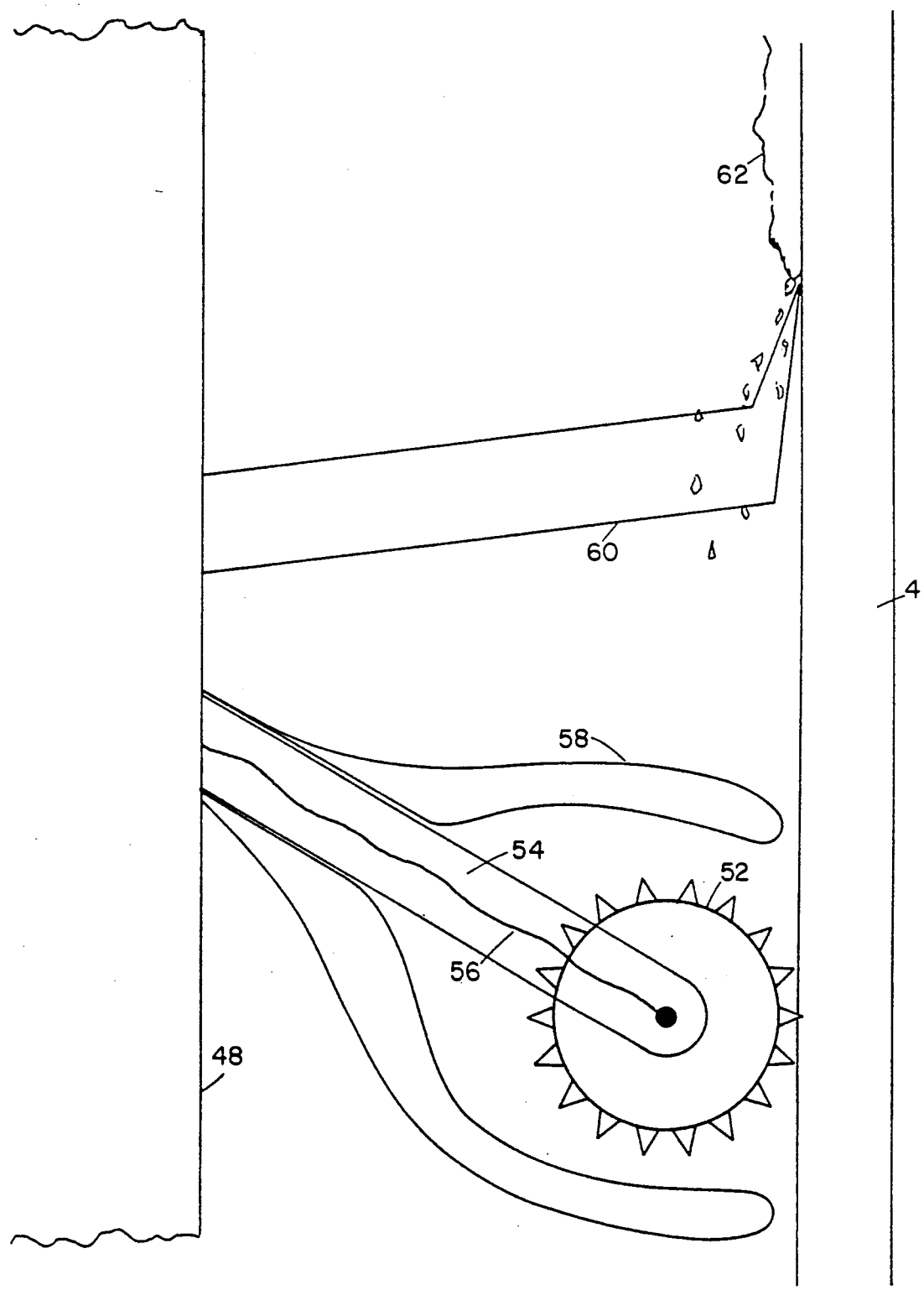
FIG. 30 shows a method of fabricating electrodes which make electrical contact with the casing while the tool is moving.

One method of fabricating a movable electrode is shown in FIG. 30. The casing 4 is shown and so is the tool housing 48. A rotating cutter electrode 52 made from hardened tool steel is held against the casing with a spring loaded insulated arm 54 and the electrical signal is conducted into the electronics housing within the tool using insulated wire 56. The entire cutter assembly is surrounded with a hard rubber structure 58 which tends to insulate the cutter electrode from extraneous electric fields which may be present in the fluid inside the borehole casing. In addition, a scraping device 60 precedes the rotating cutter electrode as the tool is drawn vertically and clears debris 62 off the inside of the casing wall which is helpful in making better electrical contact with the rotating cutter electrode.

Figure 31:
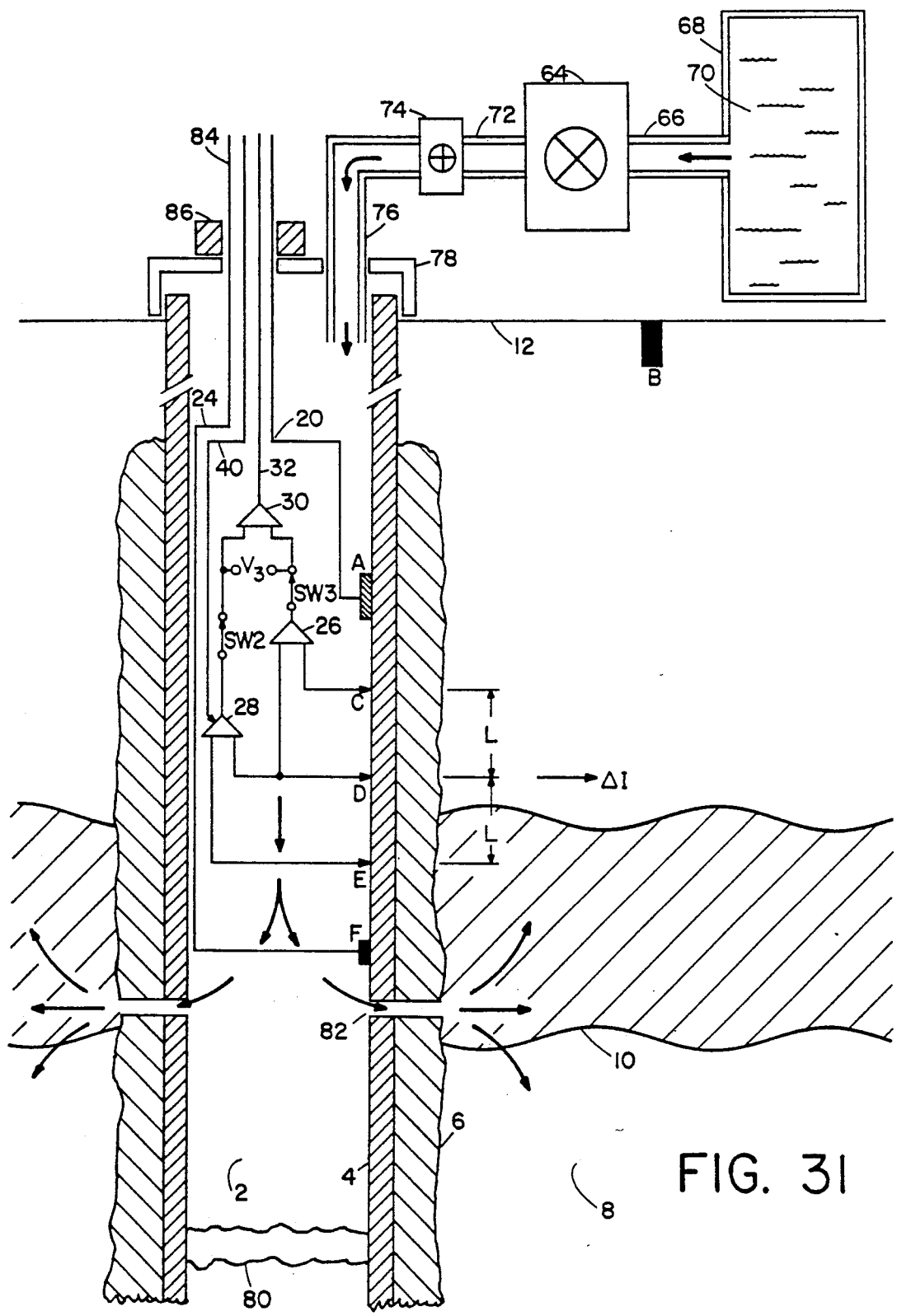
FIG. 31 shows a sectional view of an embodiment of the invention used to measure the permeability of a geological formation adjacent to a perforated region of the borehole casing.

It is also standard practice in the oil industry to use log-inject-log techniques wherein a formation is first logged, then fluids are forced into the formation to be measured, and then measurements are performed after said fluids replace the formation fluids originally in place. Sometimes measurements are performed during the actual fluid injection process. Please refer to FIG. 31. Pump 64 obtains fluids through pipe 66 attached to a large fluid reservoir 68 which contains fluids 70. Fluids are then forced under pressure through pipe 72 to a combination pressure meter and flow meter 74 and then through pipe 76 into the top of the well bore. Pipe 76 is often called production tubing which may be suspended in place using various different techniques. Pressure fitting 78 prevents pressurized fluids from escaping from the well bore. Since a plug 80 is below the perforations 82 in the borehole casing near a producing zone (or a test zone), fluids are forced into the formation through the perforations. The various conductors 20, 24, 32, and 40 are contained inside an armored wireline 84 which is customary practice in the industry (and not explicitly shown in the prior figures). This wireline supports the weight of the sonde and slides through the pressurized grease fitting 86 which prevents fluids from escaping from the well bore under pressure.

With a known quantity of fluid injected into place from measurements obtained with the combination pressure meter and flow meter 74, and with the resistivity of fluids 70 known and chosen with substantially different resistivities than fluids present in formation, then the changes in the resistivity of the formation can be measured vs. the amount of fluid pumped into formation. This data can be used to determine the resistivity of fluids naturally in place, the amount of residual oil in place, information about oil/gas interfaces, the porosity, and the permeability of the geological formation using methods of analysis typical in the industry. A typical situation would be choosing fluids 70 which are much more conducting than either the connate water in place or certainly the oil in place, and measurements performed during or after the injection process. Salt water solutions are, of course, obvious choices for the injected fluids among the other standard choices for fluids in the industry. In addition, the pressurized fluids injected into formation may be used to actually fracture the formation itself, and the invention can be used consequently to determine the quantity and direction of the fractures produced.

Similarly, the invention can be used to simultaneously measure the changes in formation resistivity inside one well while fluids are being simultaneously pumped into the geological formation from at least one additional well in the general vicinity. This is a variation of the invention shown in FIG. 31 wherein the source of injected fluids comes from a different well in the oil field.

And finally, normal production activities involve the removal of fluids, and measurements while producing can lead to an understanding of how fluids are moving in the oil field under actual production activities which is another use of the invention.

To this point, it has been emphasized that the measurements are being interpreted solely for resistivity data. However, the same apparatus can be used to measure polarization phenomena. All things being equal, as discussed previously, lower frequencies and higher currents will emphasize various types of polarization phenomena. These phenomena can be used to infer useful geological information as well. For example, the "bump" in FIG. 10 at frequency $f_2$ is caused by polar molecules rotating in the applied electric field. Since oil is relatively non-polar, then one would conclude that only the water was giving raise to this signal. This could be useful in finding missed oil behind casing. In addition, it is known that shales conduct $Na^+$ ions but physically bind $Cl^-$ ions, which is one of the primary reasons why spontaneous potentials exist in formation (John T. Dewan, op. cit., p. 38). In addition, it is known that $Na^+$ and $Cl^-$ in general have different mobilities in a variety of different geological circumstances. Therefore, it is reasonable to expect that numerous interpretation schemes will evolve to determine the influence of different mobilities on polarization data which will allow interference of the lithology of the adjacent formation. In particular, therefore, the invention may be intentionally used in such a manner to emphasize the appearance of electrochemical effects, or polarization effects, which may be interpreted to yield certain geological parameters of interest related to the types of fluids present and the lithology of the formation.

For the sake of simplicity to this point, the power amplifier 18 has been described as delivering only sinusoidal A.C. current to the formation. However, the signal general 14 is capable of many types of complicated waveforms which can be amplified by the power amplifier 18. By way of example, power amplifier 18 may be a D.C. coupled amplifier. Namely, the signal generator can be put out on A.C. voltage which is offset by some D.C. bias voltage which therefore causes A.C. current to be conducted between electrode A and B but which has a D.C. offset current which may be larger in magnitude than the 0-peak magnitude of the A.C. current or the signal generator can put out voltage steps, triangle waves and other transient waveforms. To generalize the measurement concepts here, to this point $V_3$, $\Delta I$, $V_o$ and I have been defined for simplicity as the 0-peak values of assumed symmetric A.C. quantities. However, the various quantities may not be simply sinusoidal in nature, and therefore it is appropriate to consider a general time representation for the above quantities since 0-peak values are not always useful for general waveforms.

Figure 32:
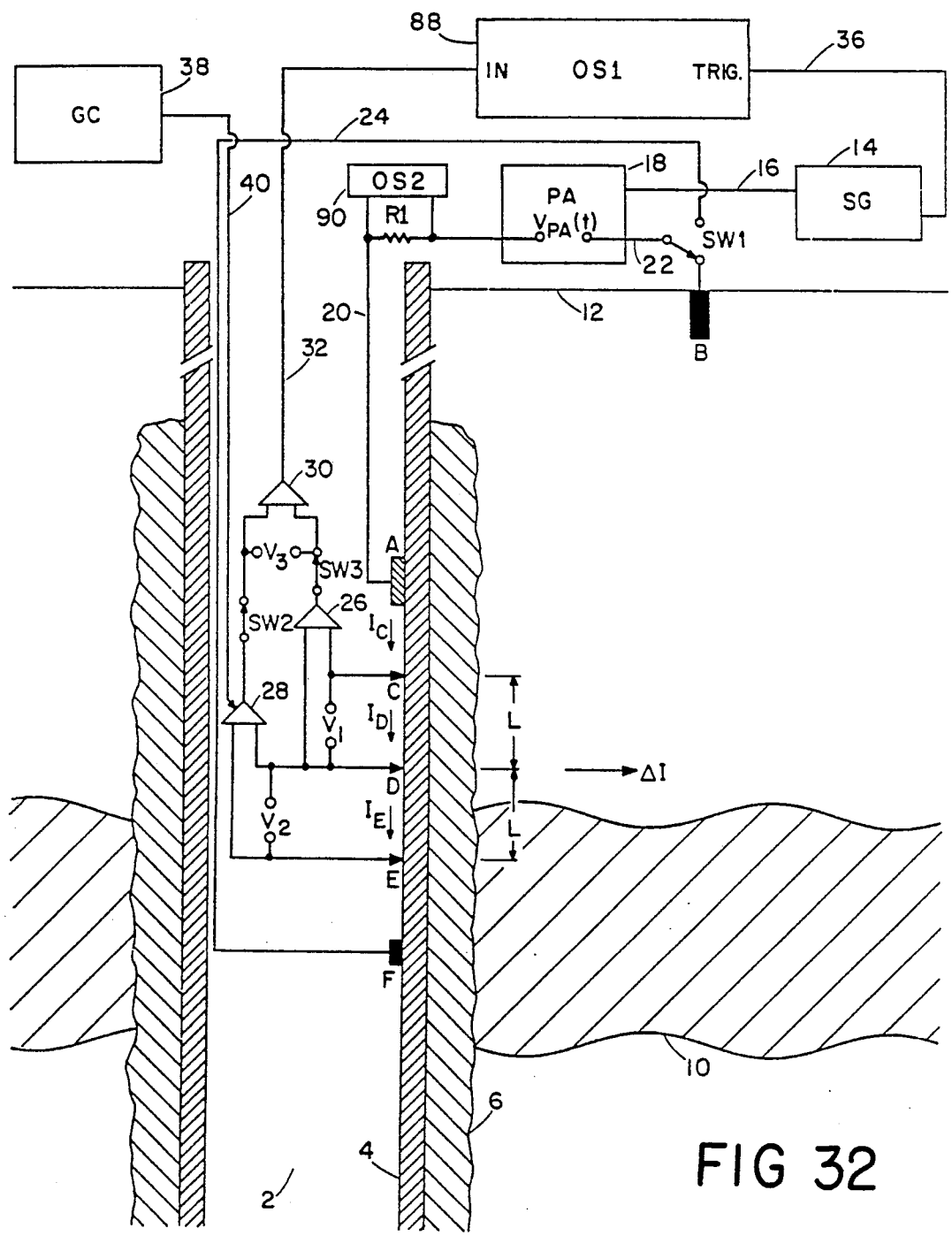
FIG. 32 shows a sectional view of another preferred embodiment of the invention which uses an oscilloscope for data measurements.
Figure 33:
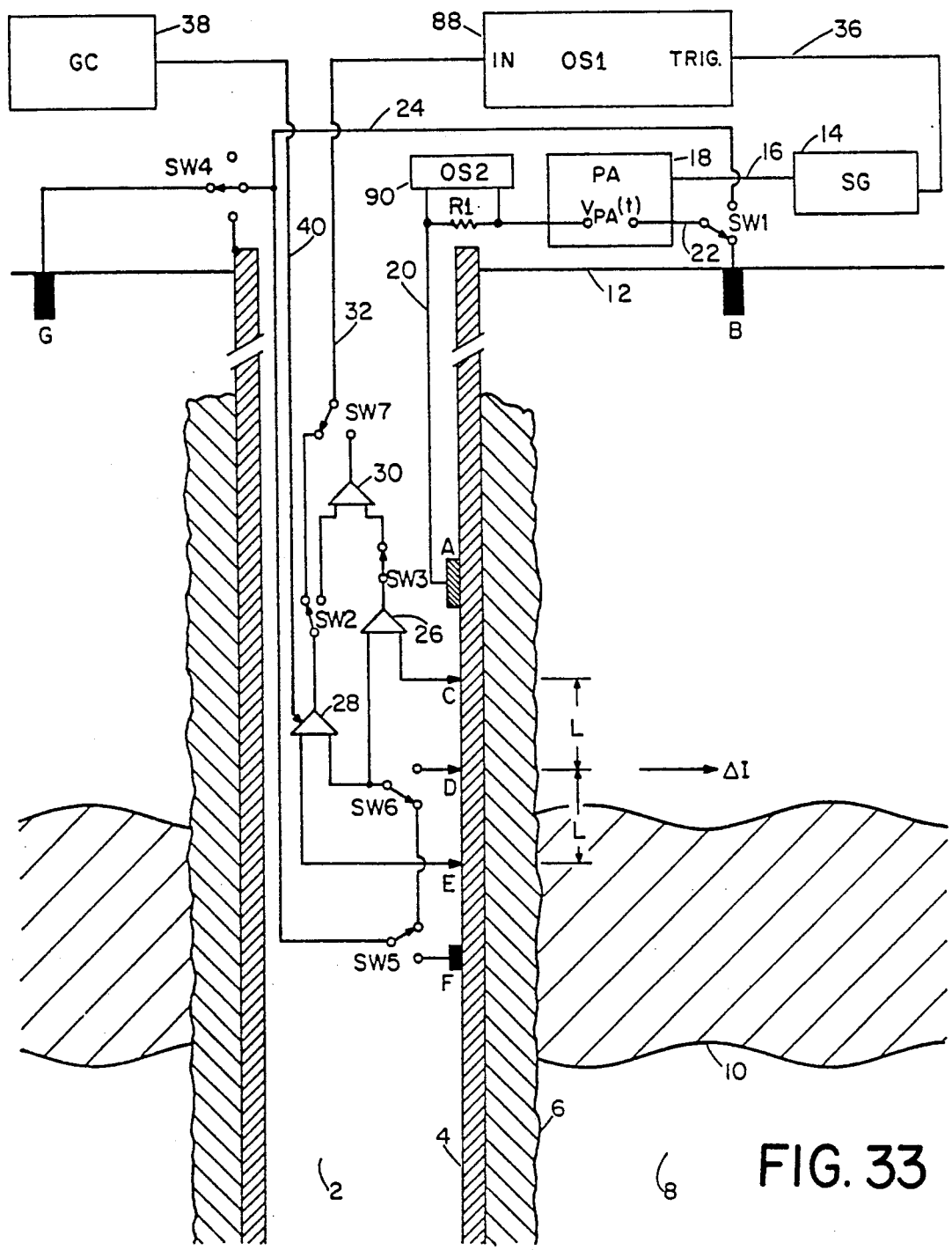
FIG. 33 shows a sectional view of the preferred embodiment of the invention which shows how $V_o$ is to be measured with an oscilloscope.

If a time varying current I(t) passes through meter 42 in FIG. 1, then the voltage of the casing near electrode A with respect to an infinitely distant reference electrode becomes a time varying voltage $V_o(t)$ which produces a differential voltage signal $V_3(t)$ from amplifiers 26, 28, and 30 respectively due to the time varying loss of current $\Delta I(t)$ between electrodes C,D, and E into formation. FIG. 32 shows the measurement of $V_3(t)$ by an oscilloscope 88 labeled as OS1 in the drawing. The oscilloscope receives its trigger from cable 36 from the sync output of the signal generator. The measurement of I(t) is accomplished by measuring the differential voltage across resistor R1 with oscilloscope 90 which is labeled as OS2 in FIG. 32. The output of the power amplifier PA is identified as $V_{PA}(t)$. The quantity $V_o(t)$ is measured as shown in FIG. 33. This figure is similar to FIG. 3 except $V_o(t)$ is measured with the oscilloscope 88 which receives it's trigger from cable 36 attached to the sync output of the signal generator. Here too, R1 allows measurement of I(t) with oscilloscope 90.

Figure 34:
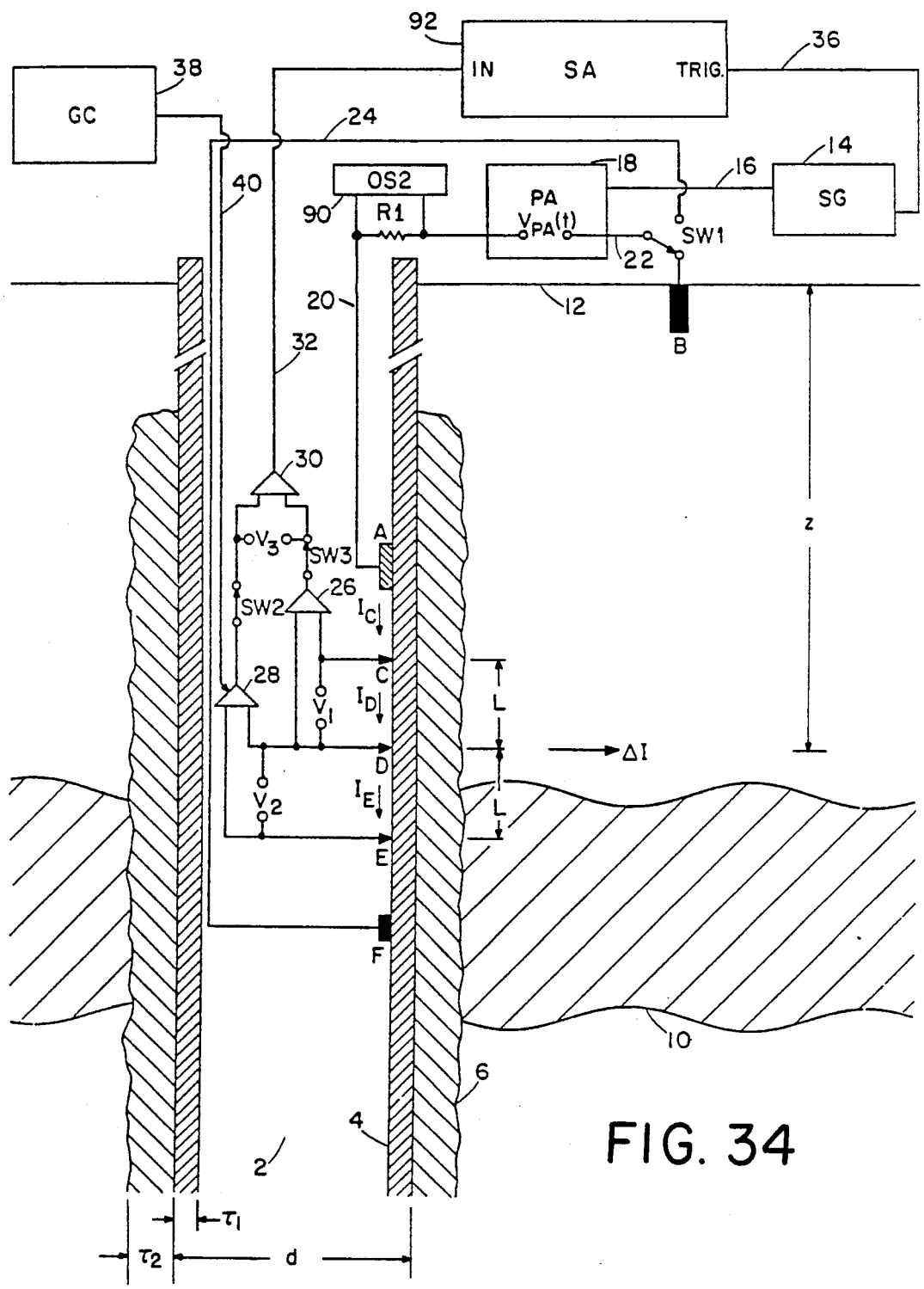
FIG. 34 shows a sectional view of another preferred embodiment of the invention which shows how measurements are to be made with a signal averager.
Figure 35:
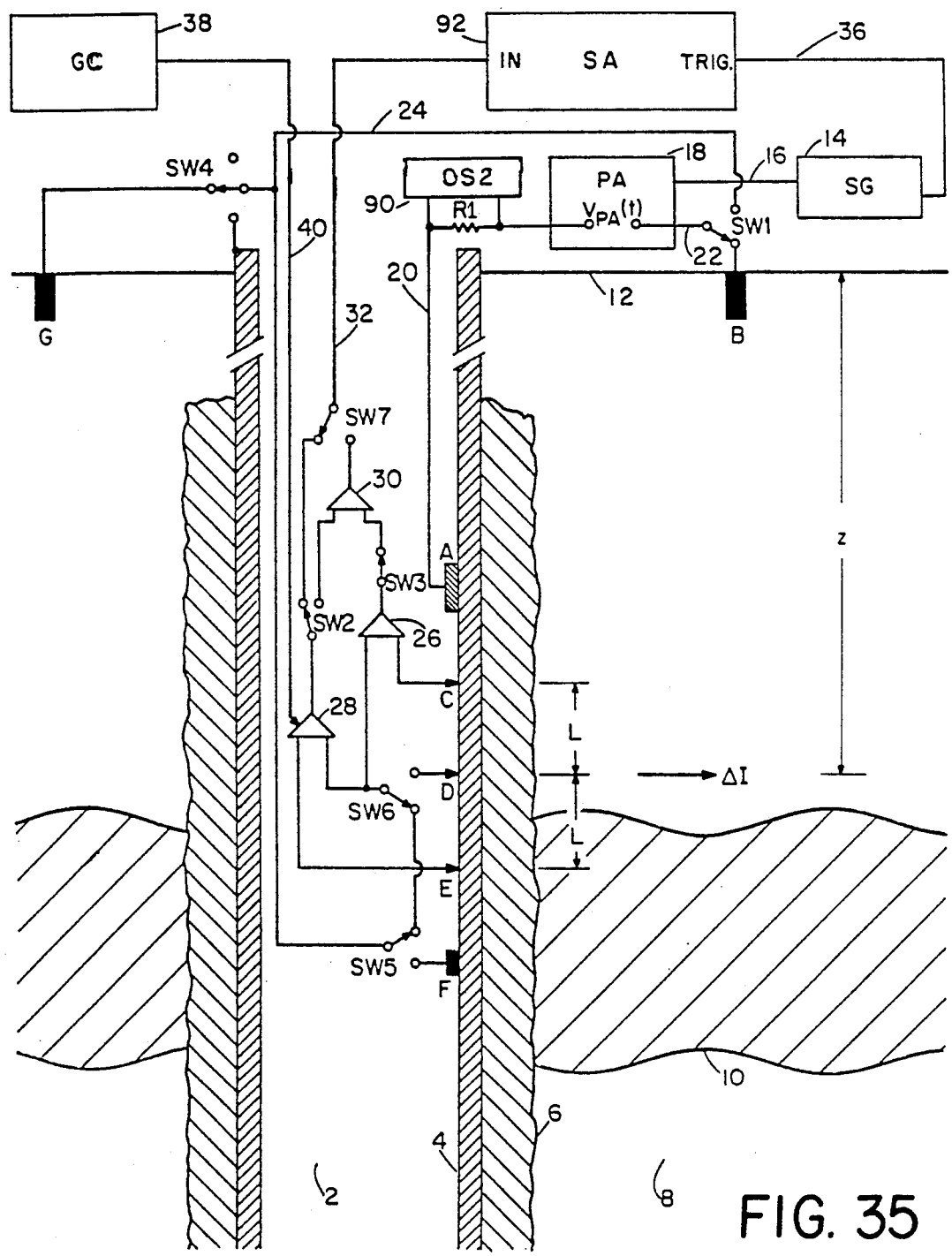
FIG. 35 shows a sectional view of the preferred embodiment of the invention which shows how $V_o$ is to be measured with a signal averager.
Figure 36:
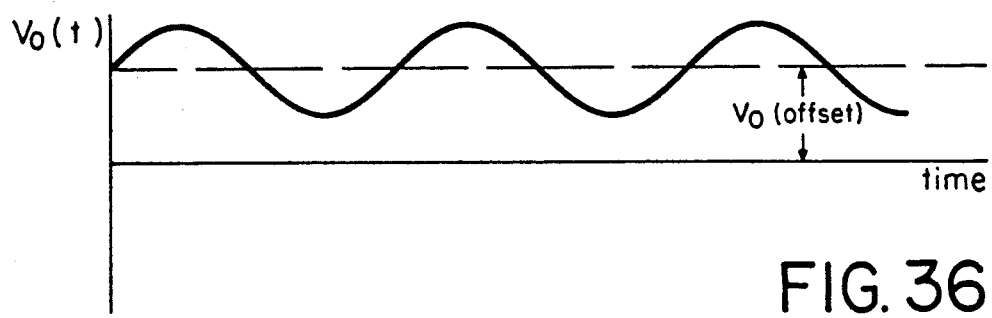
FIG. 36 shows a plot of $V_o(t)$ for a particular set of experimental circumstances which is measured with a signal averager.

Another way to measure such waveforms is by using a signal averager in place of the oscilloscope OS1. Suitable signal averagers are manufactured by many firms including EG&G Princeton Applied Research Corporation (op. cit.). FIG. 34 is nearly identical to FIG. 32 except the signal averager 92 marked as SA in FIG. 34 replaces the oscilloscope 88 in FIG. 32. And furthermore, FIG. 35 is identical to FIG. 33 except here the signal averager 92 marked as SA in FIG. 35 replaces the oscilloscope 88 in FIG. 33. Signal averagers are used to enhance the signal-to-noise ratio of repetitive waveforms which may have arbitrary shapes in time.

In addition, the signal generator 14 has been defined to include all manner of signal generators capable of providing the required voltage waveforms to measure the various parameters desired. Specifically, for the cases which follow, it is convenient to explicitly use a form of signal generator also known as an arbitrary waveform generator to perform said measurements. An example of such an instrument is the Model 175 Arbitrary Waveform Generator supplied by Wavetek, Corp. (9045 Balboa Avenue, San Diego, California 92138). Such an arbitrary waveform generator may also require a means of programming it, such as a computer with a suitable communications interface. However, the signal generator is to be viewed here as a voltage source which supplies periodic waveforms (including one-shot waveforms) which operates at frequencies from one millihertz to 20 kilohertz, and has arbitrary shapes of voltage vs. time which may be defined by the user of the signal generator.

Therefore, the invention has provided means to measure the arbitrary time response to $V_3(t)$, $\Delta I(t)$, $V_o(t)$, and I(t). And now it is possible to discuss the response of $V_3(t)$ and $\Delta I(t)$ to applied $V_o(t)$ or applied I(t) which may be asymmetric, or transient waveforms, or both. For example, a chosen $V_o(t)$ which is the sum of a small A.C. voltage and a larger D.C. offset voltage may be applied to the formation, and then $V_3(t)$ and $\Delta I(t)$ can be determined. Or I(t) may be a current step, and then $V_3(t)$ and $\Delta I(t)$ could be determined. (The shape of the current may be controlled by varying the voltage supplied by the arbitrary waveform generator until the shape of the current through resistor R1 on oscilloscope OS2 looks appropriate.) Basically, polarization effects may be observed with such transient techniques. And furthermore, such effects can be either enhanced or minimized using such techniques as shown by the following examples.

Figure 37:
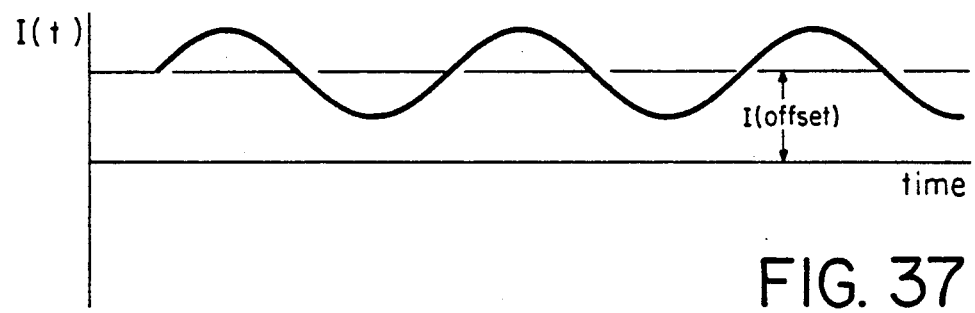
FIG. 37 shows a plot of the response of I(t) to $V_o(t)$ shown in FIG. 36.
Figure 38:
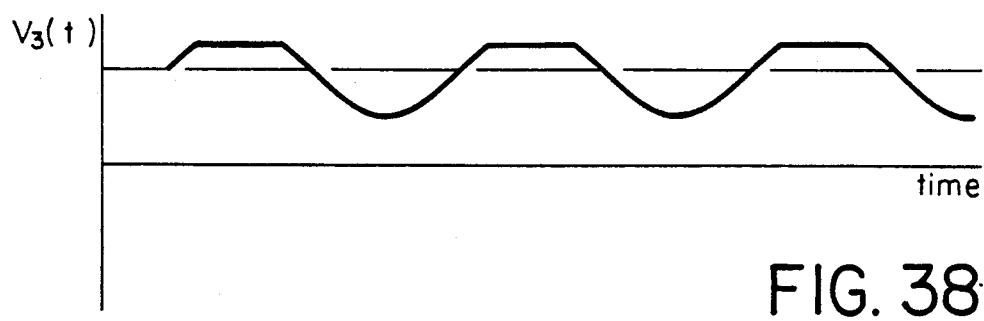
FIG. 38 shows a plot of the response of $V_3(t)$ to $V_o(t)$ shown in FIG. 36.
Figure 39:
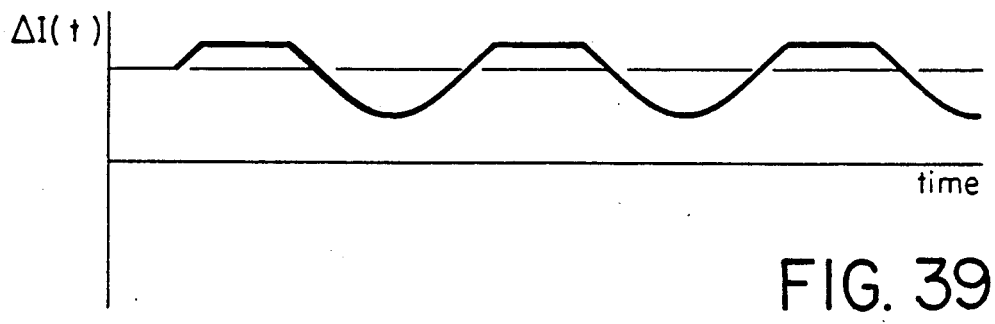
FIG. 39 shows a plot of the response of $\Delta I(t)$ of $V_o(t)$ shown in FIG. 36.

FIGS. 36 through 39 show one set of curves for one method of measurement. Here, the voltage from the arbitrary waveform generator is adjusted using instrumentation in FIG. 35 until the voltage $V_o(t)$ looks like that shown in FIG. 36. There is a sinusoidal variation in $V_o(t)$ on top of a larger D.C. offset labeled as $V_o$(offset) in FIG. 36. FIG. 37 shows the corresponding response of the total current I(t) conducted into the formation as measured with oscilloscope OS2 in FIG. 35. The signal averager 92 in FIG. 34 would then display the voltage $V_3(t)$ as shown in FIG. 38. The differential current $\Delta I(t)$ vs. time conducted into formation between electrodes C and E in FIG. 34 is shown in FIG. 39. In particular, both $V_3(t)$ in FIG. 38 and $\Delta I(t)$ in FIG. 39 show evidence of "rectification phenomena" associated with asymmetric ionic flow characteristic of the presence of clay materials as previously described. By taking data for various different intentionally set offset voltages $V_o$(offset), various types of polarization phenomena may be measured as previously described.

Figure 40:
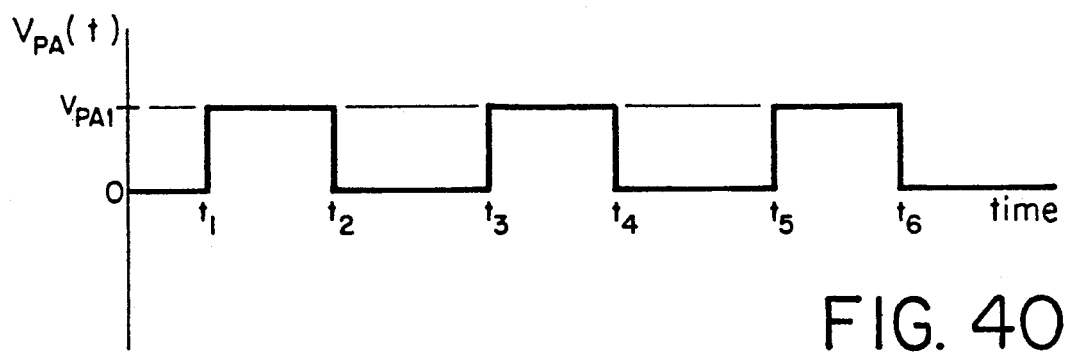
FIG. 40 shows the voltage output for the power amplifier $V_{PA}(t)$ for one set of experimental circumstances.
Figure 41:
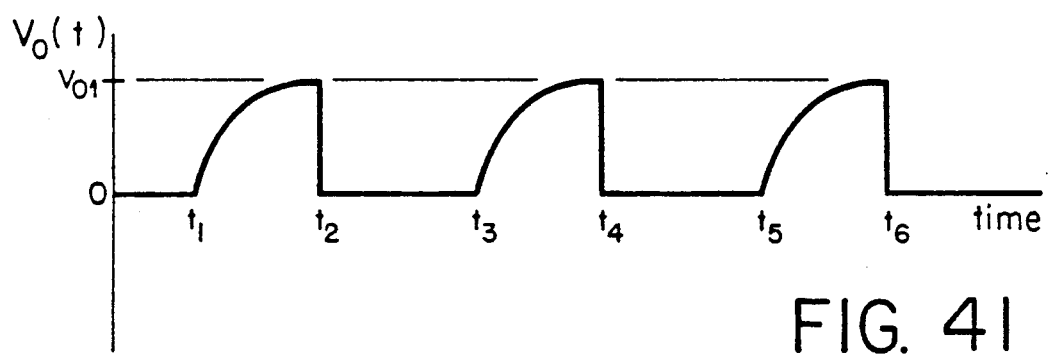
FIG. 41 shows a plot of $V_o(t)$ in response to $V_{PA}(t)$ shown in FIG. 40.
Figure 42:
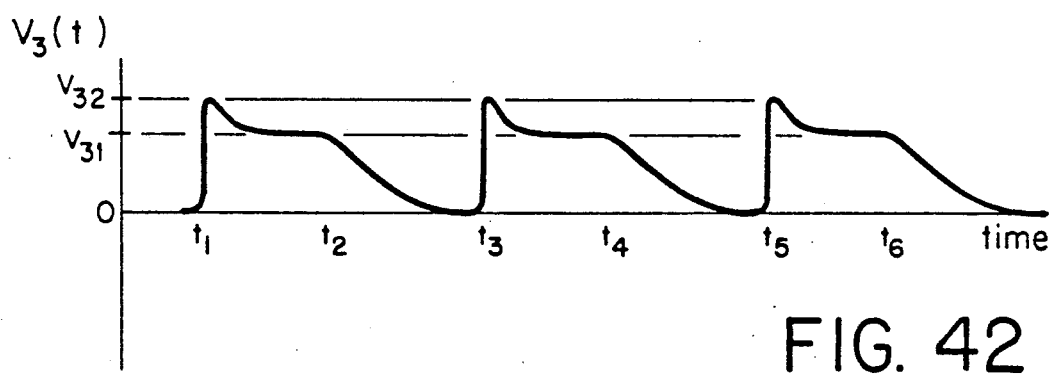
FIG. 42 shows a plot of $V_3(t)$ in response to $V_{PA}(t)$ shown in FIG. 40.
Figure 43:
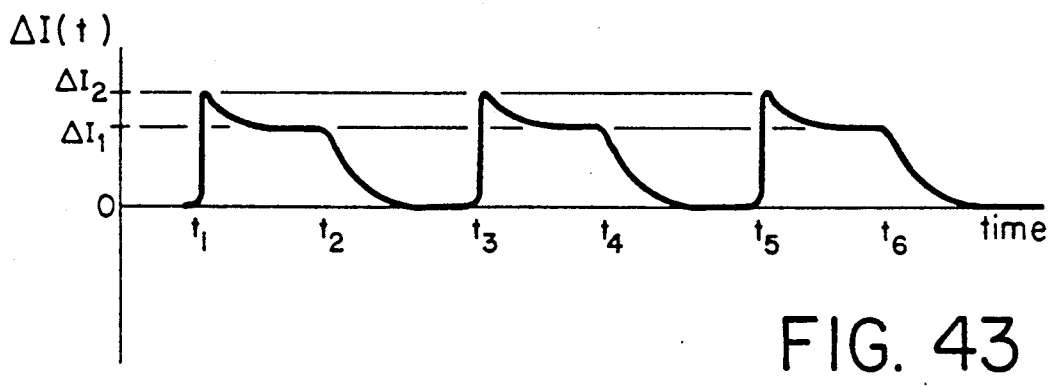
FIG. 43 shows a plot of $\Delta I(t)$ in response to $V_{PA}(t)$ shown in FIG. 40.

FIGS. 40 through 43 show yet another method of measurement. Here, the voltage from the signal generator which is an arbitrary waveform generator is adjusted in FIG. 35 until the voltage output of the power amplifier, $V_{PA}(t)$, looks like the offset square wave as shown in FIG. 40. The current I(t) is monitored by observing the current through R1 with oscilloscope OS2. The actual casing potential near electrode A, $V_o(t)$, will therefore look approximately as shown in FIG. 41. The differential voltage $V_3(t)$ consequently looks approximately as shown in FIG. 42. And the differential current $\Delta I(t)$ conducted into formation is shown in FIG. 43. The waveforms in FIG. 42 and 43 look like waveforms associated with a "leaky capacitor" occasionally seen in electronics laboratories, and this is for good reason.

The casing problem here resembles a "leaky capacitor" for detailed analysis. The casing itself resembles the inner electrode of a cylindrical capacitor, and the earth at infinity can be identified with the outer electrode of the hypothetical cylindrical capacitor. The material in this conceptual capacitor has a resistivity, and much of the preferred embodiment of the invention is directed at measuring that quantity. However, the rock contains fluids, primarily salt water and oil, and these fluids are dielectrics. The presence of the electric field on the outer portion of the casing which points radially away from the casing tends to polarize any liquids present. It is generally known that the dielectric constant for water is much greater than the dielectric constant for oil at low frequencies, because water is a polar molecular which orients in the applied electric field whereas oil is not usually a highly polar molecule. The relative dielectric constant of oil is typically around the value of 2 compared to free space, and the relative dielectric constant of water is approximately 80 times that of free space (please see *Applied Geophysics*, W. M. Telford, et al., Cambridge University Press, New York, 1981, table 5.7, p. 456). Of course the dielectric constant of the formation adjacent to the casing is dependent upon other variables such as the pore structure, pressure, temperature, and other parameters, but all other variables being constant, the dielectric constant of a formation containing water is much greater than an equivalent formation containing petroleum.

The physical processes in the hypothetical leaky capacitor are perhaps best explained in terms of FIGS. 40 thru 43. As already cited, good background material concerning polarization effects which produce surface charges is given in Sections 30-3, 30-4, and 30-5 in David Halliday, et al., op. cit. When $V_{PA}(t)$ is applied to the casing at time $t_1$, then the local casing potential $V_o(t)$ eventually raises to the voltage $V_{01}$ shown in FIG. 41 by the time $t_2$ is reached, and any oil and water present is polarized by the electric field applied to the formation adjacent to the energized casing.

The formation also simultaneously conducts current via the usual resistivity mechanisms already described. Therefore, if no polarization phenomena were present, then the capacitor would conduct current $\Delta I_1$ as defined in FIG. 43. But the extra current required to polarize the molecules present results in an "overshoot" to $\Delta I_2$ in FIG. 43 at time $t_1$. By the time $t_2$ is reached, when the voltage $V_{PA}(t)$ applied to the formation is discontinuously set to zero, there still exists charge on the outside of the casing due to the polarized molecules present which needs to be discharged through the casing and the adjacent resistive formation. (The surface charge is conducted to "ground" by the usual conduction processes through the geological formation.) Therefore even through the driving voltage, $V_{PA}(t)$ is zero at time $t_2$, the discharging surface charge creates a momentary current flow, which flows off the casing and into the formation. Therefore, the resulting differential voltage $V_3(t)$ does not instantaneously go to zero, but instead behaves in general as shown between $t_2$ and $t_3$ in FIG. 42. There also exists a momentary flowing current $\Delta I(t)$ as shown between times $t_2$ and $t_3$ in FIG. 43. The rounded shapes of the waveforms in FIGS. 42 and 43 are due to the skin depth effects of the casing which electronically behave like low-pass filters to current flow. This information may be used to obtain the average dielectric constant of the region of the geological formation adjacent to the borehole casing using the following methods of analysis.

For this analysis, it is necessary to determine the charge per unit length on the outside of the casing after the casing achieves a certain voltage level. It is perhaps easiest to calculate this quantity during the application of the voltage step to the casing between time $t_1$ to $t_2$. With reference to FIG. 43, before application of the voltage step, the casing is assumed to be discharged (the separation in time from $t_2$ to $t_3$ is chosen to allow discharge of the casing). And the time difference between $t_1$ and $t_2$ is chosen to allow a steady state to be achieved after the voltage step is applied. The effects of the resistivity allows conduction of the steady state current $\Delta I_1$ into formation. However, during the application of the voltage step, there is an overshoot in the current from the value of $\Delta I_1$ to a peak value of $\Delta I_2$ shown in FIG. 43 which subsequently decreases back to the steady state "resistivity" component of the current $\Delta I_1$. This "overshoot" in the current physically results in charging up the exterior of the casing to the voltage level of $V_{01}$ defined in FIG. 41. Therefore, the charge per unit length on the outside of the casing between electrodes C and E is given by the following:

$$Q = \int_{t_1}^{t_2} \{\Delta I(t) - \Delta I_1\} \, dt/(2L) \qquad \text{Eq. 27}$$

Since the voltage to which the capacitor charges is also known from FIG. 41 (the quantity $V_{01}$ in FIG. 41), then the capacitance per unit length C can be computed from the following definition of the capacitance:

$$C = Q/V_{01} \qquad \text{Eq. 28}$$

The finite length of casing between electrodes C and E can be approximated mathematically for convenience as an ellipsoid of revolution where the length is 2L and the diameter is d. Then the capacitance of such an ellipsoid is given by the following equation where $\kappa$ is the relative dielectric constant of the medium, and $\epsilon_o$ is the dielectric constant of free space (M.K.S. units). (Please see G. T. Tagg, p. 94, op. cit. for the basic equation in C.G.S. units, and to *Classical Electrodynamics* by John David Jackson, John Wiley & Sons, Inc., New York, Fifth Printing, 1966, p. 619 for conversion of C.G.S. units to M.K.S. units.)

$$C = 4\pi \kappa \epsilon_o L / Ln(4L/d) \qquad \text{Eq. 29}$$

Therefore, the relative dielectric constant $\kappa$ of the medium adjacent to the casing is given as follows, where the experimentally measured variables of Q, and $V_{01}$ are explicitly shown for convenience:

$$\kappa = Q \, Ln(4L/d)/(4\pi \epsilon L \, V_{01}) \qquad \text{Eq. 30}$$

The relative dielectric constant $\kappa$ of the geological formation adjacent to the casing is useful for a variety of reasons. The relative dielectric constant can be approximated to first order by the sum of the volumes of materials present $v_i$ times their individual relative dielectric constants $\kappa_i$ which is in turn divided by the total volume of the sample as follows:

$$\kappa = \sum_i (\kappa_i v_i) / \sum_i v_i \qquad \text{Eq. 31}$$

This approximation neglects important fluid boundary effects, and other corrections, but is reasonable as a starting point for discussion. However, the dielectric constant of water is much larger than either the dielectric constant of the oil or rock present, and therefore, if at least some water is present, then the dielectric constant measured is due primarily to the water. Under these circumstances, the relative dielectric constant is given by the following:

$$\kappa \approx \gamma_w \cdot S_w \cdot \Phi \qquad \text{Eq. 32}$$

Here, $\gamma$ is the tool calibration constant, $\kappa_w$ is the relative dielectric constant of water, $S_w$ is the saturation factor of water present, and $\Phi$ is the porosity of the formation. The porosity $\Phi$ is the amount of "hole" space in the rock, and $S_w$ is the fraction of hole space filled with water. (For additional information on terminology and an explanation of how oil in place is measured, please refer to John T. Dewan, op. cit.)

From Eq. 32, if the porosity is known, then the water saturation $S_w$ is known. The porosity in general is known from original logs taken before the casing was set. Or the porosity can be reasonably measured with the current generation of through-casing tools using neutron tools, acoustic velocity tools, or density tools. If no gas is present, then the amount of oil in place (O.I.P.) is given as follows:

$$O.I.P. = (1 - S_w) \Phi \qquad \text{Eq. 33}$$

If gas is also present, the "O.I.P." gives the volume of oil and gas present. Such methods of analysis are generally discussed in John T. Dewan, ibid.

The above theory for the capacitance neglects important electrochemical phenomena which may have a large influence on the effective relative dielectric constants $\kappa_i$ and on other parameters which may significantly enhance the size of the capacitance calculated from Eq. 29. The formula is included here to help explain how the invention works, and may not include all relevant numerical terms. The measured calibration factor $\gamma$ for the tool as defined in Eq. 32 is used to adjust for such limitations of the theory.

Figure 44:
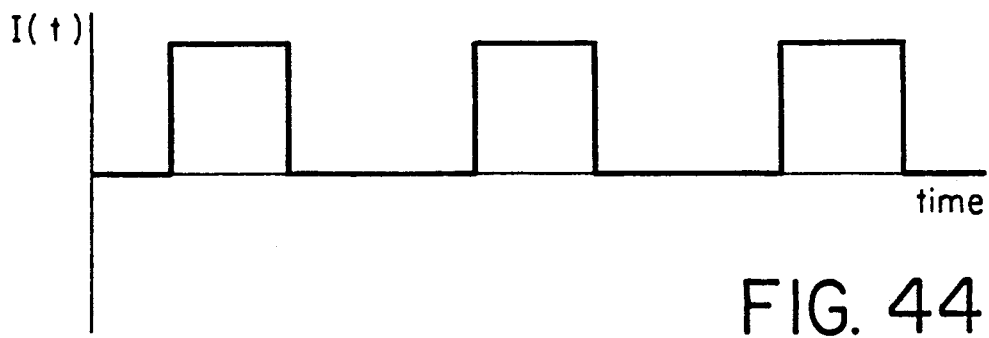
FIG. 44 shows a plot of the driving current I(t) used for transient response measurements.
Figure 45:
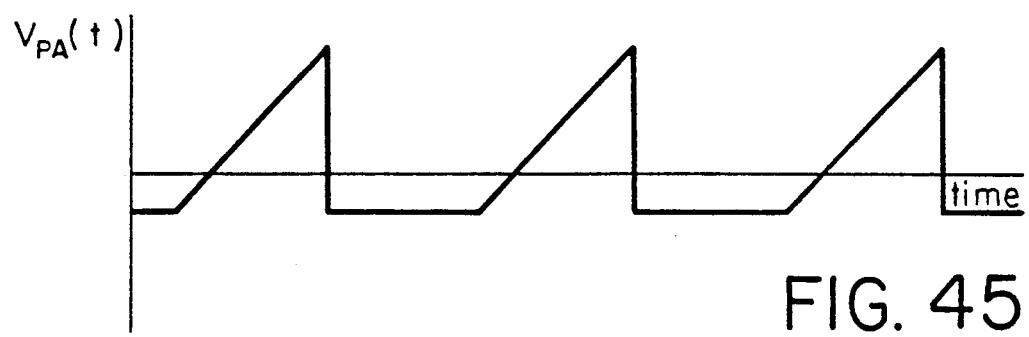
FIG. 45 shows a plot of a driving voltage $V_{PA}(t)$ used for transient response measurements.
Figure 46:
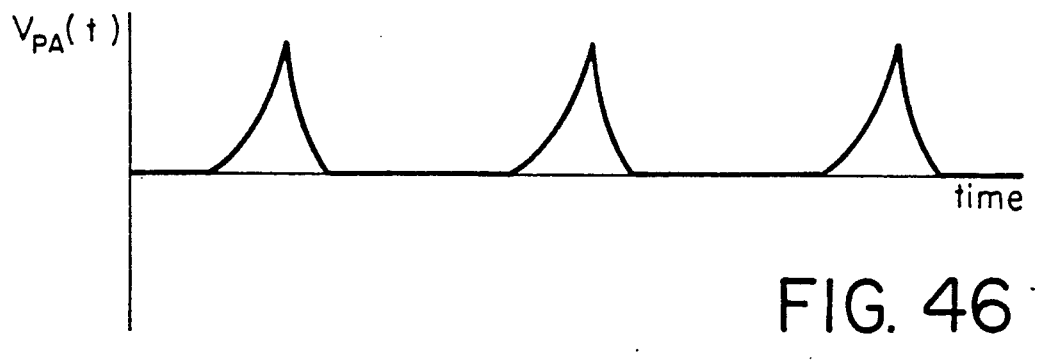
FIG. 46 shows a plot of another driving voltage $V_{PA}(t)$ used for transient response measurements.
Figure 47:
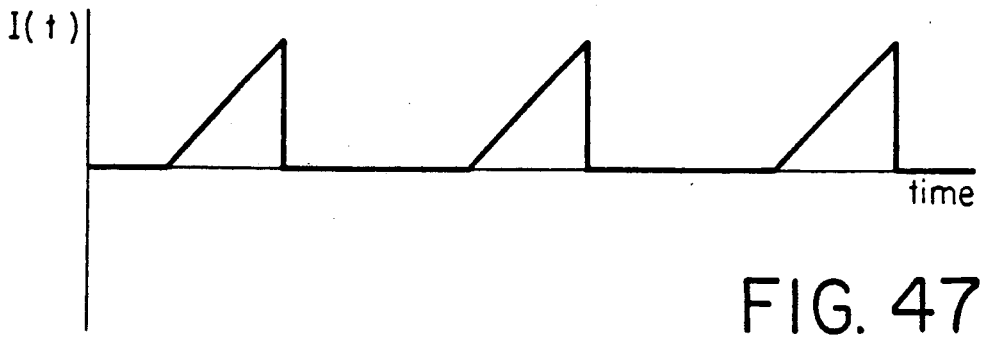
FIG. 47 shows another plot of a driving current I(t) used for transient response measurements.

In the above analysis, the "driving" element is the voltage $V_{PA}(t)$ delivered by the power amplifier. In fact, any type of "voltage drive" can be delivered by the power amplifier, and the data analyzed to determine resistivity and capacitance. Any type of "current drive" can also be provided by the power amplifier 18 and the data analyzed in principle to separate effects of resistivity and capacitance. For example, FIG. 44 shows a form of current drive where the output of the voltage from the power amplifier $V_{PA}(t)$ which is controlled by the signal generator which is an arbitrary waveform generator is adjusted until the current I(t) passed between electrodes A and B looks like FIG. 44 and measurements performed. And similarly, the output of the power amplifier could be chosen as shown in FIG. 45. And again, the voltage output of the power amplifier could be chosen to look like FIG. 46 as desired by the operator. And lastly, another form of current drive is shown in FIG. 47 wherein the arbitrary waveform generator is used to generate a voltage output from the power amplifier $V_{PA}(t)$ such that the current passed between electrodes A and B looks like that shown in FIG. 47 and measurements performed. One technique may have a better sensitivity than another, but in principle, various different current or voltage waveforms applied to the casing result in differential current flow into the geological formation which may be measured with two or more pairs of voltage measurement electrodes to infer the resistivity of the adjacent formation, the capacitance of the casing adjacent to the formation, and hence the dielectric constant of the adjacent fluids. Any frequency, sweep, voltage ramp, or triangle waveform can also be used. Different types of voltage and current drives between electrodes are used for similar analysis in the chemistry field, and will work here to various degrees of success. Please refer to Chapter 5 entitled "Techniques of Measurement" in Ilana Fried, op. cit. and Section 1.6 entitled "Electroanalytical Techniques" in Derek Pletcher, op. cit.

Figure 48:
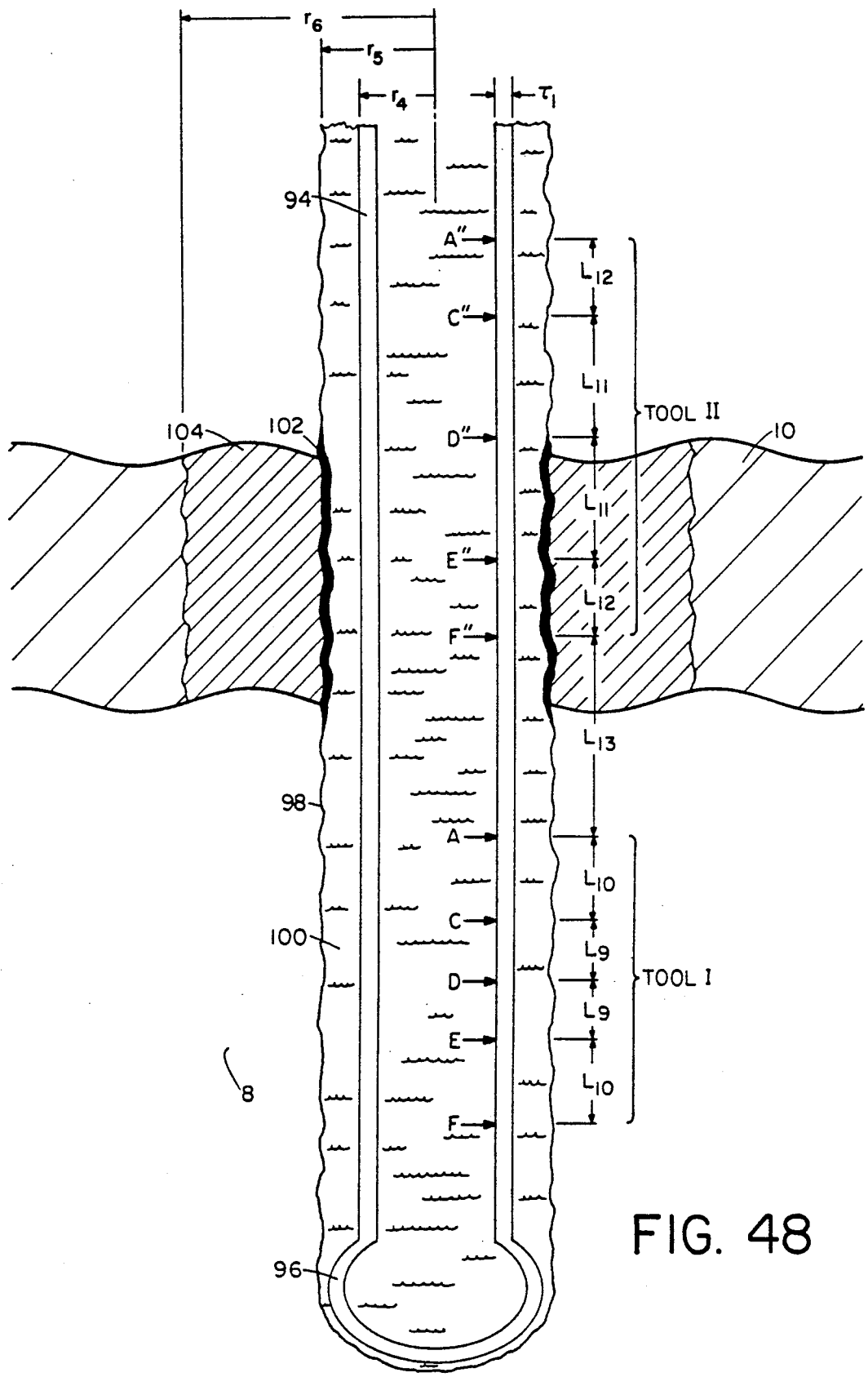
FIG. 48 shows a sectional view of the invention used to measure formation properties through a drill stem attached to a drilling bit.

FIG. 48 shows another application for the Thru Casing Resistivity Tool. A drill stem 94 used to turn a drilling bit 96 has drilled an open-hole 98 through the geological formation 8 and through oil bearing formation 10. As is usually the case, drilling fluids 100 fill the open borehole. And as is typically the case in porous regions such as in oil bearing formations, a "cake" 102 forms on the wall of the open borehole due to the invasion of fluids into the formation. The "invaded zone" of the formation is labeled as 104. The radius of the drill string is $r_4$, the thickness of the drill string pipe is $\tau_1$, the radius of the open hole at any given vertical position is $r_5$, and the radius of the invasion zone at any vertical position is $r_6$. Two individual Thru Casing Resistivity Tool apparatus are lowered into the inside of the drill stem while the drilling bit is stopped which are labeled Tool I and Tool II in FIG. 48. Tool I has electrodes A, C, D, E, and F which are defined functionally in FIG. 1. Electrodes C and D, and D and E are separated by the distance $L_9$. The distance $L_{10}$ separates electrodes A and C and electrodes E and F. Measurements are performed with the apparatus as defined conceptually in FIGS. 1 and 3 and in FIGS. 34 and 35. In addition, another independent tool, labeled Tool II, is mechanically connected to Tool I and has electrodes A″, C″, D″, E″, and F″. The distances $L_{11}$, $L_{12}$, and $L_{13}$ are defined in FIG. 48.

Because Tool I and Tool II have different separations of voltage measurement electrodes ($L_9$ and $L_{11}$ respectively), then their depths of investigation of the formation will be different. Therefore, if the resistivity of the drilling fluids are known, and $L_9$ and $L_{11}$ are chosen suitably, then the apparatus can measure the resistivity of the far zone and that of the invaded zone using the usual analysis techniques for such measurements which are routinely used in the measurement of open hole resistivity logs. This type of tool is superior to other "measurement while drilling" or "measurement while drilling bit stopped" techniques because this tool requires no downhole maintenance. If something goes wrong with the tool, then the tool may be removed from the drill stem and another inserted for measurement, and the drilling bit need not be removed from the hole which is a time consuming and therefore expensive process. Any number of tools resembling Tool I and Tool II can be used inside the drill stem for different purposes, including just one tool to three or more such tools. The resistivity of the drilling mud may also be independently measured at the surface of the earth which will allow corrections to the acquired data thereby allowing greater accuracy in the calculated resistivity of the geological formation.

In addition, the size of the measured signal due to the differential current conducted into formation is proportional to the resistivity of the drill stem, and inversely proportional to its thickness, and its diameter. Therefore, portions of the drill stem may be intentionally fabricated from relatively high resistivity materials to enhance the signal for measurement purposes. Portions of the drill stem may be heat treated differently thereby causing differences in the resistivity along its length for example. Different materials can be welded together causing changes in the resistivity of the drill stem. The drill stem's geometry over specific portions of its length can be changed to enhance the differential voltage signal. Furthermore, such modifications of the drill stem can also be used to change the effective radius of penetration of the tool to help determine differences between the far region of the formation, the invaded zone, and borehole fluids.

In addition, magnetic fields on the inside of the casing can be used to adjust the magnetic permeability of the casing material. The skin depth of the casing is a function of the magnetic permeability as shown in Eq. 22. Therefore, magnetic means located on the inside of borehole casing or a drill stem can be used to magnetically saturate the steel pipe, which therefore substantially changes the magnetic permeability which in turn changes the effective skin depth. Such effects can also be used to adjust the radius of investigation of the invention in a drill stem, or inside any iron casing which is inside any typical cased well.

In addition, another variation of the invention is a true measurement-while-drilling apparatus. A permanently located downhole tool with electrode configurations shown in FIG. 48 can obtain its power from flowing mud in the hole. Then multi-electrode measurements can be performed and the results sent to the surface by encoded mud pressure pulses as is typical in the industry.

And in addition, measurements of the electronic properties of formations through casing may be performed while simultaneously subjecting the formation and the casing to an acoustic energy source. For example, resistivity measurements may be performed thru casing while conducting a current of one frequency through casing. If the acoustic source is energized at another frequency, then the differential current conducted into formation will be modulated at the sum and difference frequencies because the resistivity of the formation will be acoustically modulated. And since the elastic properties of cement and the surrounding geological formation are different, methods based on the acoustic modulation of formation resistivity may be used to determine the presence or absence of cement surrounding the casing. Similarly, measurements of electrochemical phenomena can be performed while simultaneously subjecting the formation to an acoustic source. Convenient acoustic sources inside casing are piezoelectric crystals and any type acoustic source may be used outside the casing on the surface of the earth or in another borehole.

Any finally, yet another variation of the tool can be used to monitor water quality in fresh water wells. In many cases, fresh water wells contain pipes which carry water to the surface for consumption. Monitoring such wells for contamination is now a major problem in many areas of the nation. The invention may be used to monitor resistivity and polarization phenomena through well pipes to monitor water quality.

While the above description contains many specificities, these should not be construed as limitations on the scope of the invention, but rather as exemplification of preferred embodiments thereto. As has been briefly described, there are many possible variations. And despite the fact that much specific and detailed theory has been presented which explain the microscopic physical processes which pertain to the invention, and even if such theory improves in time with later physical investigations and measurements, none-the-less, independent of the detailed physical processes at work, the invention provides a means to measure the resistivity and the dielectric constant of the adjacent geological formation through borehole casing. Accordingly, the scope of the invention should be determined not only by the embodiments illustrated, but by the appended claims and their legal equivalents.

What is claimed is:

1. A method for measuring electrochemical phenomena of formations adjacent to a cased borehole comprising the steps of:
   applying a time varying current to the casing in the proximity of the specific portion of the formation to be tested;
   selectively receiving at least a portion of the current at a point sufficiently remote from the current entry point to insure that a significant portion of the applied current introduced at the current entry point enters the formation along the length of the borehole casing;
   detecting the voltage level at a plurality of at least three spaced apart voltage measuring points along the casing, wherein the disposition of voltage measuring points defines a portion of the casing that is adjacent to the specific portion of the formation to be tested; and
   measuring the magnitudes of the differential voltages between a plurality of discrete pairs of said spaced apart voltage measuring points and the phases of the differential voltages with respect to the applied current to measure electrochemical phenomena of the formations.

2. A method as recited in claim 1 wherein the voltage measuring points are vertically spaced apart within the casing and the monitored formation is a geological formation.

3. A method as recited in claim 1 wherein the electrochemical phenomena measured includes formation polarization phenomena and wherein the current introduced to the casing is an alternating current having a frequency in the range of 0.01 to 5.0 Hz.

4. A method as recited in claim 1 wherein the electrochemical phenomena measured includes formation resistivity and wherein the current introduced to the casing is an alternating current having a frequency in the range of 0.1 to 20 Hz.

5. A method as recited in claim 1 wherein the monitored formation is a cement layer adjacent to the casing.

6. A method as recited in claim 5 wherein said voltage measuring points are horizontally spaced apart within the casing.

7. A method as recited in claim 1 wherein the monitored formation is a reservoir of water.

8. A method as recited in claim 1 further comprising the step of introducing known quantities of fluids having known electrical resistivities into the formation being tested to provide information indicative of the permeability of the adjacent geological formation and the presence of fractures within said formation.

9. A method as recited in claim 1 further comprising the step of determining the local casing potential of the formation to determine additional information useful for measuring the electrochemical phenomena of the formation.

10. A method as recited in claim 1 further comprising the step of calibrating the measurements to compensate for variations within the casing.

11. A method as recited in claim 10 wherein:
said calibrating step including the substeps of causing a calibration current to flow through the casing between a first calibration point disposed on a first side of the voltage measuring points and a second calibration point disposed on the opposite side of the voltage measuring points, and comparing the voltage differentials between the discrete pairs of voltage measuring points in response to the calibration current to determine a calibration parameter that is a function of proportional magnitudes of said voltage differentials; and
the method further comprises the steps of proportionally amplifying the differential voltage between a first pair of voltage measuring points during said measuring step by the calibration parameter to calibrate the measurements to account for variations in the casing's electrical properties.

12. A method as recited in claim 10 further comprising the step of proportionally amplifying a first voltage output indicative of the differential voltage between a first discrete pair of said voltage measuring points by a calibration parameter determined by said calibrating step to compensate for variations within the casing.

13. A method as recited in claim 12 wherein the differential voltage between a second discrete pair of said voltage measuring points is characterized by a second voltage output, the method further comprising the step of measuring a third voltage output indicative of the difference between said first and second voltage outputs, said third voltage output being indicative of the differential in the current conducted into formation between said first and second discrete pairs of voltage measuring points.

14. A method as recited in claim 1 further comprising the step of repeating the method using multiple different signals as the applied current.

15. A method as recited in claim 14 wherein the applied current signals chosen are selected to facilitate the investigation of polarization effects, the skin effects of the casing, dielectric constant effects, and the resistivity of the formation.

16. A method as recited in claim 14 wherein the applied current signals include sinusoidally time varying currents at different frequencies of operation.

17. A method as recited in claim 1 further comprising the step of determining the resistance between each discrete pair of voltage measuring points to facilitate quantitative computation of the amplitude and phase of the time varying differential current conducted into formation.

18. A method as recited in claim 1 wherein:
the applied current includes a sinusoidal current at a frequency in the range of 0.001 to 5 Hz; and
the method further comprising the step of determining the local casing potential of the borehole casing in the vicinity of the formation to be tested to provide information for estimating the capacitance of the casing adjacent to the formation to be tested which provides a measure of the dielectric constant of the fluids within the adjacent formation.

19. A method as recited in claim 1 wherein the current is received at a point in contact with the earth's surface and spaced apart from the casing.

20. A method as recited in claim 1 wherein the current is received at a point on the casing that is sufficiently remote from the current entry point to insure that a majority of the current introduced at the current entry point enters the formation along the length of the borehole casing.

21. A method for measuring electrochemical phenomena of formations adjacent to a cased borehole using an instrument, the method comprising the steps of:
calibrating the instrument to compensate for variations in the casing's electrical properties;
applying a first time varying current to the casing in the proximity of the specific portion of the formation to be tested;
selectively receiving at least a portion of the current at a point sufficiently remote from the current entry point to insure that a majority of the current introduced at the current entry point enters the formation along the length of the borehole casing;
detecting the voltage level at a plurality of at least three spaced apart voltage measuring points along the casing, wherein the disposition of voltage measuring points defines a portion of the casing that is adjacent to the specific portion of the formation to be tested;
measuring the magnitudes of the differential voltages between a plurality of discrete pairs of said spaced apart voltage measuring points and the phases of the differential voltages with respect to the applied current to measure electrochemical phenomena of the formations, the measured differential voltages including a first voltage output indicative of the differential voltage between a first discrete pair of said voltage measuring points and a second voltage output indicative of the differential voltage output between a second discrete pair of voltage measuring points;

proportionally amplifying the first voltage output by a calibration parameter determined by said calibrating step to compensate for variations within the casing;

measuring a third voltage output indicative of the difference between the proportionally amplified first voltage output and the second voltage output, said third voltage output being indicative of the differential in the current conducted into formation between said first and second discrete pairs of voltage measuring points;

repeating said measurements using multiple different signals as the applied current;

using said measurements to infer information about the electrochemical properties of the formations; and wherein said calibrating step includes the substeps of causing a calibration current to flow through the casing between a first calibration point disposed on a first side of the voltage measuring points and a second calibration point disposed on the opposite side of the voltage measuring points, and comparing the first and second voltage outputs in response to the calibration current, the calibration parameter being a function of the proportional magnitudes of said first and second voltage outputs in response to said calibration current.

22. A method as recited in claim 21 wherein the selected applied currents include a variety of different sinusoidal current frequencies substantially in the range of 0.01 Hz to 1 Hz, a frequency interval which emphasizes the appearance of polarization effects.

23. A method for measuring the electronic properties of formations as recited in claim 21 wherein the applied current is a square wave.

24. A method recited in claim 23 wherein said measurements of said third time varying voltage output are interpreted to measure the time dependent electrical charge on the exterior of the casing which facilitates computation of the dielectric constants of the fluids in the adjacent geological formation.

25. An apparatus for measuring electrochemical phenomena of predetermined specific formations adjacent to a borehole casing comprising:

introduction means for selectively applying a time varying measuring current to the casing at a current entry point in the proximity of the specific portion of the formation of interest;

receiving means for receiving at least a portion of the measuring current at a point sufficiently remote from the current entry point to insure that a majority of the current introduced by said introduction means enters the formation from the casing;

voltage measuring means for detecting the time varying voltage level at a multiplicity of at least three spaced apart voltage measuring points along the casing, wherein the disposition of voltage measuring points defines the sections of the casing that is adjacent to the specific portion of the formation to be measured; and differential means for simultaneously measuring the magnitudes and the phases of the time varying differential voltages between a plurality of discrete pairs of said voltage measuring points to provide information about the specific formation of interest.

26. An apparatus as recited in claim 25 wherein said voltage measuring points are vertically spaced apart within the casing.

27. An apparatus as recited in claim 25 wherein said voltage measuring points are spaced horizontally about the casing.

28. An apparatus as recited in claim 25 wherein said receiving means includes an earth contacting electrode spaced apart from the casing and in electrical contact with the earth.

29. An apparatus as recited in claim 25 wherein said receiving means includes a receiving electrode in electrical contact with the casing.

30. An apparatus as recited in claim 25 further comprising calibration means for calibrating the apparatus to account for variations in the casing between the voltage measuring points.

31. An apparatus as recited in claim 30 wherein the differential means includes balancing means for receiving and comparing the differential voltage obtained between discrete pairs of voltage measuring points, the balancing means including:

a gain controller for amplifying a first voltage output indicative of the voltage difference between a first discrete pair of the voltage measuring points by an adjustable calibrating gain; and comparison means for comparing the voltage difference between the amplified first voltage output and a second voltage output indicative of the voltage difference between a second discrete pair of voltage measuring points;

whereby the comparison means provides a measurement signal that is indicative of the differential current leakage from the casing into the formation between the first and second discrete pairs of voltage measuring points when the introduction means applies said measurement current.

32. An apparatus as recited in claim 31 wherein said calibration means includes a first calibrating electrode in electrical contact with said casing on a first side of the voltage measuring points, a second calibrating electrode in electrical contact with the casing on the opposite side of said voltage measuring points, and means for conducting a calibration current between said first and second calibrating electrodes.

33. An apparatus as recited in claim 32 wherein said introduction means applies the measuring current to the first calibrating electrode.

34. An apparatus as recited in claim 32 wherein said calibrating gain is chosen to cause the amplified first differential voltage output to substantially equal the second differential voltage output when the apparatus is subjected to the calibration current.

35. An apparatus as recited in claim 34 wherein the comparison means generates a voltage output indicative of the differential voltage between the amplified first voltage output and the second voltage output.

36. An apparatus as recited in claim 35 wherein the differential means includes a plurality of first level differential amplifiers, each said differential amplifier producing a first level signal that reflects the voltage difference between a discrete pair of the voltage measuring points.

37. An apparatus as recited in claim 36 wherein the differential means further includes a second level differential amplifier that produces the measurement signal indicative of the voltage difference between two first level signals.

38. An apparatus as recited in claim 25 wherein the measuring current is an alternating current.

39. An apparatus as recited in claim 38 wherein the measuring current has a frequency in the range of 0.1 to 20 Hz.

40. An apparatus as recited in claim 39 wherein the measuring current is in the range of 0.1 to 30 amps, zero to peak.

41. An apparatus as recited in claim 38 wherein the measuring current has a frequency in the range of 0.01 to 5.0 Hz.

42. An apparatus as recited in claim 25 wherein said introducing means includes a first current conducting electrode disposed within and engaged in electrical contact with the casing for introducing the measuring current to the casing.

43. An apparatus as recited in claim 25 wherein said introducing means includes a plurality of current conducting electrodes disposed within and engaging in electrical contact with the casing for introducing the measuring current onto the casing.

44. An apparatus as recited in claim 25 wherein said voltage measuring means includes a multiplicity of at least three vertically spaced apart rows of voltage measuring points, each said row including a plurality of at least three horizontally spaced apart voltage measuring points.

45. A method for measuring electrochemical phenomena of a formation while drilling a borehole through the formation using a drill having a drill bit and a metal drill stem extending uphole from the bit, the method comprising the steps of:

drilling through the formation;

applying a time varying measurement current to the drill stem;

selectively receiving at least a portion of the current at a point in electrical contact with the earth that is spaced apart from the borehole;

detecting the voltage level at a plurality of at least three spaced apart voltage measuring points along the drill stem;

measuring the voltage differentials between a plurality of discrete pairs of the spaced apart voltage measuring points and the phase differences between the applied current and the detected voltages; and interpreting the measured differential voltages to predict formation characteristics.

46. A method as recited in claim 45 further comprising the step of determining the local potential of the drill pipe in the vicinity of the formation.

47. A method as recited in claim 46 further comprising the step of determining the resistivity of drilling mud pumped into the borehole and wherein the time varying measurement current includes sinusoidal portions.

48. An apparatus for measuring the electronic properties of formations penetrated by a borehole from within a metallic pipe which is positioned within the borehole, the apparatus comprising:

generating means for generating a time varying electric field on the exterior of the metallic pipe whereby said electric field has at least a component which is perpendicular to the metallic pipe thereby causing a time varying measurement current to be conducted from the metallic pipe into the formation adjacent the metallic pipe; and measurement means for measuring both the amplitude and phase of differential portions of the measurement current conducted into the formation from selected sections of the metallic pipe to determine electronic properties of the formation adjacent the selected pipe section.

49. An apparatus as recited in claim 48 wherein said generating means comprises:

a first current conducting electrode in electrical contact with the interior of the metallic pipe in the vicinity of the formation to be measured;

a second current conducting electrode in electrical contact with the surface of the earth; and current conducting means for conducting a time varying current between said first and second current conducting electrodes.

50. An apparatus for measuring the electronic properties of formations as recited in claim 48 wherein said apparatus is adapted to move inside said metallic pipe while simultaneously measuring the differential portion of the measurement current conducted into the formation along a selected segment of the metallic pipe.

51. An apparatus for measuring electrochemical properties of formations adjacent a borehole extending into the formations and having a metallic casing, the apparatus comprising:

a first current conducting electrode disposed within and engaged in electrical contact with the interior of the casing;

a current receiving electrode positioned sufficiently remote from the first current conducting electrode to insure that a majority of the current passing between the first current conducting electrode and the receiving electrode enters the formation from the casing;

a plurality of at least three spaced apart voltage measuring electrodes disposed within and engaged in electrical contact with the casing on a first side of the first current conducting electrode;

generating means for selectively applying a time varying measuring current to the casing at the first current conducting electrode in the proximity of the specific portion of the formation of interest;

first differential means for measuring the voltage differentials between discrete pairs of said voltage measuring electrodes; and second differential means for measuring the time shift between the measuring current applied at the first current conducting electrode and the signals measured by said voltage measuring electrodes.

52. An apparatus as recited in claim 51 further comprising calibration means for measuring the electrical resistance of the casing between each discrete pair of said voltage measuring electrodes whereby said calibration means provides sufficient information about the characteristics of said casing to allow said first differential means to quantitatively measure the differential current conducted into formation from the sections of casing between the voltage measuring electrodes.

53. An apparatus as recited in claim 52 wherein said voltage measurement electrodes are vertically spaced apart within said borehole at substantially equal intervals on a first vertical side of said first current conducting electrode.

54. An apparatus as recited in claim 52 wherein the generating means includes a variable signal generator for applying signals having variable waveforms, amplitudes, and frequencies to said first current conducting electrode, to facilitate repeated measurements using different signals, to provide a mechanism for measuring the electronic properties of formations adjacent to cased boreholes including one or more characteristics from the group including the resistivity of the formation, the presence or absence of cement, polarization phenomena and electrochemical phenomena.

55. An apparatus as recited in claim 52 wherein said voltage measurement electrodes are disposed azimuthally around the circumference of the casing at a particular vertical height on the casing.

56. An apparatus as recited in claim 54 wherein said voltage measuring electrodes are separated by approximately equal distances.

57. An apparatus as recited in claim 52 wherein at least two discrete pairs of voltage measurement electrodes are disposed at vertically spaced apart positions within the casing and at least two additional discrete pairs of voltage measurement electrodes are disposed at azimuthally spaced apart positions around the circumference of the casing thereby providing a means to measure the dip and strike of the geological formation.

58. A method for measuring the electronic properties of formations penetrated by a borehole from within a metallic pipe which is positioned within said borehole comprising the steps of:
applying a time varying electric field to the exterior of the metallic pipe such that said electric field has at least a component which is perpendicular to the metallic pipe thereby causing a time varying leakage current to be conducted from the metallic pipe into the formation; and
measuring the amplitude and phase of the portion of the leakage current conducted into the formation from a predetermined section of the metallic pipe to determine electronic properties of the formations adjacent the predetermined section of pipe.

59. A method as recited in claim 58 further comprising the step of simultaneously measuring the portions of the leakage current that escape from a plurality of discrete sections of the pipe and calibrating the current leakage measurements to account for variations in the metallic pipe.

60. The method as recited in claim 59 wherein said measuring steps are repeated for a variety of selected leakage currents having different frequencies substantially between 0.1 Hz and 20 Hz which provides sufficient information to calculate the resistivity of the adjacent geological formation and indications of the presence or absence of cement.

61. An apparatus for measurement of the electronic properties of formations adjacent to a wellbore that is surrounded by a conductive borehole casing comprising:
a plurality of at least three vertically spaced apart voltage measuring electrodes disposed at substantially equal intervals within said wellbore, each said voltage measuring electrode being in electrical contact with said casing and positioned adjacent to a formation of interest;
a first current conducting electrode disposed within and engaged in electrical contact with said casing on a first vertical side of said voltage measuring electrodes;
a second current conducting electrode disposed within and engaged in electrical contact with said casing on a second vertical side of said voltage measuring electrodes opposite the first current conducting electrode;
an earth contacting electrode in electrical contact with the surface of the earth;
conducting means for selectively applying a first time varying current to said first electrode in a manner requiring at least a portion of the first current to pass from said first electrode through said formation of interest to said earth contacting electrode and for applying a second time varying current to said first electrode in a manner that requires a majority of the second current to pass through the portion of the casing between said first and second current conducting electrodes;
measurement means for measuring said first and second applied currents;
first detector means for measuring the voltage difference between a first pair of said voltage measuring electrodes and producing a first output indicative thereof;
second detector means for measuring the voltage difference between a second pair of said voltage measuring electrodes and producing a second output indicative thereof;
third detector means for measuring the voltage differential between said first and second outputs; and
comparison means for comparing the time delay between the applied current and the measured voltage differences to provide information concerning the electronic properties of formations.

62. An apparatus as recited in claim 61 wherein the first applied current is sinusoidal and the comparison means compares the time delay in the form of a measured phase shift between said voltage differential and the first applied current to provide information that is used to determine the resistivity of formations adjacent to said borehole casing and to distinguish the resistivity from other electronic properties of said formations.

63. An apparatus in claim 61 wherein the applied current is a transient current to provide information that is used to determine polarization effects of formations adjacent to said borehole casing and to distinguish the polarization effects from other electronic properties of said formations.

64. An apparatus for measurement of the electronic properties of selected portions of formations of interest adjacent to a wellbore that is surrounded by a conductive metallic casing comprising:
an upper voltage measurement electrode, a middle voltage measurement electrode, and a lower voltage measurement electrode vertically spaced apart at substantially equal intervals within said wellbore, each said voltage measuring electrode being in electrical contact with said casing and positioned adjacent to a formation of interest;
a first current conducting electrode disposed within and engaged in electrical contact with said casing a first distance vertically above said upper voltage measurement electrode;
a second current conducting electrode disposed within and engaged in electrical contact with said casing a second distance vertically below said lower voltage conducting electrode;
a third current conducting electrode disposed within and engaged in electrical contact with said casing a third distance vertically above said upper voltage measurement electrode;

an earth contacting electrode in electrical contact with the surface of the earth;

conducting means for selectively applying a first time varying current to said first current conducting electrode in a manner that requires a first portion of the current to pass from said first electrode through said formation of interest to said earth contacting electrode, selectively applying a second time varying current to said first current conducting electrode in a manner that requires a majority of the current to pass through the portion of the casing between said first and second conducting electrodes, and selectively applying a third time varying current to said first current conducting electrode in a manner that requires a second portion of the current to pass through said formation of interest to said third current conducting electrode;

measurement means for measuring said first, second and third time varying currents;

a first detector means for measuring the voltage difference between the upper pair of said voltage measuring electrodes;

a second detector means for measuring the voltage difference between the lower pair of said voltage measuring electrodes;

a third detector means for providing a voltage differential between said first and second detector means;

and analysis means to measure said first and second portions of the current conducted through the formations;

thereby providing an apparatus capable of investigating various selected portions of formations.

65. An apparatus as recited in claim 64, wherein: said first distance is in the range from 0.1 meters to 10 meters; and said second distance is in the range from 0.1 to 10 meters.

66. An apparatus as recited in claim 64 wherein the formation of interest includes any cement adjacent to said casing and the surrounding geological formation thereby providing an apparatus capable of investigating the variable resistivity of cement and geological formations at different radial distance from said casing.

67. An apparatus as recited in claim 64 wherein the formation of interest includes a freshly drilled geological formation adjacent to a casing, and wherein said casing forms the drill stem attached to a drilling bit used to bore holes in the earth thereby providing an apparatus capable of investigating the variable resistivity of geological formations adjacent said drill stem caused by different invaded zones produced during drilling operations that are at different radial distances from said drill string.

68. An apparatus for measurement of the electronic properties of selected portions of formations adjacent to a wellbore that is surrounded by a conductive borehole casing comprising:

a first set of at least three vertically spaced apart voltage measuring electrodes separated vertically by a first distance of separation within said wellbore, each said voltage measuring electrode being in electrical contact with said casing and positioned adjacent to a formation of interest;

a second set of at least three vertically spaced apart voltage measuring electrodes separated vertically by a second distance of separation within said wellbore, each said voltage measuring electrode being in electrical contact with said casing and positioned adjacent to a formation of interest;

a first current conducting electrode disposed within and engaged in electrical contact with said casing vertically on a first side of said sets of voltage measuring electrodes;

a second current conducting electrode disposed within and engaged in electrical contact with said casing vertically on a second side of said sets of voltage measuring electrodes;

an earth contacting electrode in electrical contact with the surface of the earth;

conducting means for selectively applying a first time varying current to said first electrode in a manner requiring at least a portion of the first current to pass from said first electrode through said formation of interest to said earth contacting electrode and for applying a second time varying current to said first electrode in a manner that requires a majority of the second current to pass through the portion of the casing between said first and second current conducting electrodes;

means for measuring said first and second time varying currents;

a first detector means for measuring the voltage difference between a first pair of said first set of voltage measuring electrodes;

a second detector means for measuring the voltage difference between a second pair of said first set voltage measuring electrodes;

a third detector means for measuring the voltage difference between a first pair of said second set of voltage measuring electrodes;

a fourth detector means for measuring the voltage difference between a second pair of said second set of voltage measuring electrodes;

thereby providing an apparatus capable of investigating various selected portions of formations.

69. An apparatus as recited in claim 68 wherein the formation of interest is any cement adjacent to said casing and the surrounding geological formation thereby providing an apparatus capable of investigating the variable resistivity of any cement present and the variable resistivity of geological formations at different radial distances from said casing.

70. An apparatus as recited in claim 68 wherein the formation of interest is a freshly drilled geological formation adjacent to said casing that is the drill stem of drilling bit used to bore holes in the earth thereby providing an apparatus capable of investigating the variable resistivity of geological formations adjacent said drill stem, and in particular, those variations caused by different invaded zones produced during drilling operations that are at different radial distances from said drill string.

71. An apparatus for measuring the resistivity and horizontal changes in the resistivity of a layer of cement immediately adjacent to the exterior of a borehole casing that is oriented substantially vertically in a surrounding geological formation, the apparatus comprising:

means for conducting alternating current from a first current conducting electrode in electrical contact with the interior of the borehole casing to a second current conducting electrode in electrical contact with the surface of the earth, whereby at least a portion of the alternating current is conducted from the first electrode through any cement which may be present around the borehole casing and through the surrounding geological formation to the second electrode;

and means for simultaneously measuring the A.C. voltage differences between a plurality of discrete pairs of horizontally disposed voltage measuring electrodes which are in electrical contact with the interior of the borehole casing adjacent to the cement layer of interest whereby said A.C. voltage measurements provide a measure of the resistivity and horizontal changes in the resistivity of the cement layer of interest.

72. An apparatus for measuring electrochemical phenomena of a predetermined specific formation adjacent to a section of borehole casing comprising:

introduction means for selectively applying a time varying measuring current to enter the casing at a point in the proximity of the predetermined specific formation of interest;

receiving means for receiving at least a portion of the current at a point sufficiently remote from the current entry point to insure that a majority of the current introduced by said current introduction means enters the formation from the casing; and voltage measuring electrode means for detecting the magnitude and phase of the time varying voltage level between at least two spaced apart voltage measuring points along the casing, said disposition of electrodes defining the section of casing which is adjacent to the specific formation to be measured to provide information about the predetermined specific formation of interest.

73. A method for measuring the electrochemical phenomena of formations adjacent to a cased borehole, comprising the steps of:

causing a time varying current to enter the casing in the proximity of a specific formation to be tested;

selectively receiving at least a portion of the current at a point sufficiently remote from the current entry point to insure that a majority of the current introduced at the current entry point enters the formation along the length of the borehole casing; and detecting the magnitude and phase of the time varying voltage level at a plurality of at least two spaced apart voltage measuring points along the casing, said disposition of spaced apart points being adjacent to the specific formation to be tested, to determine information about electrochemical phenomena of formations.

74. A method for measuring electrochemical phenomena of formations adjacent to a cased borehole comprising the steps of:

causing a first total time varying current to enter the casing in the proximity of a particular geological formation to be tested thereby causing a first portion of said first total time varying current to pass through a first portion of the formation to be tested;

selectively receiving said first current at a first point sufficiently remote from the current entry point to insure that a first portion of said first total time varying current passes through said first portion of the formation to be tested;

causing a second total time varying current to enter the casing in the proximity of the particular geological formation to be tested thereby causing a second portion of said second total time varying current to pass through a second portion of the formation to be tested;

selectively receiving said second current at a second point, which is different than said first point, and which is sufficiently remote from the current entry point to insure that a second portion of said second total time varying current passes through said second portion of the formation to be tested; and measuring the magnitudes and phases of the time varying voltage levels at a plurality of at least three spaced apart voltage measuring points along the casing in response to said first and second total time varying currents, said disposition of electrodes defining the extent of the formation adjacent to the casing to be tested, thereby providing information about electrochemical phenomena of formations.

75. A method for measuring the resistivity and changes in the resistivity of a layer of cement immediately adjacent to the exterior of a borehole casing that is oriented substantially vertically in a surrounding geological formation comprising the steps of:

applying a time varying electric field to the exterior of the metallic pipe whereby said electric field has at least a component which is perpendicular to the metallic pipe thereby causing a total time varying current to be conducted from the metallic pipe through any cement present that is in electrical contact with the metallic pipe and through a surrounding geological formation;

and measuring the A.C. voltage differences between at least two horizontally disposed voltage measuring electrodes which are in electrical contact with the interior of the borehole casing adjacent to the cement layer of interest whereby said A.C. voltage measurements provide a measure of the resistivity and changes in the resistivity of said layer of cement.

76. A method for measuring the resistivity of specific geological formation adjacent to a predetermined portion of a steel casing surrounded by cement, the method comprising the steps of:

(a) measuring the electrical resistance properties of the predetermined portion of the casing to determine thickness variations of the said portion of the casing thereby providing a first compensation step;

(b) measuring the electrical resistance properties of the cement adjacent to the said predetermined portion of the casing thereby providing a second compensation step;

(c) causing a time varying current to enter the casing in the proximity of the specific geological formation to be tested;

selectively receiving at least a portion of the current at a point sufficiently remote from the current entry point to insure that a majority of the current introduced at the current entry point enters the formation along the length of the borehole casing; and measuring the differential current conducted into formation from said predetermined portion of said casing thereby providing a measurement of the resistivity of specific geological formations adjacent said specific portion of said casing thereby providing a measurement step; and (d) using the electrical resistance properties from said first and second compensation steps to correct measurements of the resistivity obtained during said measurement step to provide improved information about the resistivity of specific geological formations adjacent to said predetermined portion of said casing.

* * * * *